United States Patent Office  
3,449,716  
Patented June 10, 1969

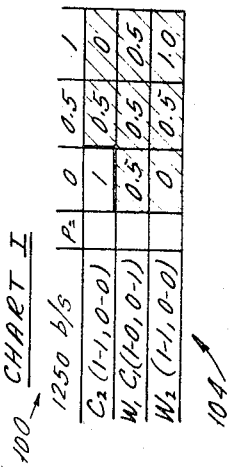
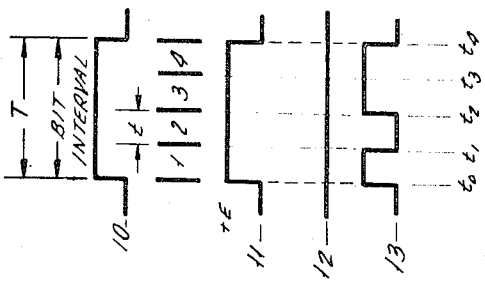
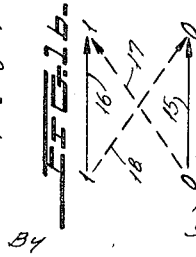

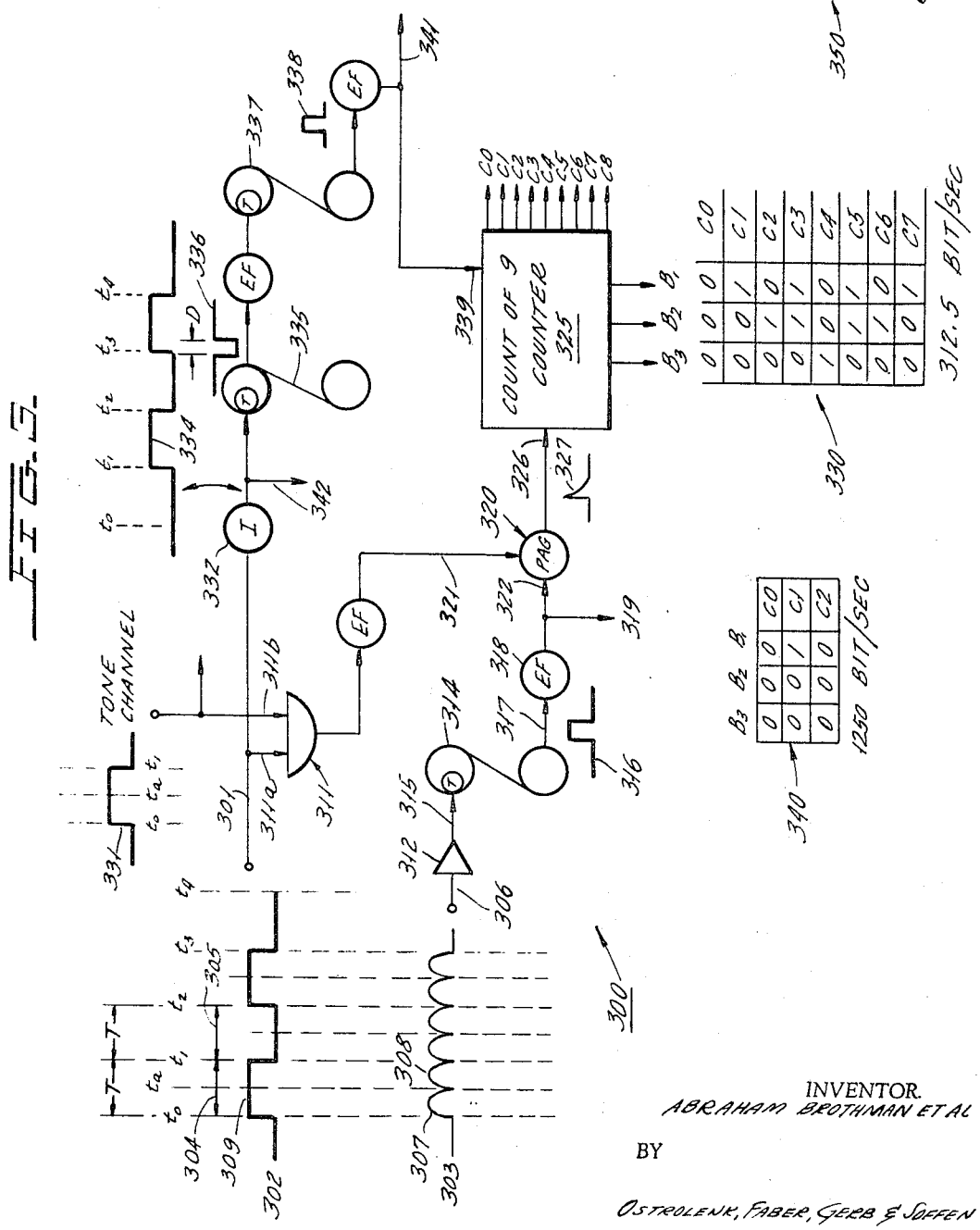

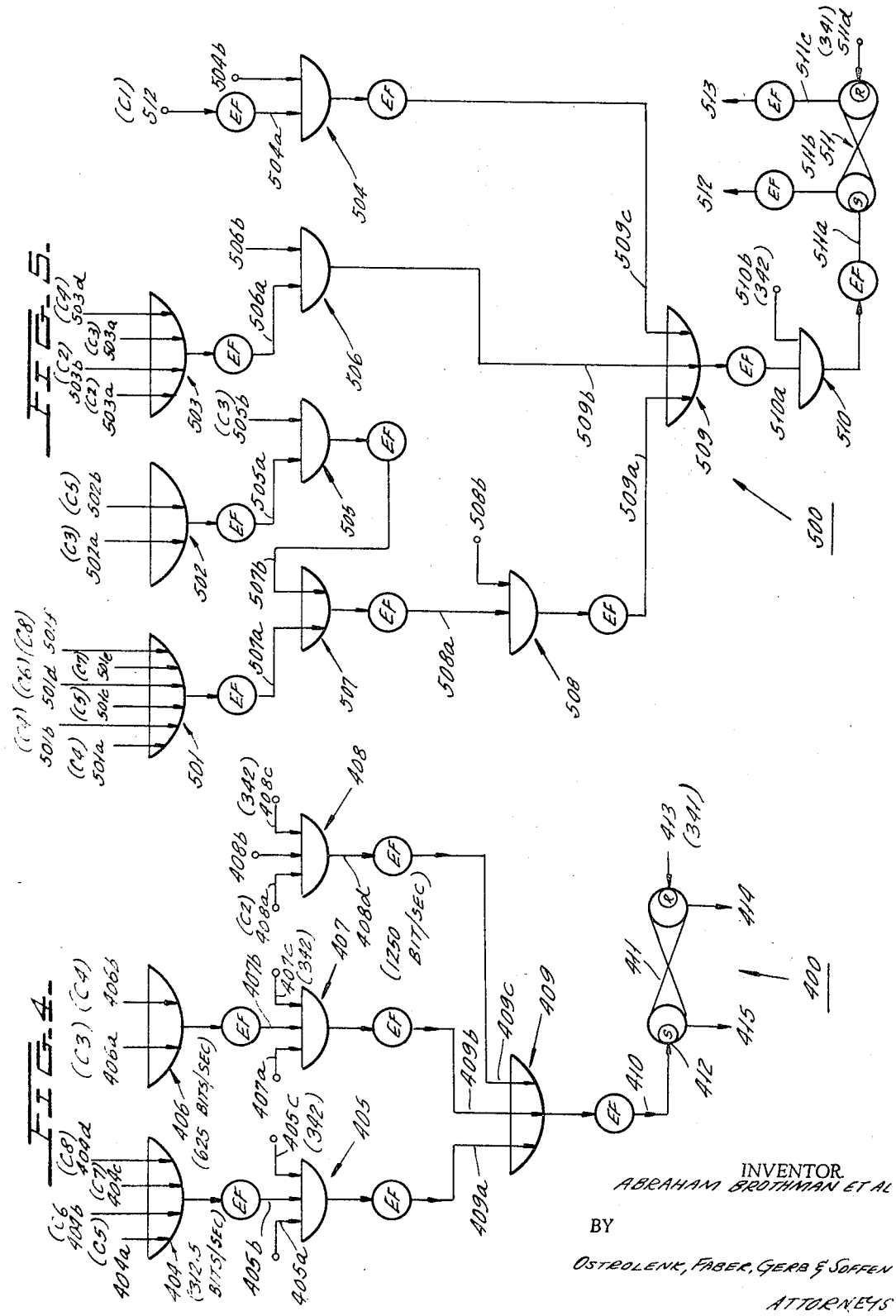

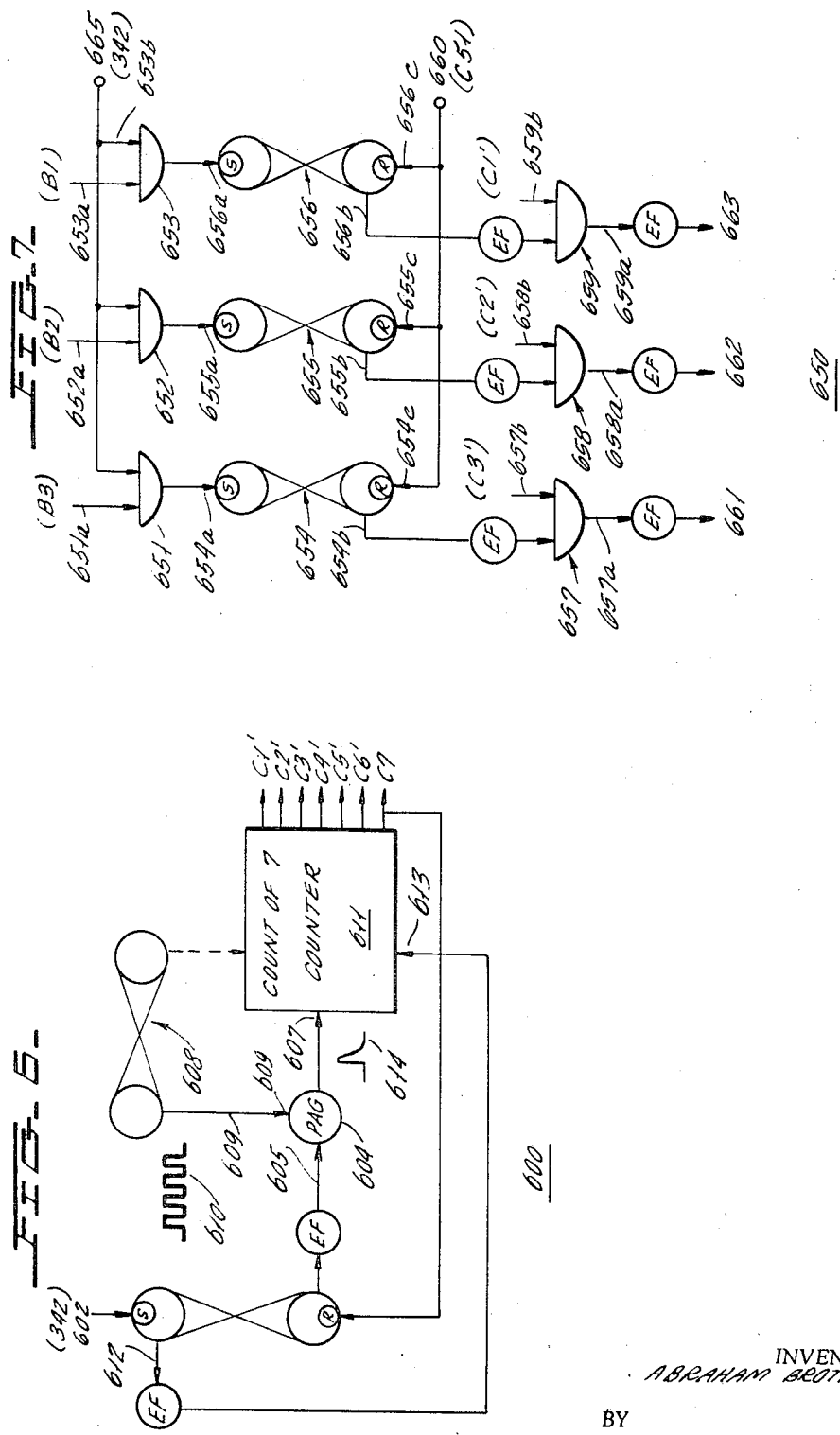

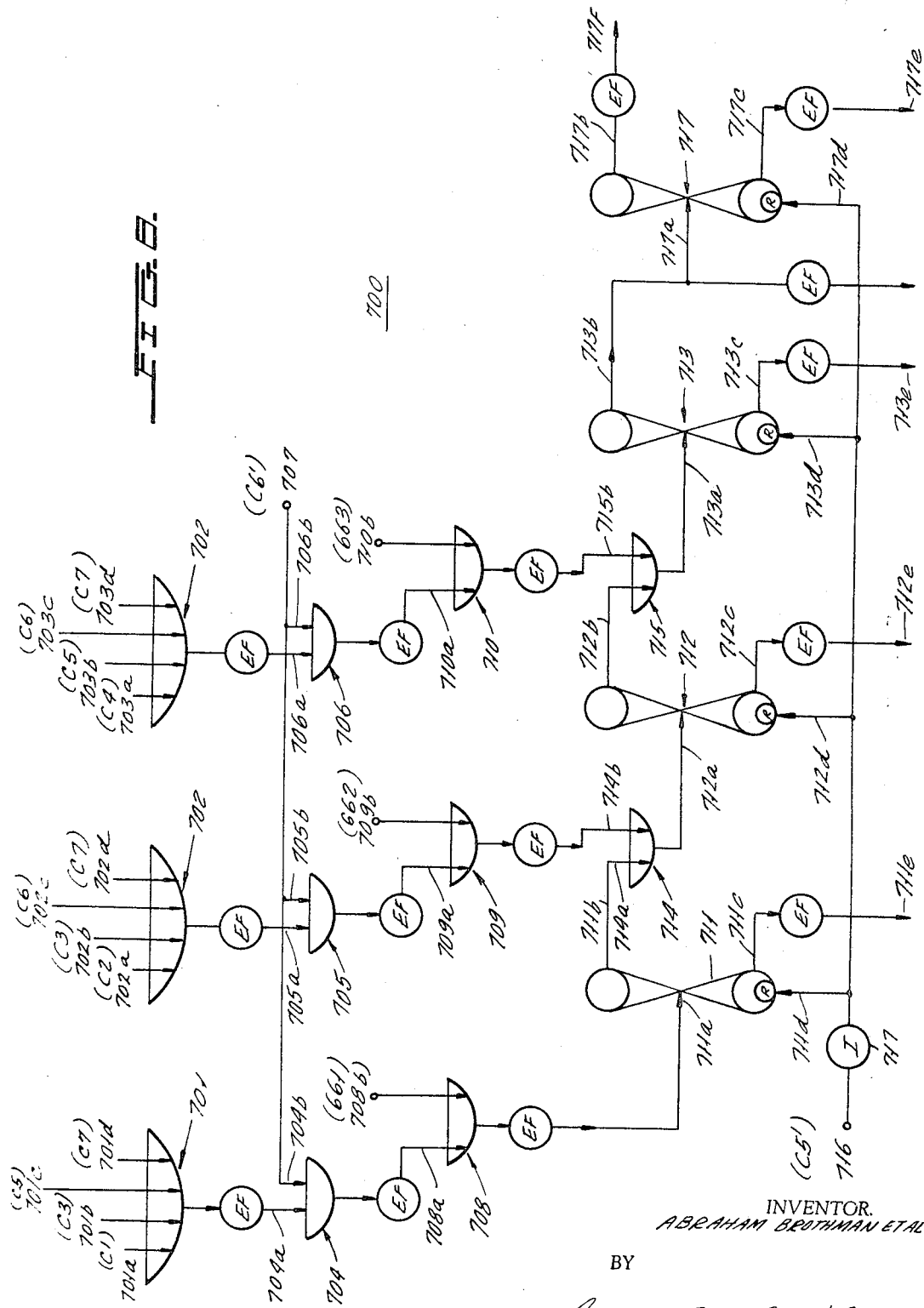

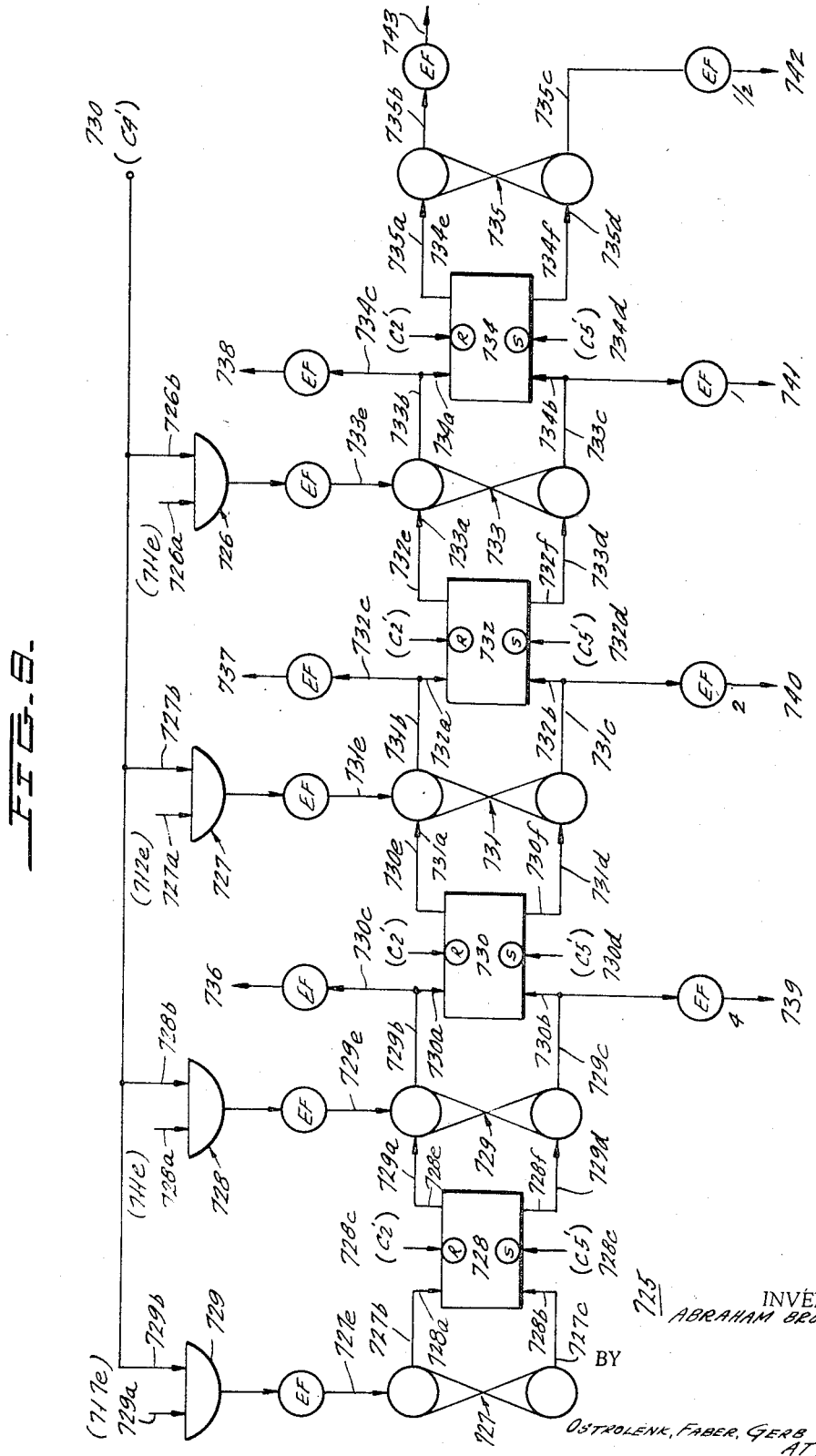

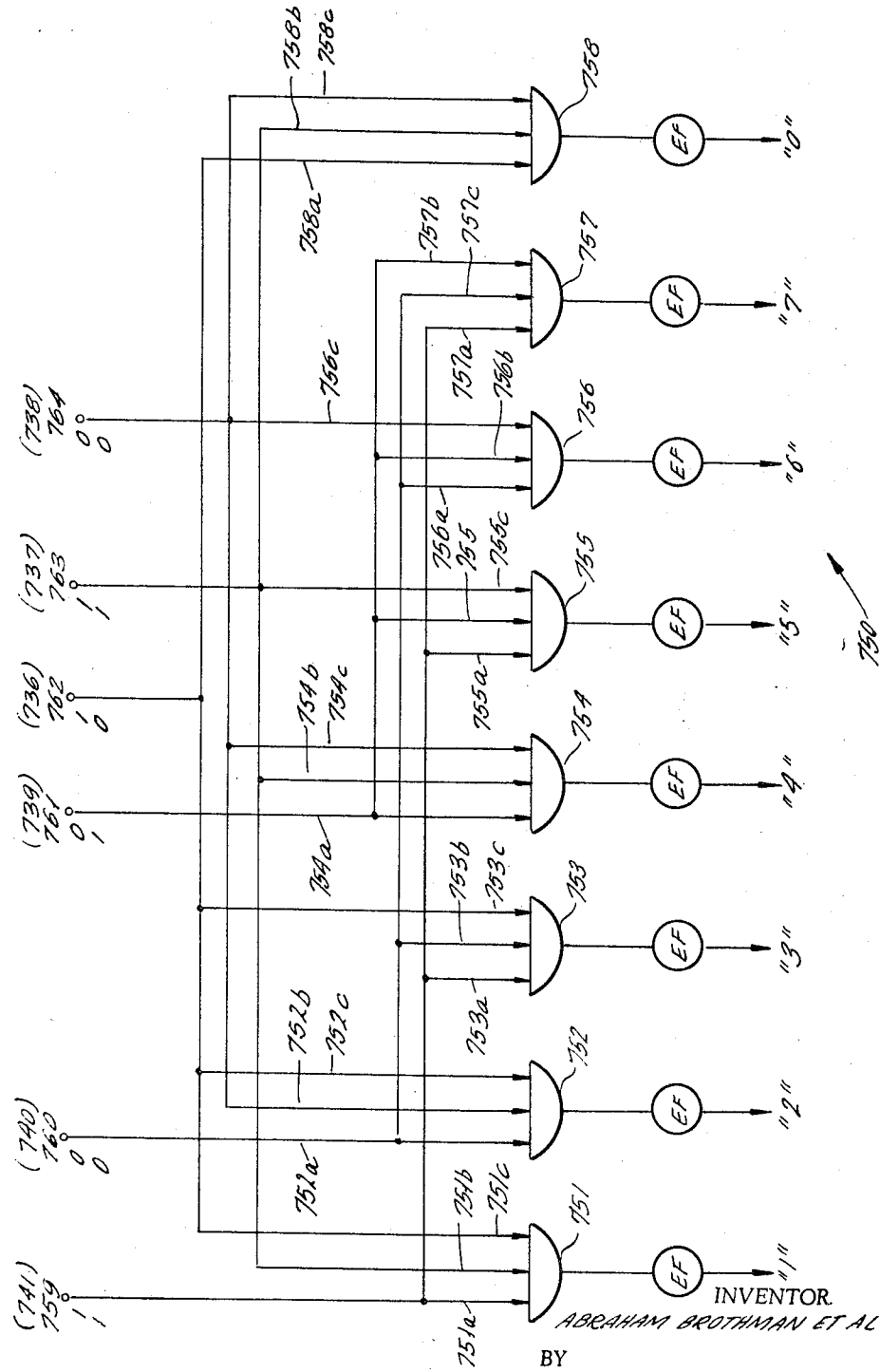

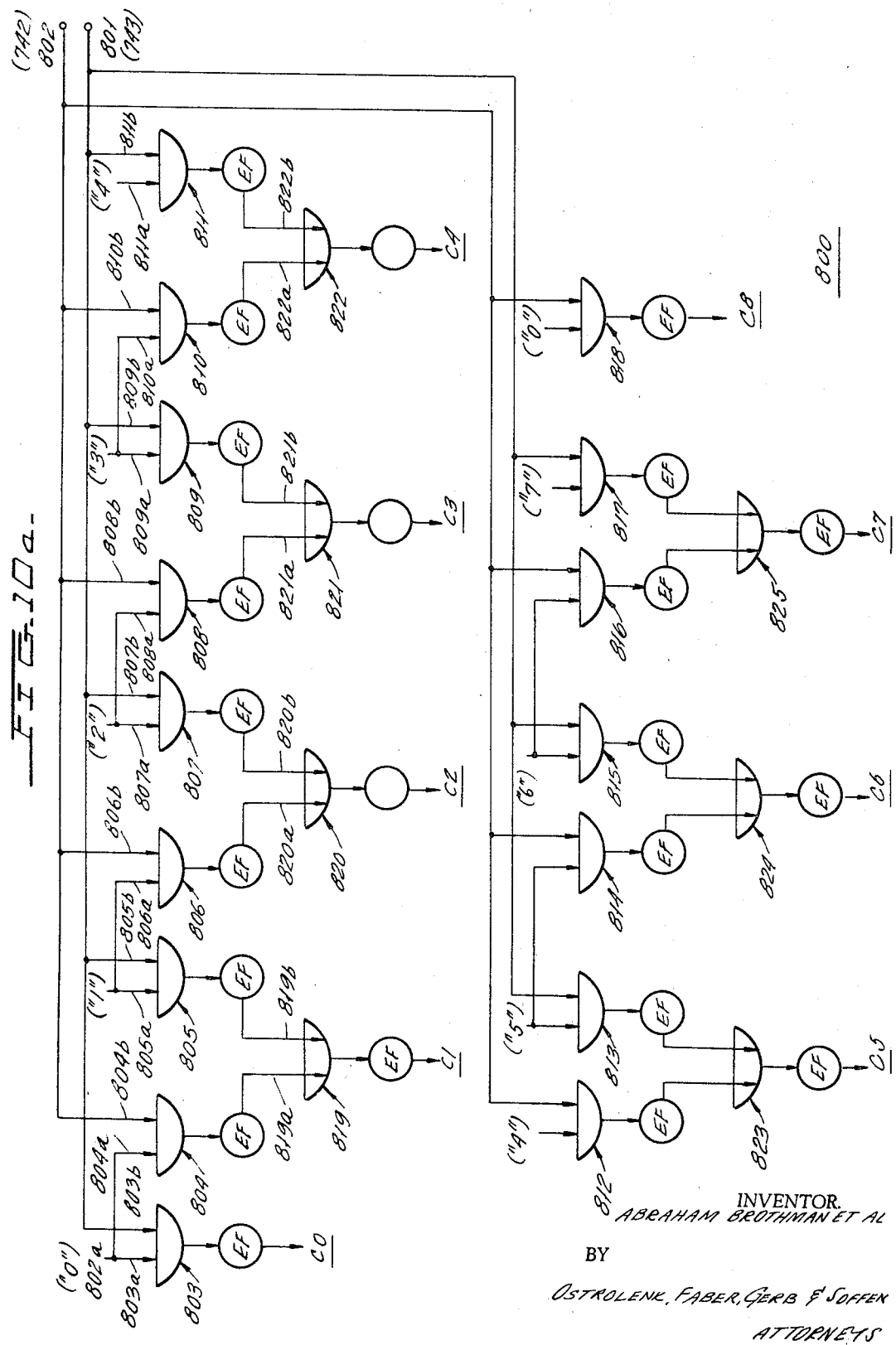

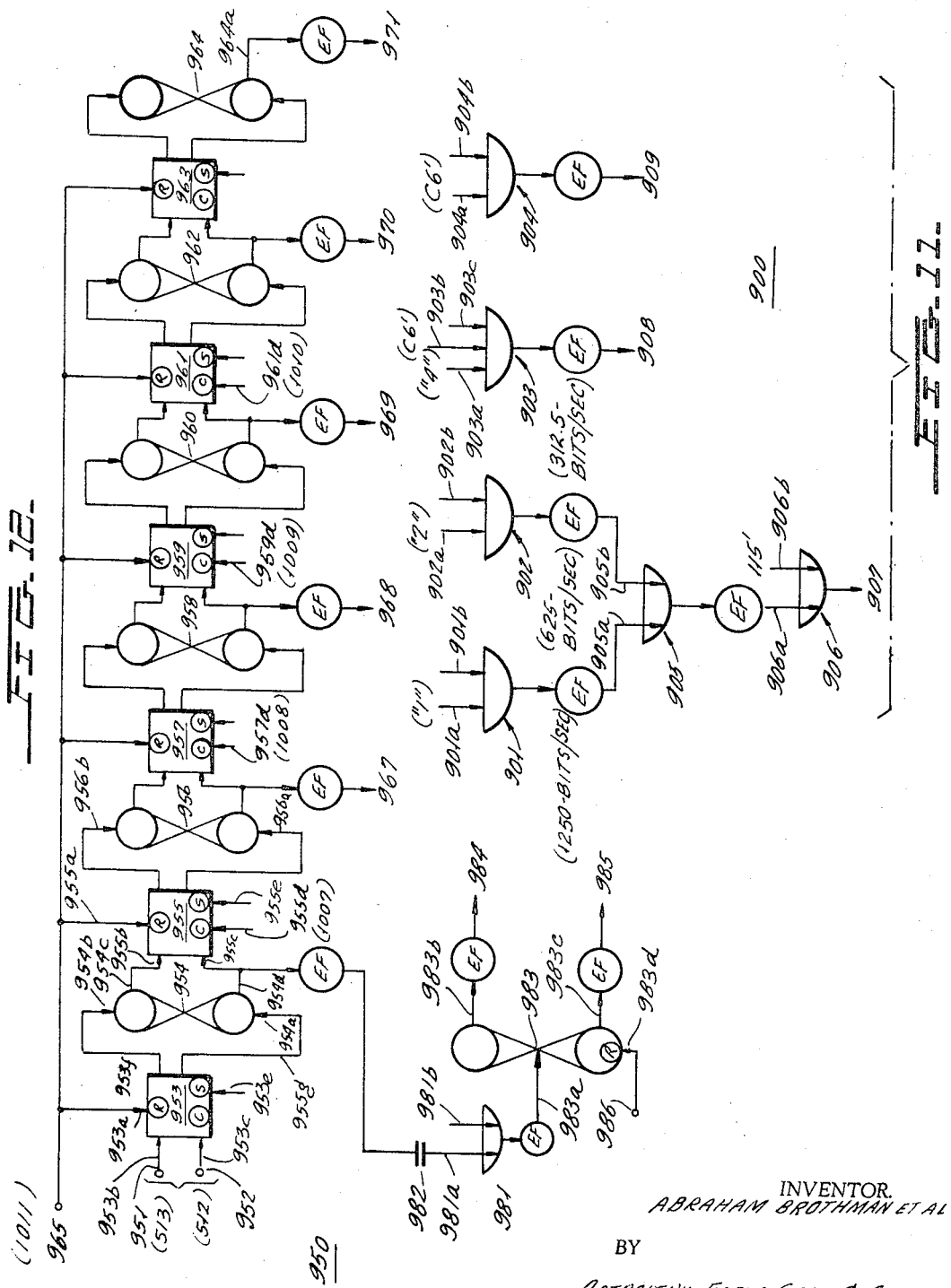

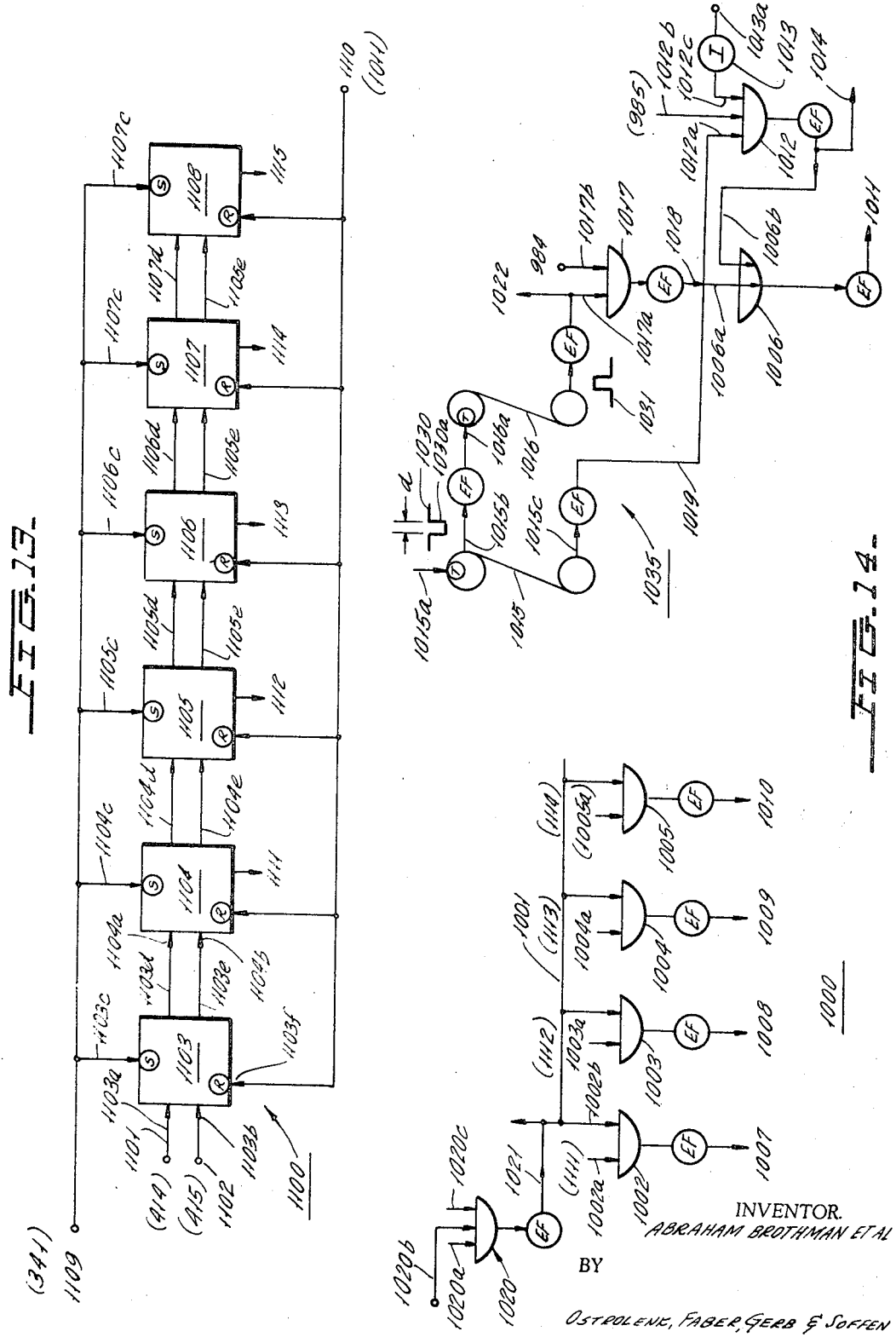

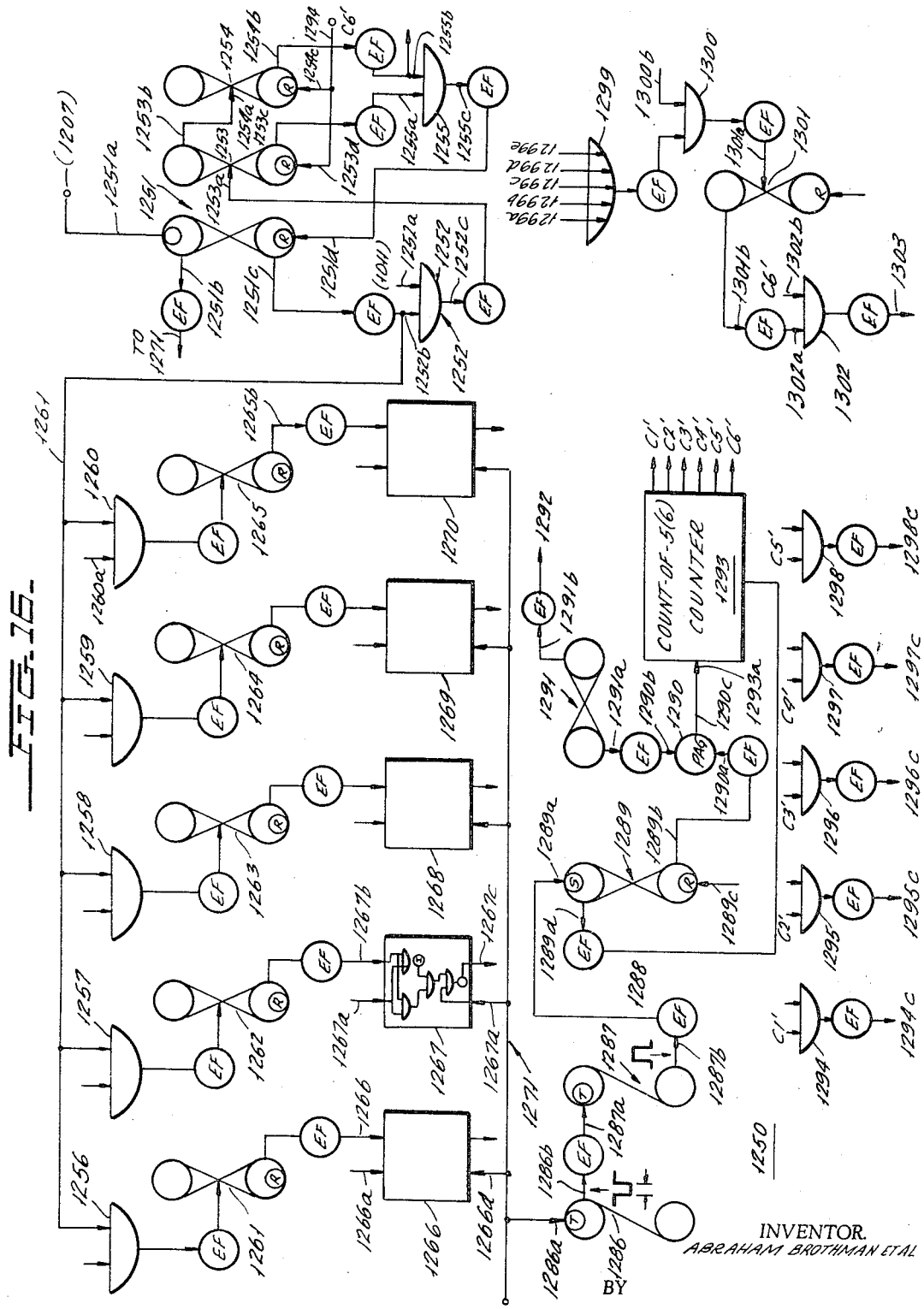

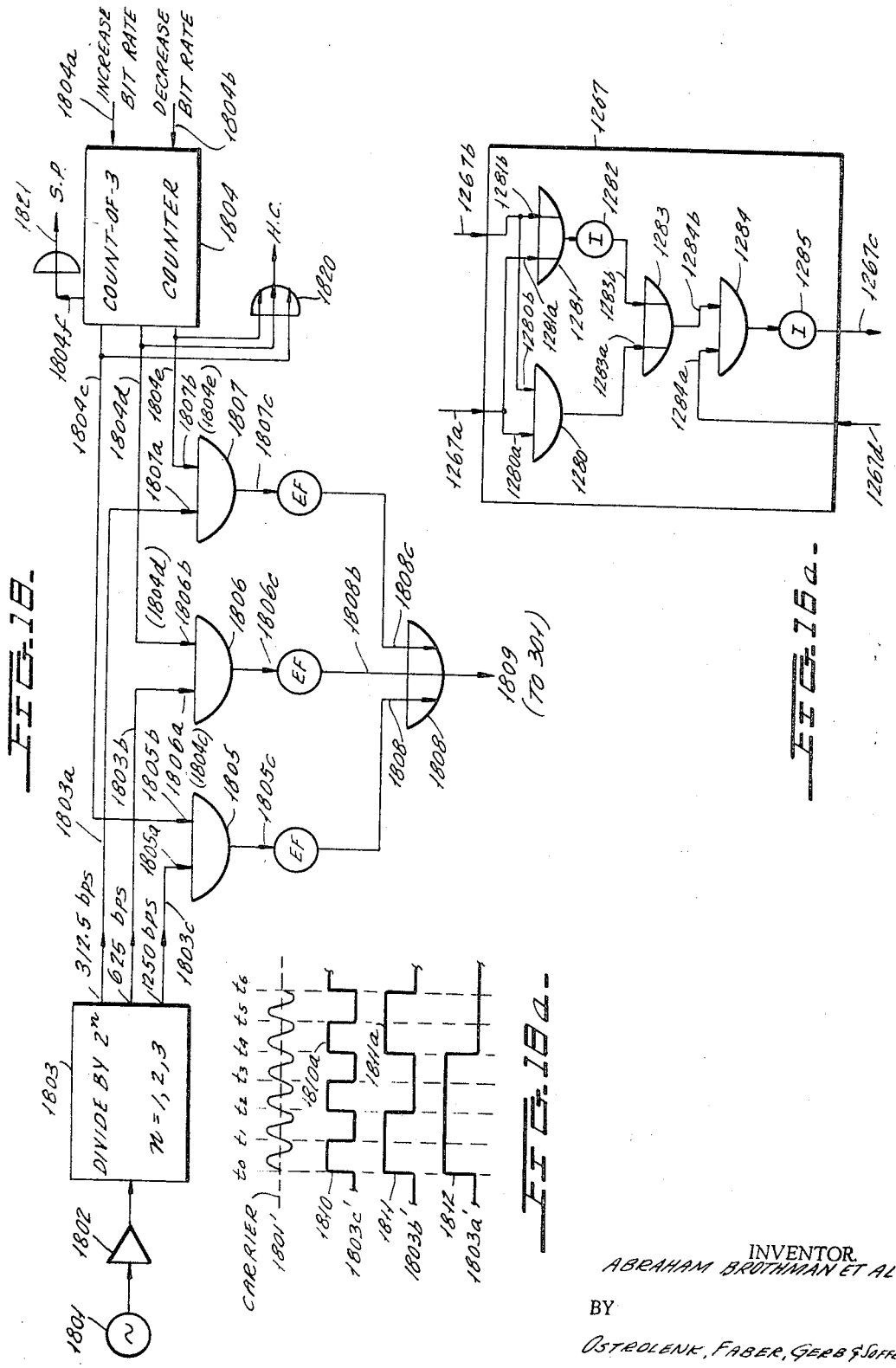

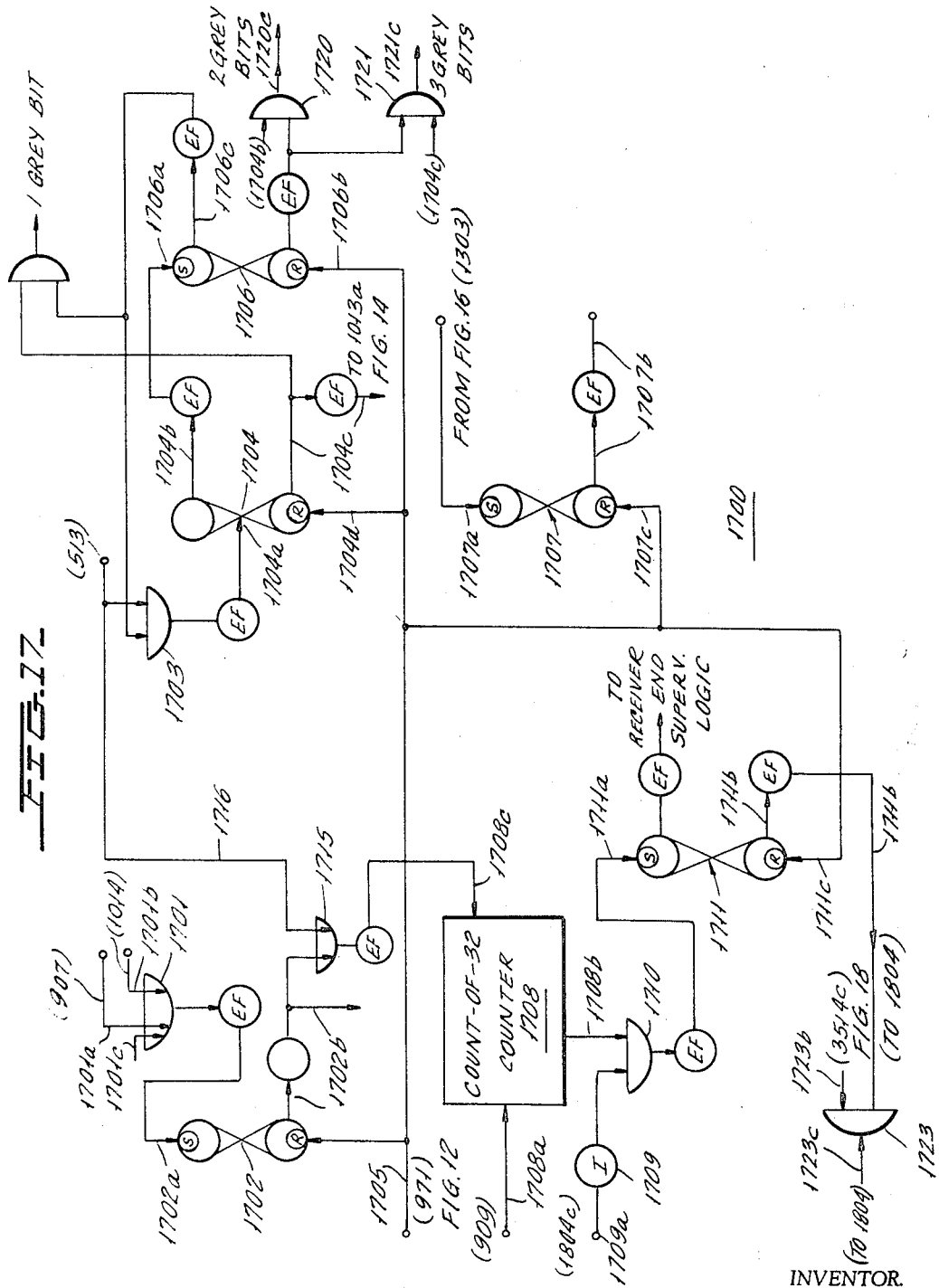

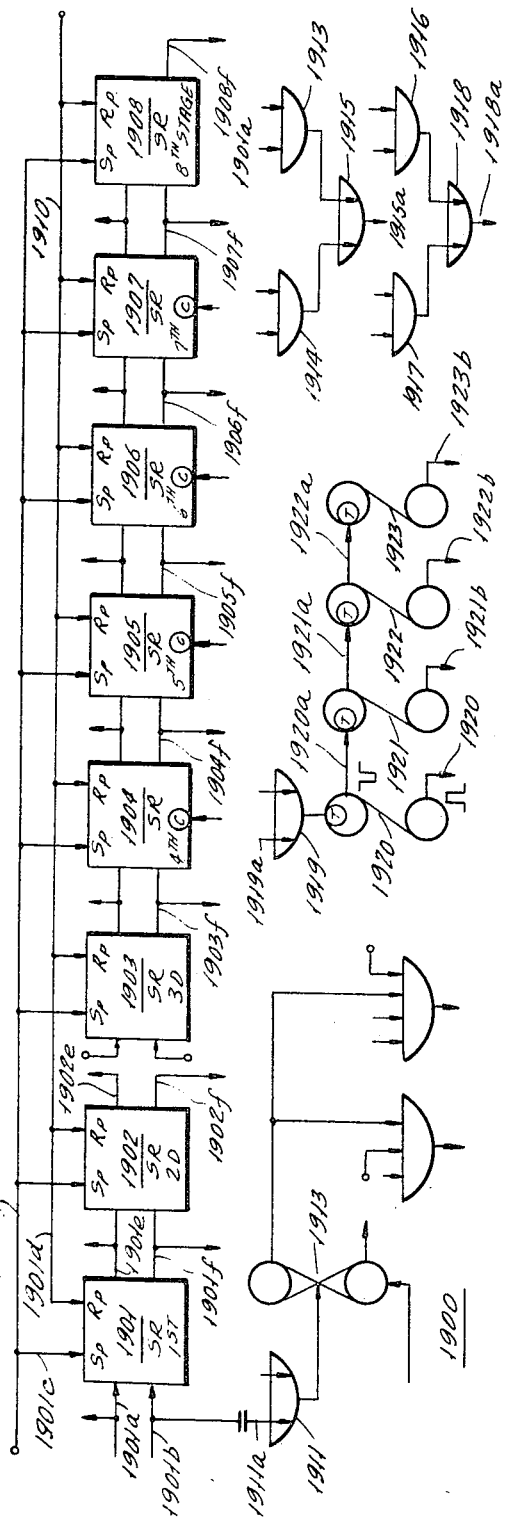

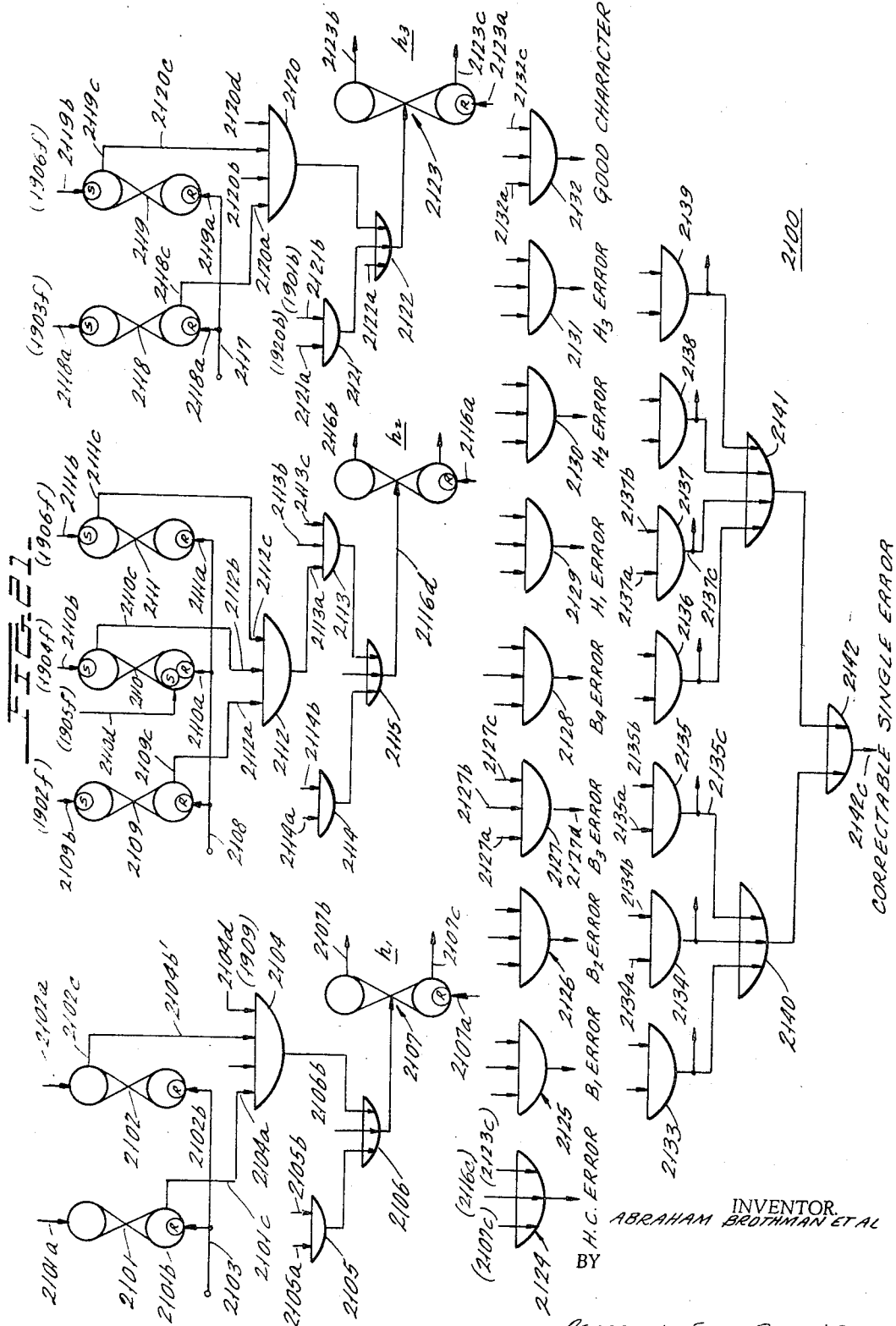

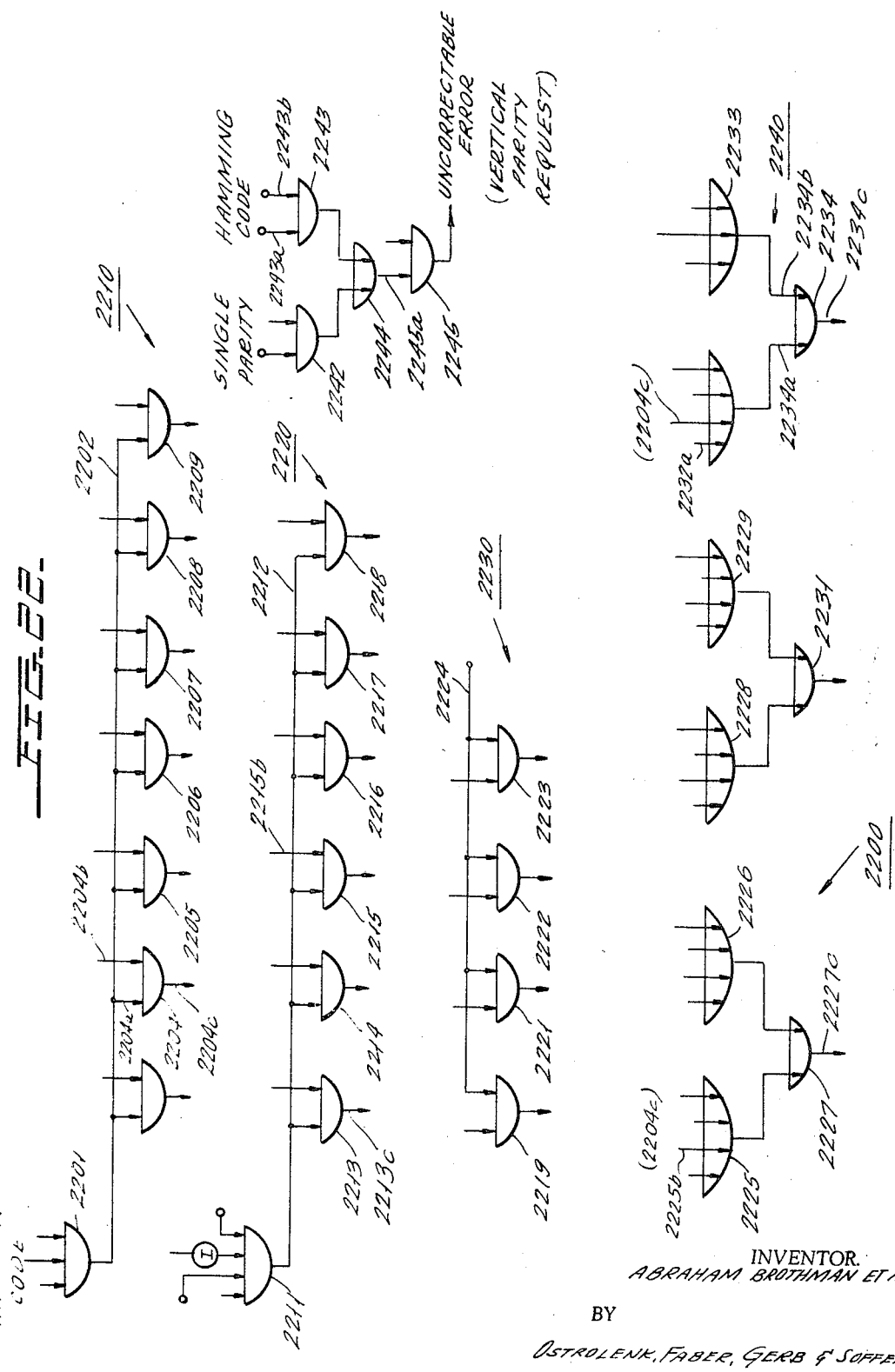

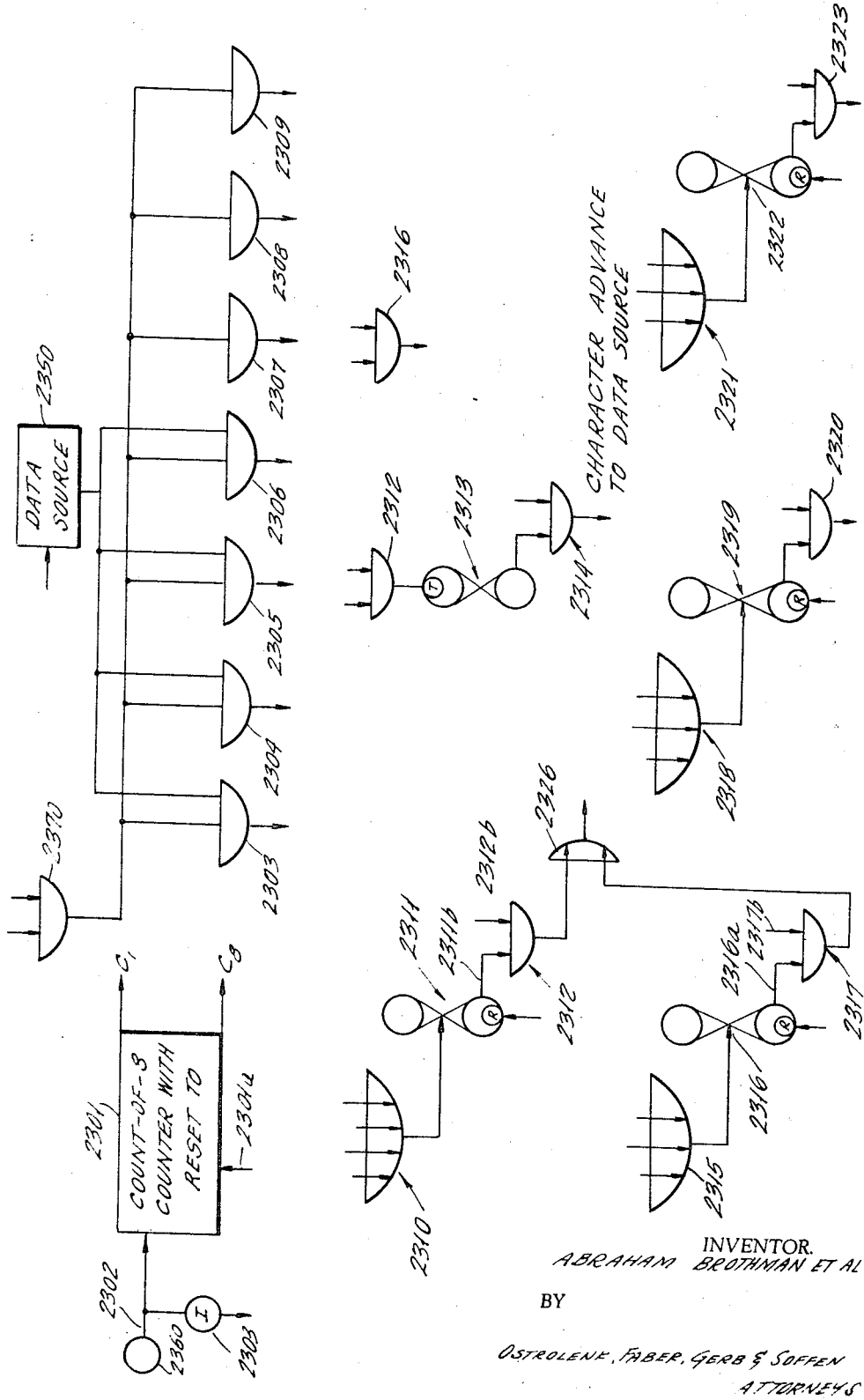

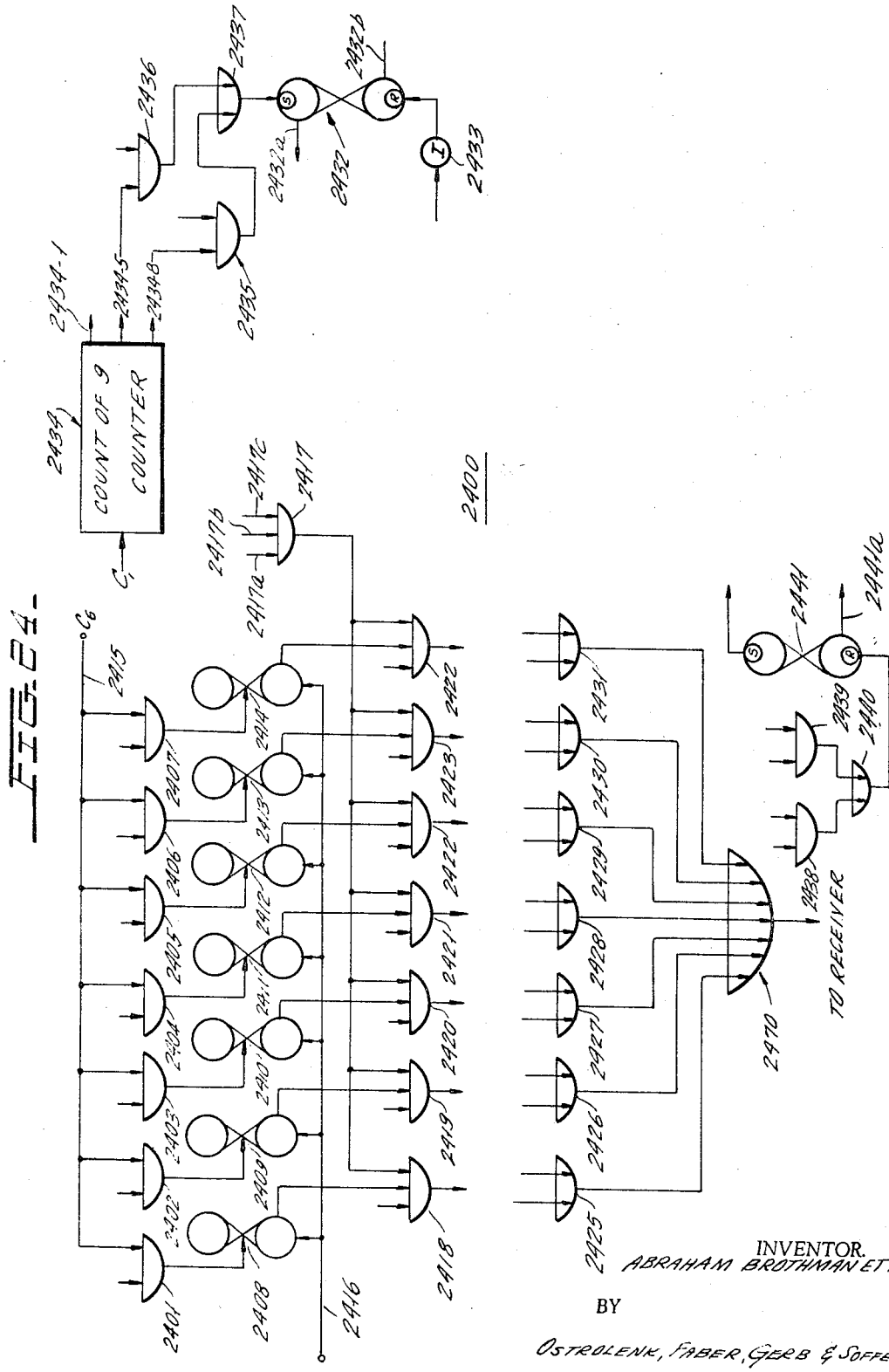

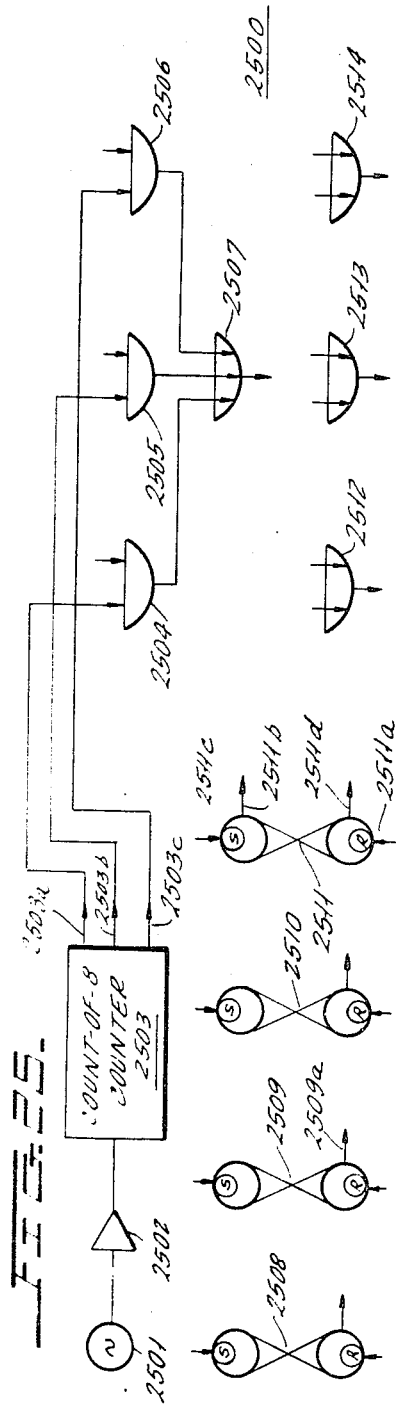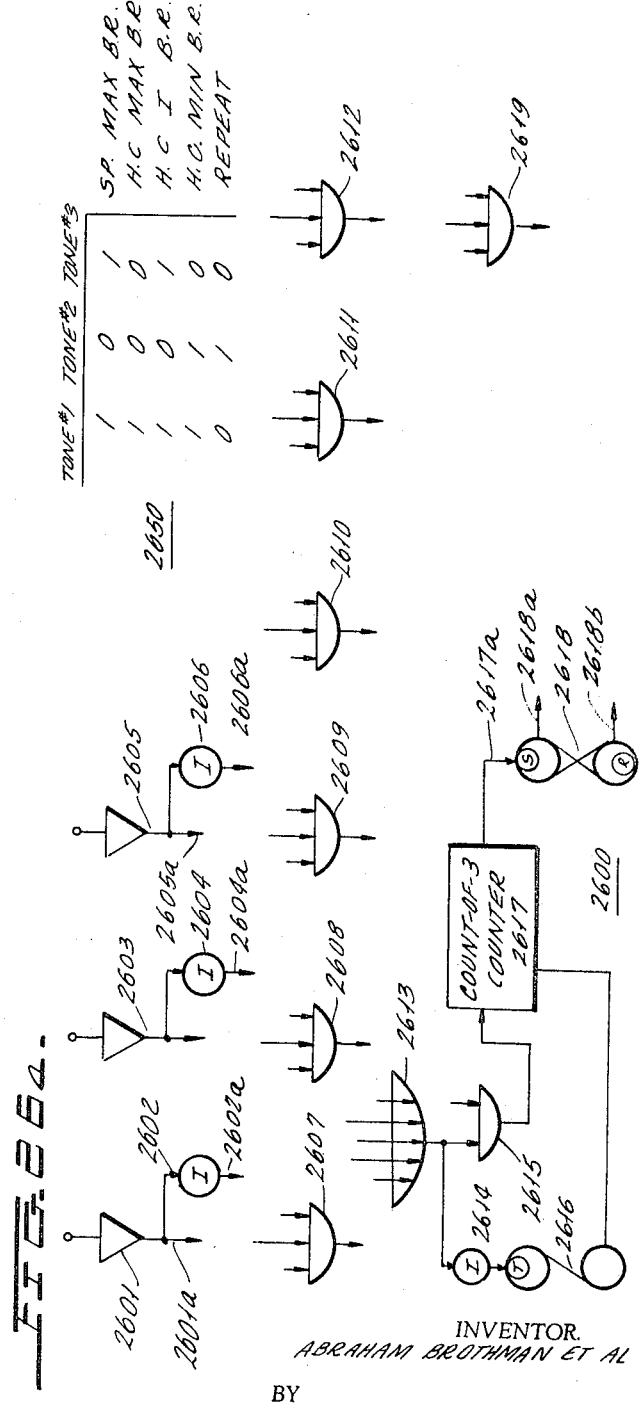

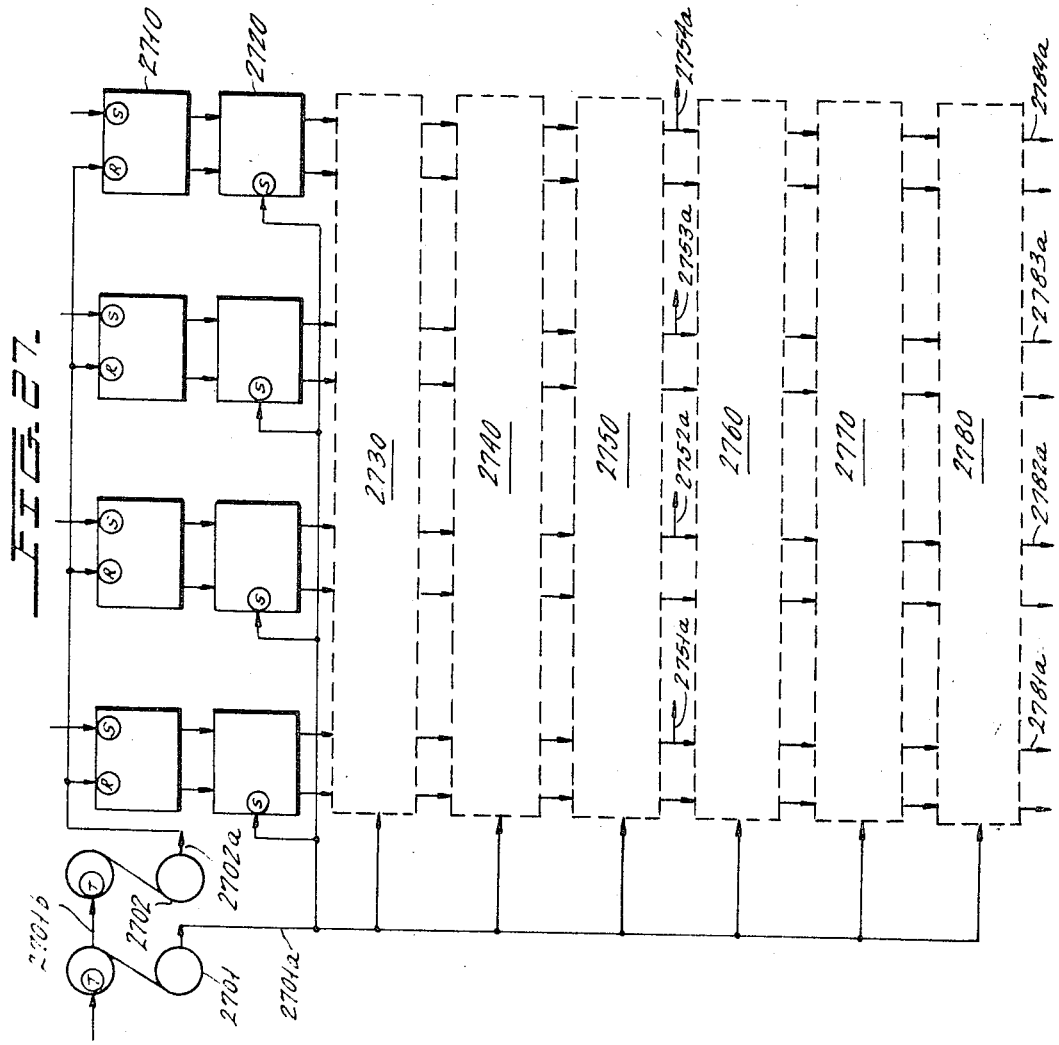
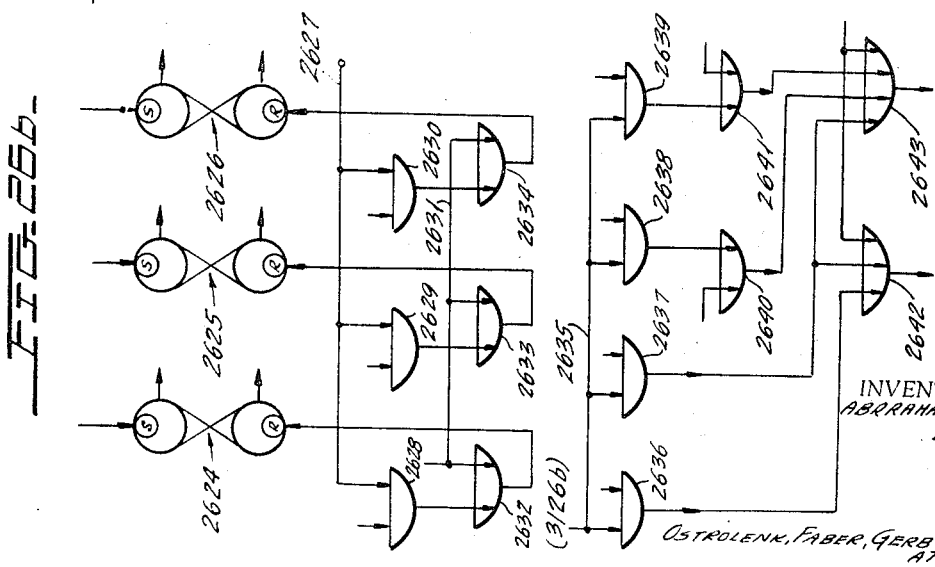

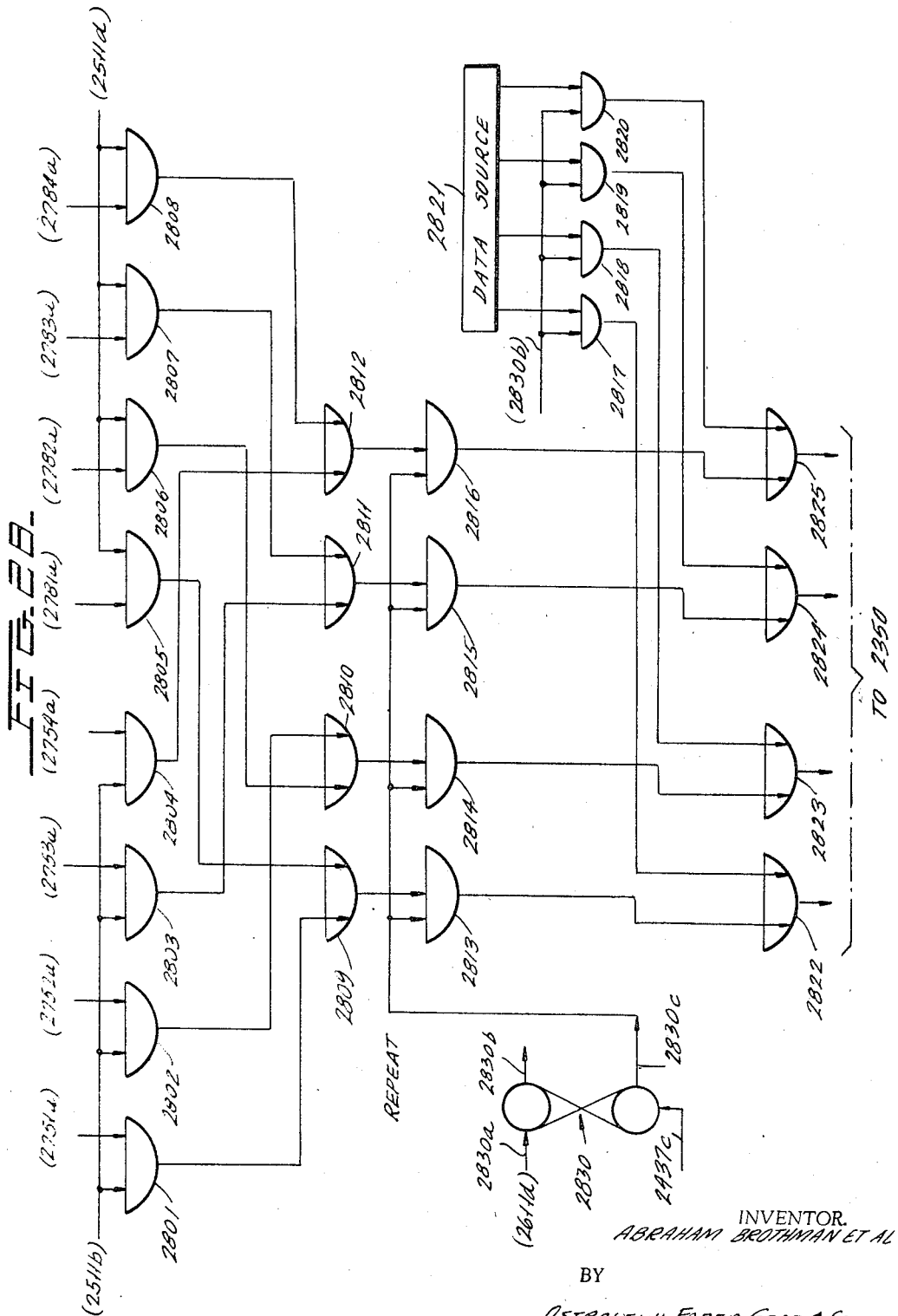

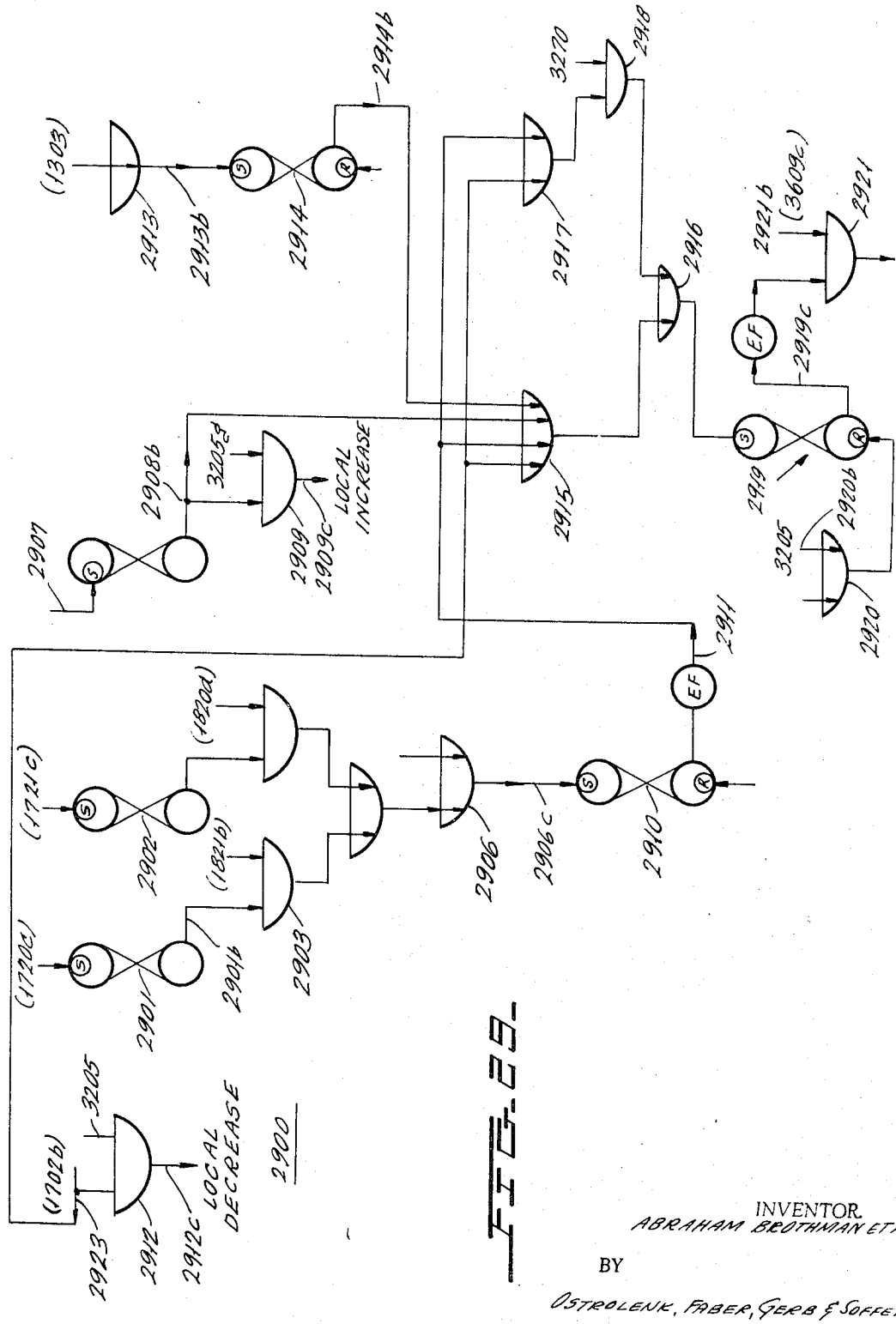

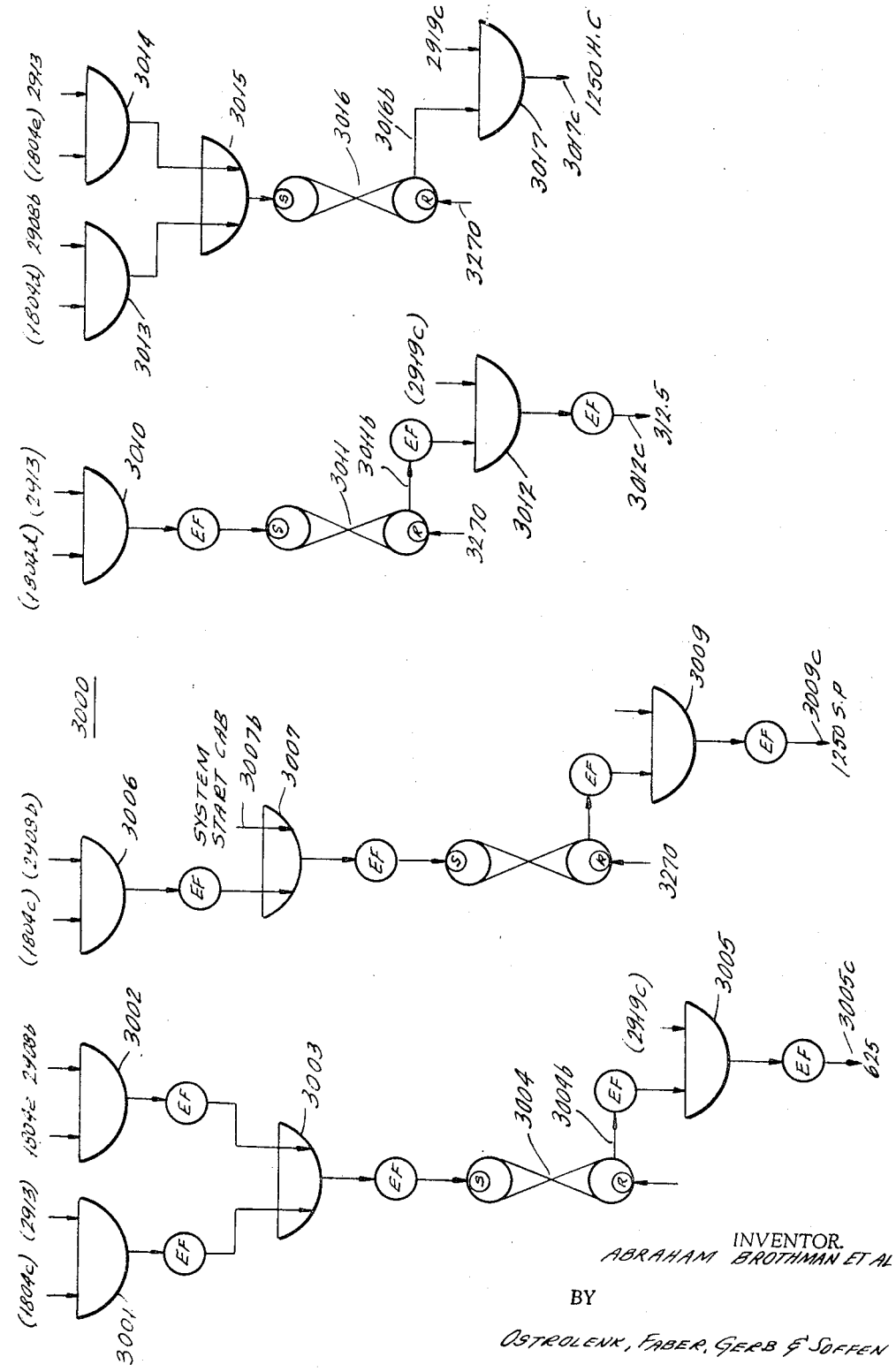

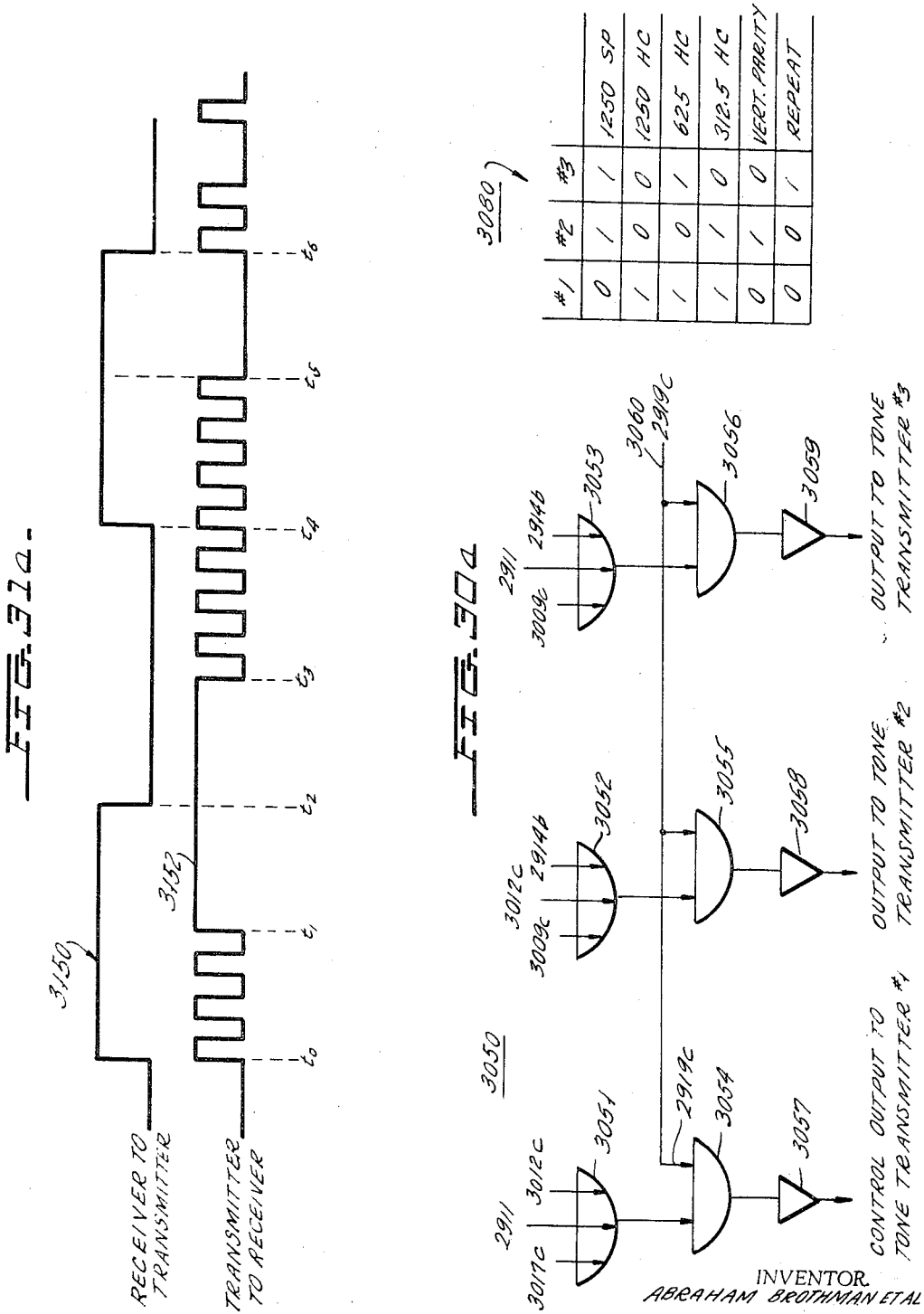

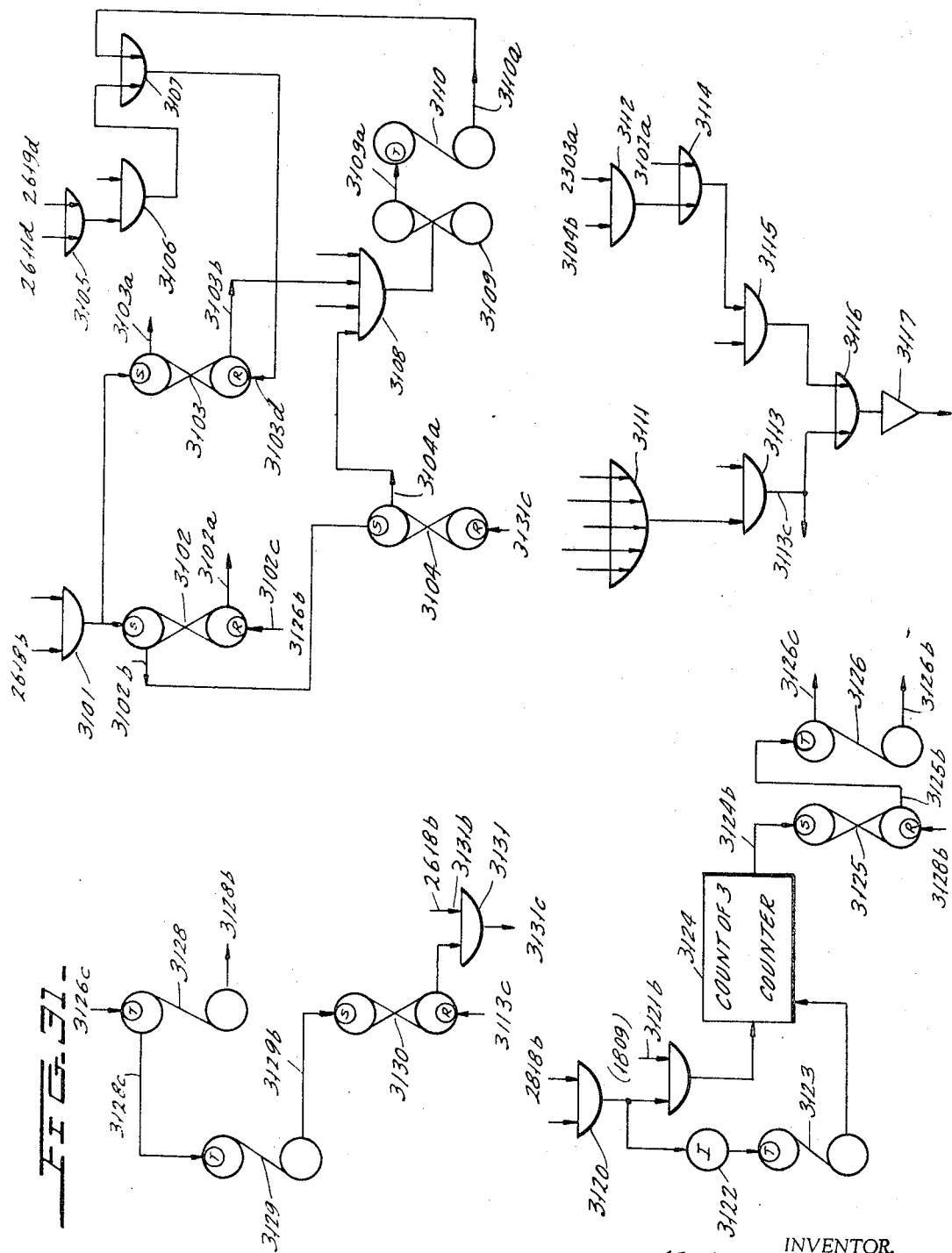

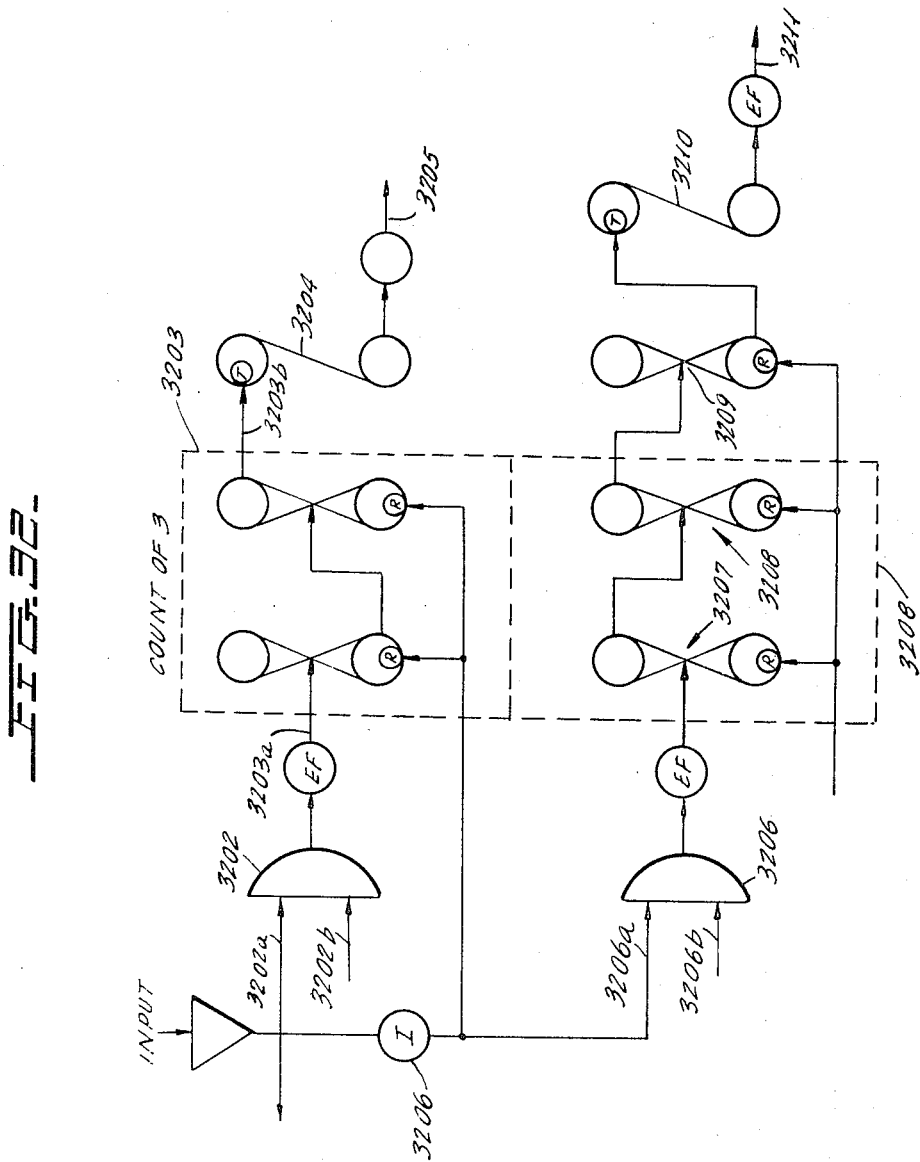

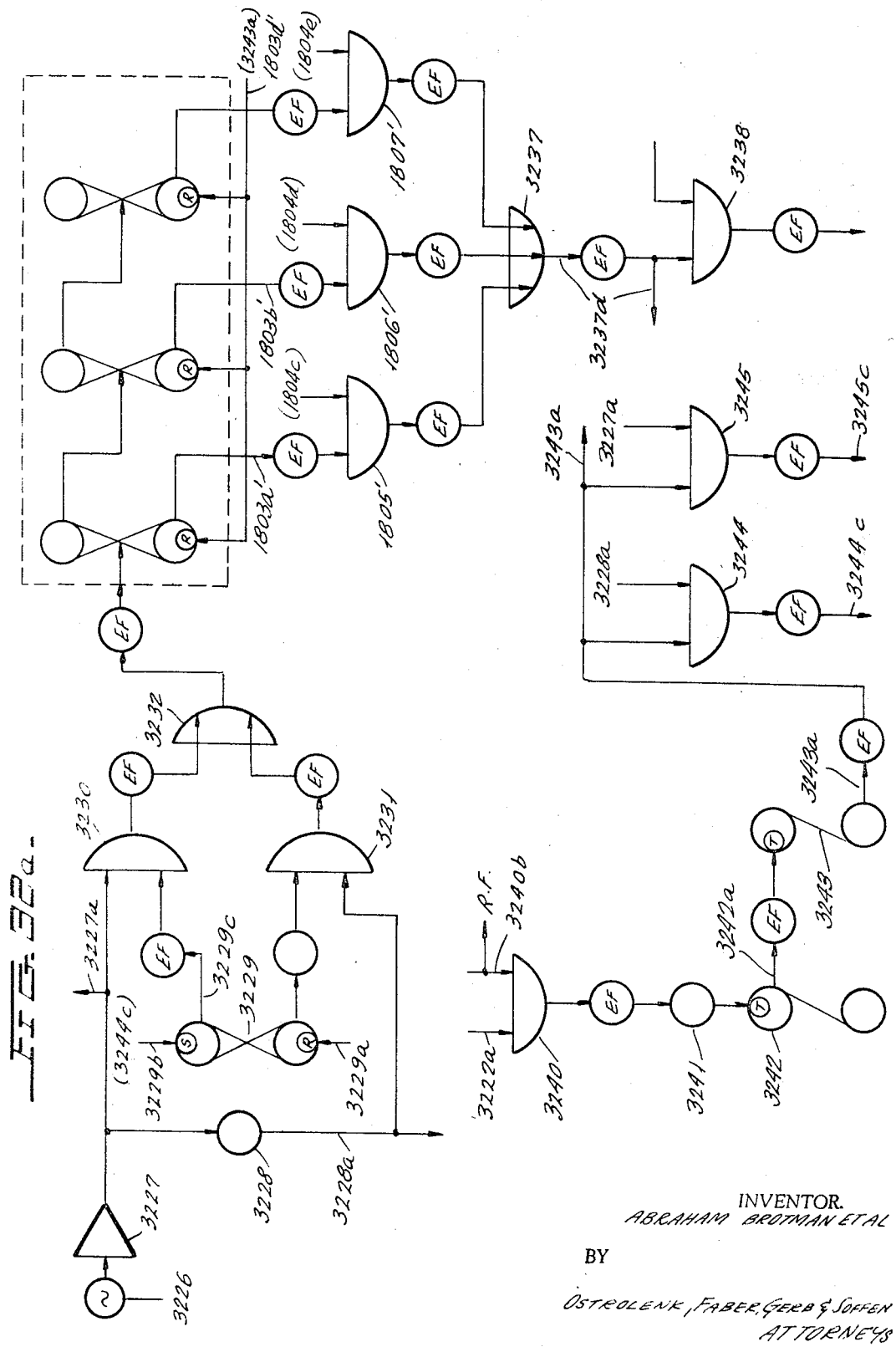

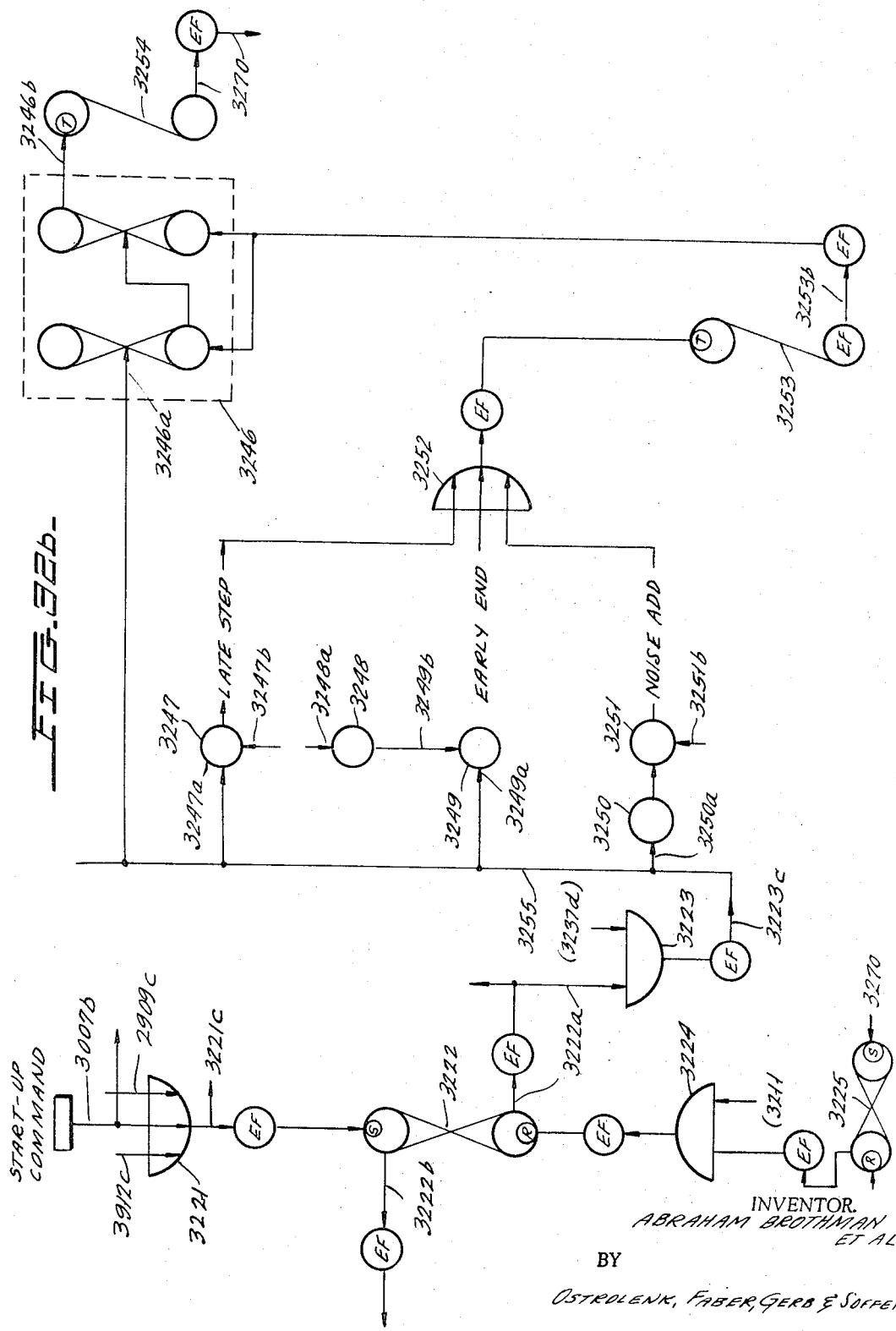

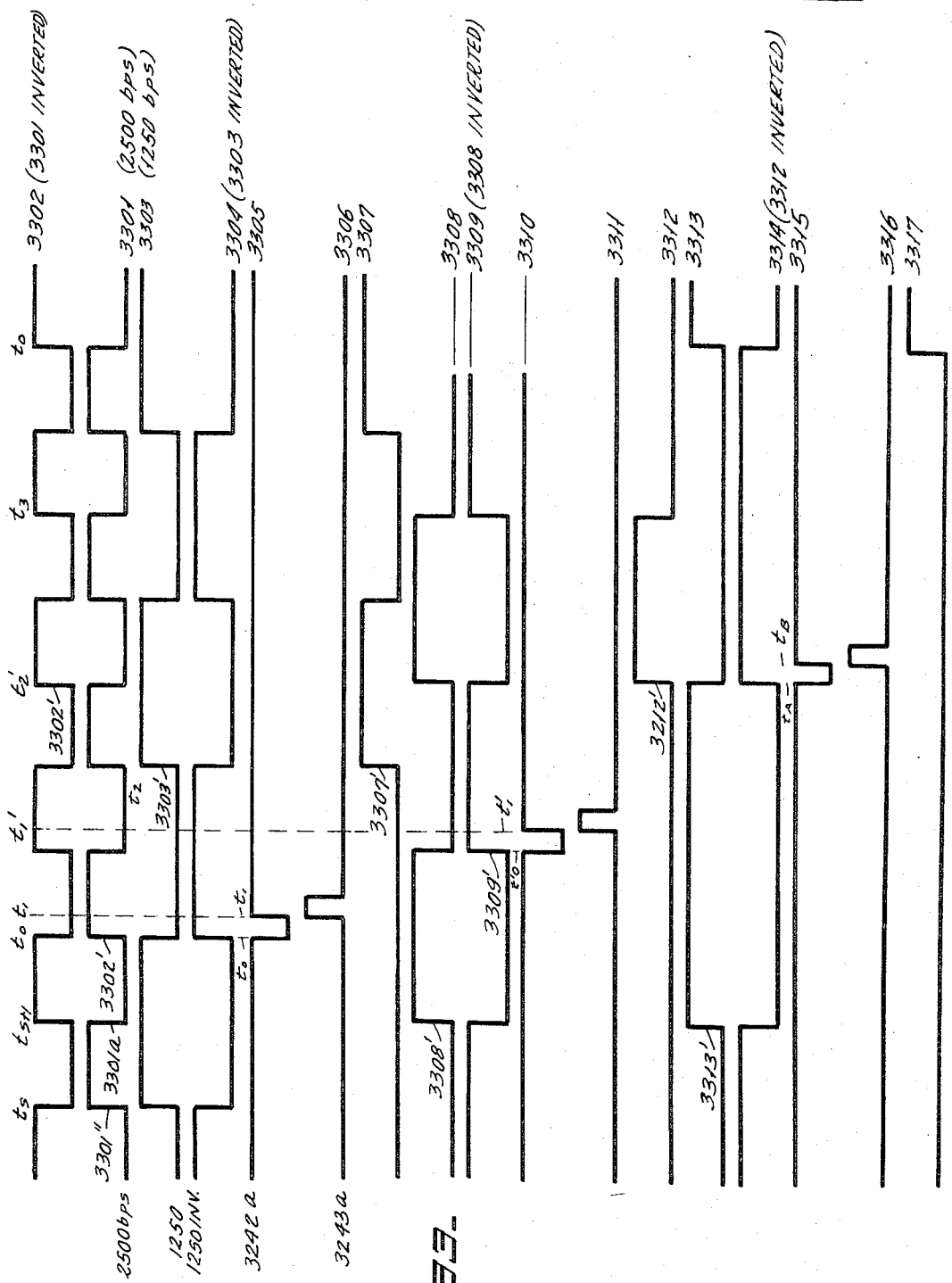

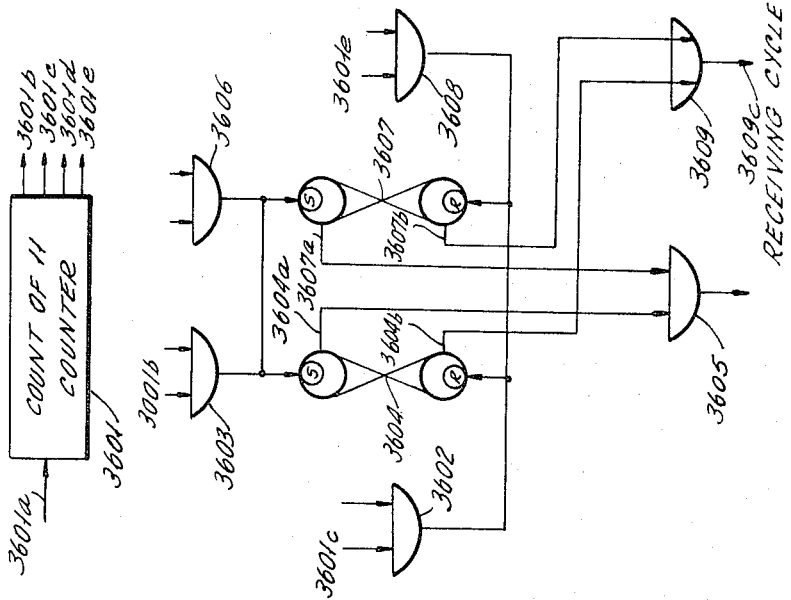
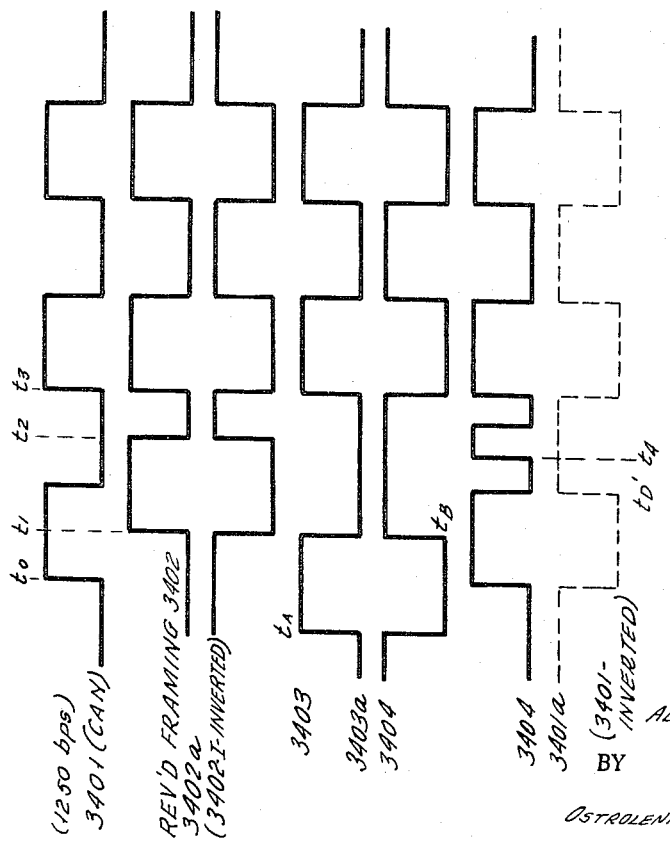

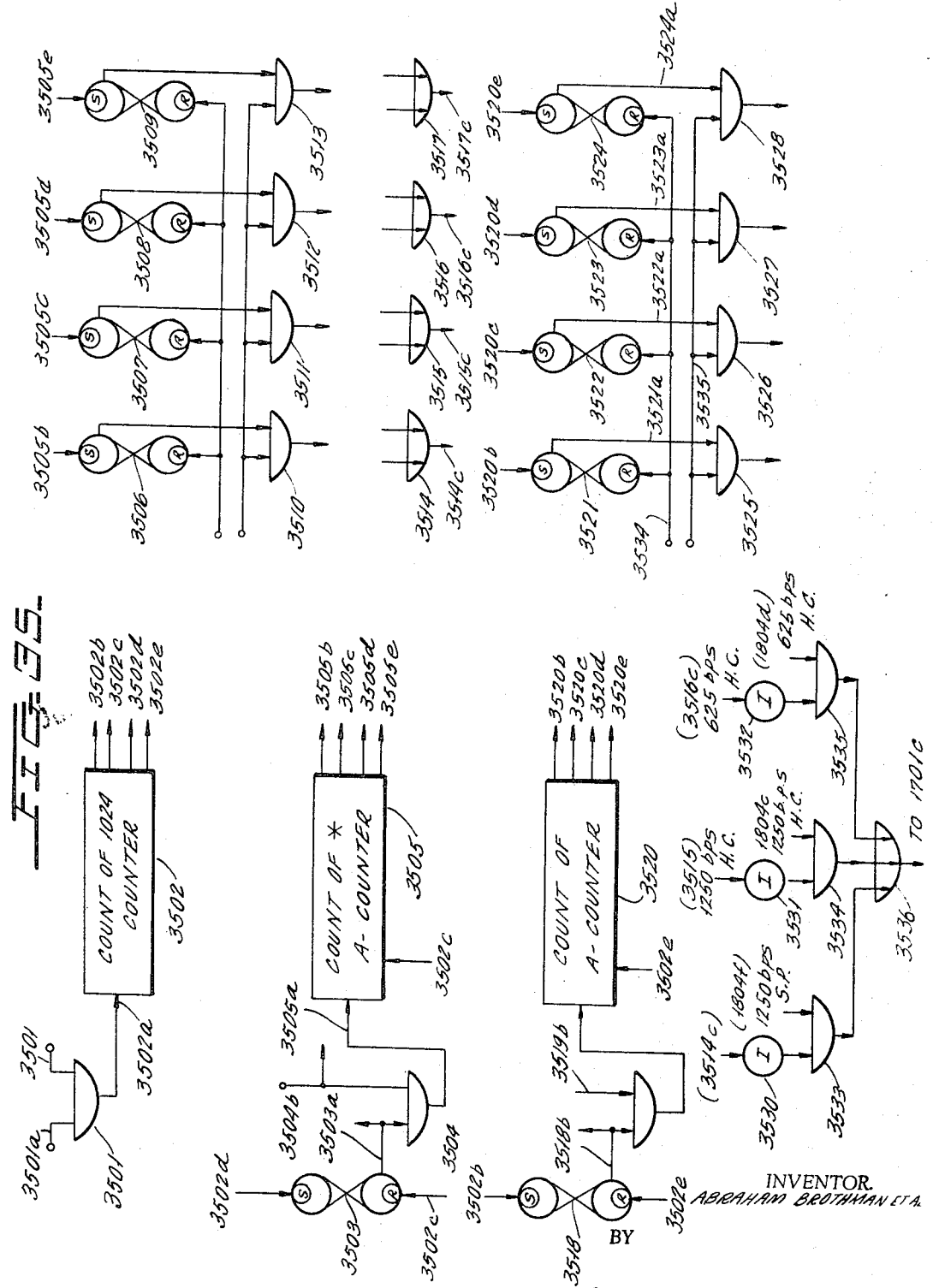

---

3,449,716
DIGITAL SELF-OPTIMIZING TERMINAL
Abraham Brothman, Dumont, N.J., Stephen Halpern, Forest Hills, N.Y., and Richard D. Reiser, Newark, Bruce A. Cuddeback, Passaic, N.J., and Allen H. Miller, Laurelton, N.Y., assignors, by mesne assignments, to Sangamo Electric Company, Springfield, Ill., a corporation of Delaware
Filed May 9, 1963, Ser. No. 279,107
Int. Cl. G06f 11/10; H03k 17/02
U.S. Cl. 340—146.1                    14 Claims This invention relates to communications systems and more particularly to receiver controlled communications systems having means for performing error detection and error correction upon received data signals and having further means for initiating at the receiver end and providing at the transmitter end a variety of different error correcting codes and information bit rates depending upon the existing short term and the long term communications link conditions.

Data, in the form of electronic signals, which is transmitted through some medium between two remote points, is subjected to being altered, due to noise phenomenon present in either the transmitter or receiver equipment or in the medium through which the signals are transmitted. Such noise phenomena fall into the categories of fading, dropout, impulse noise, burst noise and white noise. Detailed descriptions of these noise phenomena are set forth in copending U.S. application Ser. No. 231,078, filed Oct. 17, 1962, now issued Patent No. 3,241,070, entitled Automatic Gain Control System, by Brothman et al., and assigned to the assignee of the instant invention. The occurrence of any or all of the above noise phenomena in intelligence transmission contributes to the difficulty of successful information transmission and reception causing a loss of a substantial portion of the information and intelligence being transmitted, thereby seriously effecting the accuracy and value of the data being transmitted. In order to overcome the effects of such noise phenomena, present day communications systems have been designed to provide error detecting and error correcting schemes so as to improve the accuracy of received data.

One scheme of error detection is that of employing a binary code arrangement for representing alphameric characters wherein a binary code group for each alphameric character contains the same number of binary ones as the binary code group for all other alphameric characters which are to be transmitted, the distinctions between such characters being the bit positions which the binary ones occupy. Such a scheme, which has been fully described in copending applications Ser. No. 241,917, filed Dec. 3, 1962; Ser. No. 238,952, filed Nov. 20, 1962, and Ser. No. 231,078, filed Oct. 17, 1962, while being capable of indicating the occurrence of an error in a single bit position, fails to indicate what may be considered a compensating error. By that, what is meant is, if one of the bits of the bit group should be a binary one and is received as a binary zero, and a second of the bits of the bit group is received as a binary zero and should be a binary one, the code group will still contain the same number of binary ones and will therefore fail to identify the occurrence of such a compensating error.

Present day systems have further been devised so as to be capable of performing error correction upon received data without the necessity for confirming the accuracy of the corrected data with the transmitting location. Such error correcting schemes, however, are quite complex, requiring a circuitry which effectively reaches the level of complexity of large scale computer systems, thus making the adoption and use of such error correcting schemes quite complex and quite expensive, thereby effectively prohibiting their use.

The device of the instant invention provides both error detecting and error correcting schemes, which are capable of performing such operations at substantially high speeds, while at the same time requiring electronic circuits which are far less complex than error detecting and error correcting schemes presently in use.

The apparatus of the instant invention is comprised of means located at a receiver location capable of examining the makeup or structure of each information bit received therein. On the basis of such an examination, each received bit is then appropriately tagged as either a "black" or "white" bit, or a "gray" bit. By that, what is meant is, that each received binary bit is identified either as a binary one, as a binary zero, or as a gray bit, which is not capable of being clearly identified as either a binary one or a binary zero condition. Each of the received binary bits are subsequently placed in storage means capable of storing all of the binary bits representing a transmitted (and hence received) character. Simultaneously therewith, the received binary bits which have been tagged as being gray bits are placed in a second, or gray bits, register or storage means in order to identify those bits which have been tagged as "gray" or ambiguous.

Further means are provided for generating an even parity count in order to determine whether the bits of the received coded character exceed or are less than the prescribed number of binary one bits which should be present for each alphameric character. Means responsive to the parity generating means are provided for determining whether the received code bit group represents a valid character. If it is found that the received code bit group does not represent a valid character, then those bits which are marked as being ambiguous are then converted to their opposite states in order to perform a second parity check and also to determine whether the received bit group now represents a valid character. If the received code group represents a valid character, transmission and reception continues in a normal fashion until the receiver contains a code bit group which after converting the tagged ambiguous bits still represents an invalid character. Means responsive to such an invalid character condition are provided for transmitting an alarm to the transmitter location automatically causing the transmitter facility to transmit vertical parity data. Vertical parity data is defined as a group of binary bits equal in length to the code bit group representing an alphanumeric character wherein each of the bit positions of the vertical parity code bit group represents an even parity count for the associated bit position of a predetermined number of transmitted coded character groups. The transmitter is provided with means for generating such vertical parity information on a standby basis in readiness for transmission of such vertical parity information upon the receipt of an alarm signal from the receiver location identifying the receipt of a noncorrectible binary code group.

Further means are provided at the receiver location for generating both a short-term and a long-term link history in order to determine both the long-term and the short-term condition of the communications link. Further means are provided at the receiver location responsive to the link long-term and short-term history in order to direct the transmitter facility to transmit at slower or faster bit rates depending upon the link long-term and short-term history. This arrangement thereby makes it possible to transmit at maximum bit rates if the link long-term and short-term history shows error-free transmission and reception. However, as the link conditions show an increasing frequency of transmission and reception of errored data, the receiver facility has the capability of directing the transmitter facility to operate at any one of a plurality of lower bit rates, in order thereby to insure greater reliability and accuracy of the data being transmitted.

A transmitter facility is provided with means for operating at any one of a plurality of bit rates, which means is directly under control of the receiver facility. When operating at bit rates lower than the prescribed maximum bit rate, the transmitter facility has the further capability of generating Hamming coding arrangements, thereby enabling the receiver facility to handle code groups having greater than one bit position in error and for detecting and correcting such errored bit positions.

In situations where even in the presence of such Hamming coding, the receiver location is incapable of correcting received code groups. The receiver location has the capability of immediately directing the transmitter facility to operate at a lower bit transmission rate. Novel synchronizing means are provided at both the transmitter and receiver locations enabling the transmitter and receiver locations to rapidly sync in at a lower bit transmission rate, thus enabling transmission between the locations to continue at the new bit rate after only a substantially small time duration during which the synchronizing operation occurs.

In examining each received binary bit as it arrives from the transmitter location, the number of Nyquist intervals of each received binary bit is counted. A Nyquist interval is defined as the smallest interval of a bit period which can be unambiguously resolved as to its identity. For example, assuming the communications system to be operating at a frequency of 60 cycles per second, then the length of each transmitted bit is $\frac{1}{60}$ of a second. In this period a sinusoidally varying waveform completes a full cycle of operation. The Nyquist interval is defined as half the length of a full cycle for a sinusoidally varying wave, or in the example given, $\frac{1}{120}$ of a second. Thus, if the maximum operating frequency of the system is 60 cycles per second, each full cycle therefore contains two Nyquist intervals, each of which intervals may be in the binary zero or the binary one state. While a 60 c.p.s. carrier is being considered in this example, it should be understood that carriers of any frequency may be employed and the carrier frequency selected herein is merely exemplary.

The state of each Nyquist interval contained in a bit interval is determined and a count of the binary one conditions of each Nyquist interval is generated and in any case, when the number of Nyquist intervals in the binary one state is less than two or more than zero, in the example given, the received bit being examined is tagged as being gray or ambiguous. The choice is then made arbitrarily to identify this bit in the coded character group storage register as a binary zero and to identify the questionable bit position in the gray bits storage register as being gray, or ambiguous. The number of binary one Nyquist intervals counted by the means which examine each received bit is transferred to a permanent storage means which has the capability of keeping a weighted average of the received bits. The weighted average is then utilized to cause the transmitter facility to operate at slower or faster bit rates depending upon the relative presence or absence of errored bits in the received data. Depending upon the bit rate at which the communications system is operating at any given time, additional means are provided which are responsive to the weighted average being kept in order to direct the transmitter location to operate at greater or slower bit rates.

It is therefore one object of the instant invention to provide a communications system having novel means for performing error detection and error correction upon received data.

Another object of the instant invention is to provide a communications system having novel means for examining received code bits in order to identify such received code bits as being "black," "white," or "gray."

Still another object of the instant invention is to provide a communications system having novel means for controlling the communications system bit transmission rate, upon the occurrence of errors beyond the correction capability of the system.

Still another object of the instant invention is to provide communications systems having novel means for examining the Nyquist intervals of each bit received to determine whether such received bits are "black," "white," or "gray" and further, to generate a weighted average representative of the communications link short-term history in order to control the bit transmission rates of the system.

Still another object of the instant invention is to provide a communications system having novel means for generating a link history utilized to correct errored data bits within the correction capability of the system.

Another object of the instant invention is to provide a communications system having novel means for controlling the correction of errored data bits received depending upon the link short-term history.

Still another object of the instant invention is to provide a communications system having novel means for controlling the correction of errored data bits at the receiver location depending upon the communications link long-term history.

Another object of the instant invention is to provide a communications system having novel means for altering the bit transmission rates at both the transmitter and receiver locations.

Still another object of the instant invention is to provide a communications system having novel means for altering the bit transmission rates at both the transmitter and receiver locations of the system and further, to synchronize transmitter with receiver at the new bit transmission rate.

These and other objects of the instant invention will become apparent when considering the accompanying description and drawings in which:

FIGURES 1a and 1b represent waveforms for the purpose of describing the underlying principles of the instant invention.

FIGURES 2a–2c set forth the charts employed for determining the blackness, whiteness, or grayness of received data bits for three different bit transmission rates.

FIGURE 3 is a block diagram of the receiver location Nyquist interval counting circuit.

FIGURE 4 shows the gating circuits employed for zero and one bit detection for three distinct bit transmission rates.

FIGURE 5 shows the logical gating circuits employed for gray bits detection for three different bit transmission rates.

FIGURE 6 shows the timing circuit employed in the generation of the Nyquist interval weighted averaging means.

FIGURE 7 is a block diagram showing the Nyquist interval count intermediate storage means.

FIGURE 8 shows the weighted average summing means.

FIGURE 9 shows the dividing circuit employed in the Nyquist interval weighted average generating means.

FIGURE 10 shows the binary to decimal conversion means of the Nyquist interval weighted average generating means.

FIGURE 10a is a schematic diagram of the round-off scheme employed in the Nyquist interval weighted average generating means.

FIGURE 11 shows the logical circuits employed for generating reduced bit transmission rate requests at the receiver location.

FIGURE 12 shows the receiver storage register employed for storing the binary bits representing a coded character and showing the receiver location parity generating means.

FIGURE 13 shows the receiver location gray bits register.

FIGURE 14 shows the gray bits correction circuitry.

FIGURE 16 shows the vertical parity receiving and gray bits correcting means.

FIGURE 16a is a logic diagram showing one compare circuit employed in the vertical parity correction circuitry in greater detail.

FIGURE 17 shows the receiver supervisory logic circuit employed for generating bit transmission rate requests to be transmitted to the transmitter location.

FIGURE 18 shows the receiver facility clock pulse generating means.

FIGURE 18a shows a plurality of waveforms useful in describing the operation of FIGURE 18.

FIGURE 19 shows an alternative embodiment of characters receiving register of FIGURE 12 modified to accommodate Hamming coding operations.

FIGURE 20 is an alternative embodiment of the gray bits register of FIGURE 13 modified to accommodate Hamming coding operations.

FIGURE 21 is a circuit diagram showing the Hamming coding check bit generating means and error locating means.

FIGURE 22 is a logic diagram showing the gating circuits employed during the correction phase of the Hamming coding operation.

FIGURE 23 is a logic circuit diagram showing the transmitter facility showing the data readout and check bit generating means.

FIGURE 24 is a logic circuit diagram showing the transmitter vertical parity generating means.

FIGURE 25 is a logic circuit diagram showing the transmitter clock pulse regulating means.

FIGURES 26a and 26b are circuit diagrams showing the transmitter command identifying circuits and the change of speed control circuitry which cooperates with the receiver facility speed change control circuitry.

FIGURE 27 is a block diagram showing the memory means employed in the transmitter facility.

FIGURE 28 is a logic diagram showing the selection circuitry for controlling the information transmitted by the transmitter facility.

FIGURE 29 is a logic diagram showing speed change circuitry at the receiver facility.

FIGURE 30 is a logic diagram showing the circuitry for determining the operating speed of the transmitter and received facilities which is located at the receiver facility.

FIGURE 30a is a logic diagram showing the tone generating means for the speed change means of the speed change circuit located at the receiver facility.

FIGURE 31 is a logic diagram showing a portion of the framing circuitry employed in the speed change means at the receiver facility.

FIGURE 31a shows a plurality of waveforms employed to describe the framing operation.

FIGURE 32 is a logic diagram showing another portion of the framing circuitry to be employed with the circuit of FIGURE 31.

FIGURE 32a is a logic diagram showing the receiver facility clock pulse source together with the circuitry for modifying the pulse rate of the output clock pulses.

FIGURE 32b is a logic diagram showing still another portion of the framing circuitry employed with FIGURES 31 and 32.

FIGURES 33 and 34 show a plurailty of waveforms employed to describe the synchronizing operation of the circuit of FIGURE 32a.

FIGURE 35 shows the long-term history logic of the receiver facility.

FIGURE 36 is a logic diagram showing the cycle determining means of the receiver facility.

UNDERLYING PRINCIPLES

Figure 15:
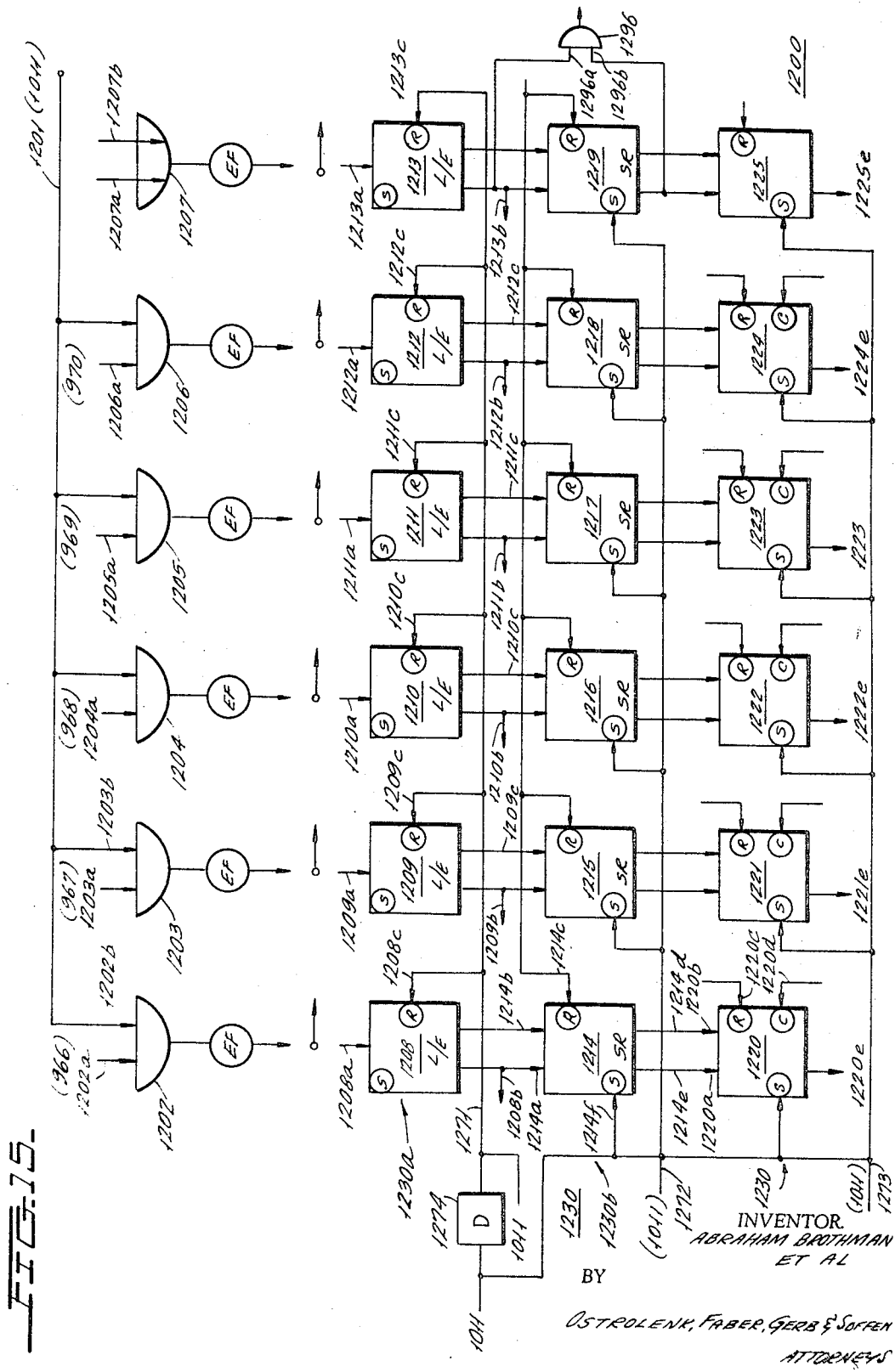
FIGURE 15 shows the storage means capable of storing a plurality of received coded character groups.

The concept of the instant invention is base on the principle that the smallest unit of transmitted or received binary information hereinafter designated as the bit, is in turn divisible into constituent "information intervals." In accordance with the Nyquist interval principles the information intervals which comprise a bit interval are equal in length to a ½ cycle of the communications system carrier frequency. Thus any bit interval can be said to be comprised of X "information intervals." It should also be understood that noise phenomenon, such as, for example, white noise, impulse noise, burst noise, drop-out and fading, can effect, during the transmission of such information, the bit interval, or in the alternative, some portion of the bit interval, such that, during any given bit interval, noise phenomenon may alter the binary state of X–Y "information intervals," where Y designates the number of "information intervals" within a bit interval which are inverted from their intended status where Y is equal to or less than X, i.e., where Y is a real integer representing all, or a portion, of the "information intervals" within a bit interval.

Referring now to the drawings; FIGURE 1a portrays a typical bit interval of time duration T as portrayed by waveform 10. Waveforms 10 and 11 are both representative of a binary one bit which is transmitted during the bit interval T. This can be seen to be a relatively square pulse of duration $t_4-t_0=T$ and of amplitude $+E$. A binary zero condition transmitted during the bit interval T is represented by waveform 12 which shows that during the bit interval T a voltage level of zero or reference potential is transmitted. Another way of considering this, is to consider that no signal at all is transmitted during the bit interval T in order to represent a binary zero condition. Let it be assumed that a binary bit is conveyed by two cycles of a sinusoidally varying carrier frequency. Considering the Nyquist interval rate, it can be seen that the bit interval T would then be comprised of four half cycles of the carrier frequency and thereby would be comprised of four Nyquist "information intervals." Each of the four intervals are, as previously described, one-half cycle in length and each of these intervals designated by the numerals 1, 2, 3 and 4 are threfore equal in length to one another.

Therefore, examining the bit interval of waveform 11, for example, from the "information interval" viewpoint, waveform 11 [i.e., square pulse 11] can be considered to be a binary one bit which is in the binary one status in all of its four "information intervals." Likewise, examining waveform 12 from the "information interval" viewpoint, it can be said that waveform 12 represents a binary zero bit which is consistently in the binary zero status in each one of its four constitutent "information intervals." Considering waveform 13, however, it can be said that we have a "split-bit" condition wherein the bit represented by waveform 13 is in the binary one state for the first, third and fourth [i.e., three information] intervals and is in the binary zero state during its second information interval.

Since the waveforms 11–13 all represent the output signals of a communcations line which is subjected to the erroring modes of FIGURE 1b, each of the received data bits 11–13 is in reality subject to two mutually exclusive interpretations. These are:

For the cases of waveforms 11 and 12:

That all four information intervals have been erroneously received, or

That all four information intervals have been correctly received, and

For the case of waveform 13:

That the three binary one state information intervals are correct information, while the one binary zero state interval is errored, or That the three binary one state information intervals are errored information while the one binary zero state interval is correct.

The above interpretations can be seen from a consideration of FIGURE 1b. As as first assumption, let it be first considered that a binary zero bit has been transmitted from the transmitter location. This binary zero bit is represented by the line 15. However, due to noise phenomenon in the line, the noise may inject itself into the transmitted information in such a way as to alter the binary zero bit so that it is received as a binary one bit wherein the noise alteration is represented by the dashed-line 17. This receipt at the receiver location of a binary one condition therefore lends itself to the two interpretations, namely, that it is either correct in all four of its information intervals and truly represents a binary one bit, or secondly, that it is incorrect in all four of its information intervals and was intended at the transmitter location to represent a binary zero condition, but was altered due to noise injected into the communications link.

The other conclusion which can be drawn is the situation wherein the transmitter loaction transmits a binary one condition represented by the line 16, which during transmission thereof is altered due to noise phenomena so that it is received as a binary zero bit represented by the line 15, wherein the change is represented by the dash-line 18. The receipt of the binary zero condition is likewise capable of two interpretations, namely, that it is either correct or incorrect in all four of its information intervals.

In the case of the waveform 13 of FIGURE 1a, it can therefore be concluded from the two examples given above, that the three binary one state information intervals are correct and the one binary zero state interval is incorrect, or alternatively, that the three binary one information intervals are incorrect and that the one binary zero interval is correct.

Therefore, if $p$ designates the probability that an information interval will be received in error and if $q$ represents the probability of an information interval being received properly, then for a bit which is composed of $n$ information intervals of which $x$ are received in the binary one state and $n-x$ in the opposite, or binary zero state, then the equations $$p^x q^{n-x} \quad (1)$$

and $$p^{n-x} q^x \quad (2)$$

designate the intrinisic probabilities of the two naturally exclusive explanations or interpretations of the observed event. Since, as previously stated, the explanations for the observed event are mutually exclusive, a further probability calculation is in order and this is the probability that one or the other of the two explanations or interpretations is the cause of the observed event. Hence the probability of the argument which is expressed by $p^x q^{n-x}$ is $$\frac{p^x q^{n-x}}{p^x q^{n-x} + p^{n-x} q^x} = P_1 \quad (3)$$

while $$\frac{p^{n-x} q^x}{p^x q^{n-x} + p^{n-x} q^x} = P_2 \quad (4)$$

is the probability of the second argument as the true cause of the observed event.

To resolve the probabilities $P_1$ and $P_2$ as practical quantities for decision purposes involves the maintaining of a continuously updated record of $p$ at any specified bit transmission rate at which the communications link is operating. The weighting and interpretation of such a record raises the question of the relative weighting of recently acquired and old data. However, before this problem is explored, an application of the general theory to a communications system employing a 2500 c.p.s. carrier frequency which is utilized at the 1250, 625 and 312.5 bit transmission rates at discrete values of $p$ is illustrated in FIGURES 2a–2c.

In each of these aforementioned charts, such as, for example, the chart of FIGURE 2a, the first row of chart I represents for each column the probability $p$ that $x$ of the information intervals received are errored. Thus in chart I column 101 gives the probability that all of the information intervals have been received correctly [$p=0$], the notation 102 gives the probability that all of the information intervals have been received correctly only 50% of the time [i.e., $p=0.5$] and notation 103 represents that all of the information intervals have been received incorrectly 100% of the time [i.e., $p=1.0$]. The letter C indicates a correct information interval and the subscript accompanying the letter C represents the number of information intervals which are correct. Likewise the letter W designates an incorrect information interval and the subscript accompanying the letter W represents the number of incorrect information intervals received. Thus, turning to chart I of FIGURE 2a, it should first be noted that this chart was prepared for the 1250 bit transmission rate for a communications system operating at a 2500 c.p.s. carrier frequency. In a bit rate of 1250 bits per second each bit interval is comprised of two Nyquist information intervals. Thus row 104 represents the receipt of bits which are correct in two intervals where the parentheses to the right of the $C_2$ represent the receipt of the two information intervals being either in the binary one state or the binary zero state. Row 105 represents the receipt of bits wherein one information interval is wrong $W_1$ and the other information interval is correct $C_1$. Row 106 represents the receipt of bits which are wrong in both intervals $W_2$.

Thus in each of the charts shown in FIGURES 2a–2c the designation $W_x C_{n-x}$ implies wrong in $x$ information intervals and correct in $n-x$ information intervals of a bit which is comprised of $n$ such Nyquist information intervals. Following each such designation as previously described is a sample of a bit to which the designated interpretation could be applied. In each box of the chart there appears the probability that, under the given "record" value of $p$ for the communications link that the designated explanation of the observed event will be the "true explanation." Considering all of said charts I–III the cross-hatched area of each chart is designated as the "gray" region of information. These have arbitrarily been selected as the bit formats for which the designated explanations have a probability of less than 0.9 of being correct.

As one example of the uses of the above charts in practical situations, assume a communications link that is operating at the 312.5 bit per second bit transmission rate. Under these operating conditons, let it be assumed that a bit has arrived at the receiver location in which five of the eight information intervals are in the binary one state. Let it further be assumed that this event coincides with a "record" value for $p$ of 0.375 [i.e., that 0.375 of all information intervals received to the present instant have been incorrect], the interpretation therefore that the bit having five of its eight information intervals in the one state should be identified as a binary one bit in which three of its information intervals therefore are errored and that five of its information intervals are correct. Then the probability of this assumption is 0.74, as can be seen from chart III of FIGURE 2c which value is given at the intersection of a row representating three wrong information intervals and five correct information intervals which intersects with the probability of 0.375.

Since a probability of 0.74 lies outside of our 0.9 standards for unambiguous information it is then satisfactory to load such a bit into a character receiving memory register as a binary one bit and simultaneously therewith load into an accompanying "gray" bits register a designation of grayness or ambiguity for the given bit.

Conversely, if five of the information intervals of the bit had been in the binary zero state and the remaining three information intervals had been in the binary one state, it then follows the intent of the chart for the bit to be loaded into the character receiving memory register as a binary zero bit and further identifying this bit in the gray bits register with a gray bit tag.

The whole bit receiving process is thus one in which:

Each bit received is loaded into the character receiving memory register according to the binary direction of the bit determined by the majority of the bit information intervals. By that what is meant is, that if a majority of the received information intervals for a bit are in the binary one state and the probability that this interpretation is correct is less than our imposed standard, then this bit is represented in the character receiving memory register as a binary one bit and is tagged in the gray bits register with the gray bit designation. Conversely, if the majority of the information intervals of a received bit are in the binary zero state and the probability that the interpretation imposed upon the bit falls beneath our imposed standard, then this bit is represented in the character receiving memory register as a binary zero bit with its accompanying gray bits tag being placed in the gray bits register.

In cases where exactly one-half of the information intervals are in the binary one state (meaning obviously that the remaining information intervals which are exactly one-half of the total information intervals are in the binary zero state). Such a condition is automatically declared arbitrarily to be a binary zero bit and is tagged with a gray bits designation in the gray bits register.

At this point it is, therefore, important to determine a valid method by which the "record" value of $p$ may be kept. Here let's designate a "weighting factor" which is applied to every measurement of "inconsistency" in a bit. That is, a weighting factor which is applied to the measurement of incorrect information intervals in a given bit interval. Further, let the "inconsistency" of every bit be the number of minority state "information intervals." By this is meant that the "inconsistency" of a bit is the number of information intervals of the binary state which are in the minority. For example, in a bit interval which is comprised of, for example, eight information intervals, let it be assumed that a bit has been received having five information intervals in the binary one state and three information intervals in the binary zero state. The "inconsistency" of this bit would then be three, which is the number of minority state information intervals. In addition thereto, let the "inconsistency" of a bit also be one-half the number of information intervals in a 50–50 bit (i.e. in a bit comprised of 50% binary one information intervals and 50% binary zero information intervals). Under such an arrangement, if $r=1-s$, then $$n_w[1-(r+rs+rs^2+rs^3+ \ldots +rs^{n-2}+rs^{n-1}+rs^n)] =$$

$$n_w\left[1-\frac{r[1-s^n]}{1-s}\right] = n_w s^n$$

[5]

where the term $n_w \times s^n$ is the "residual weight" of a measurement of $n_w$ inconsistent intervals at a time which is $n$ bit times after its arrival.

Referring to chart III shown in FIGURE 2c of the drawings, let it be assumed that the communications link receiver location has received a bit having 50% binary one information intervals and 50% binary zero information intervals and let it further be assumed that this bit is followed by a bit in which there are three elements of inconsistencies [i.e., in which there are three information intervals in one state whereas the five remaining information intervals are in the opposite state]. Let it further be assumed that we will arbitrarily impose the presumption of "grayness" on the second bit received since it differs from the obviously ambiguous bit by only one information interval [i.e. the ambiguous bit has four binary one information intervals and four binary zero information intervals whereas the bit following the ambiguous bit has five information intervals in the binary one state and the remaining three information intervals in the binary zero state and thus differs from the first received bit in only one information interval]. Thus referring to chart III of FIGURE 2c, in order that the second received bit be identified as ambiguous the "record" value of $p$ must be no smaller than 0.375. Accordingly then a bit having an inconsistency of four times its weighting factor, plus a bit having an inconsistency of three times its weighting factor, must equal three. Therefore, using the Equation 5 given above, we have $$4[1-(r+rs)]+3[1-r]=3$$
$$4[1-2r+r^2]+3[1-r]=3$$
$$4-11r+4r^2=0$$
$$r=\frac{11-\sqrt{121-64}}{8}=\frac{11-7.55}{8}$$
$$r=\frac{3.45}{8}=0.431$$

which gives us a "weighting factory" of:

$$1-0.431=s$$
$$\therefore s=0.569$$

In accordance with the above result, the "record" value of $p$ is thus updated after the receipt of each bit of information by a process comprised of the steps of:

(1) Adding the value of $n_w$ for each received bit to the existing "record" value and (2) Multiplying the sum of this addition by the weighting factor $s$.

These steps in the actual embodiment, as will be more fully described, are performed by adding the value of $n_w$ for each received bit to the existing record value and dividing the sum of the addition by two.

USE OF "GRAY" BITS IDENTIFICATION

As described above, it should be noted that two decisions are made for each bit received at the receiver facility, namely, a decision as to the "one-ness" or "zero-ness" of each bit and a decision as to the "grayness" or "not-grayness" of each bit.

The results of the first decision are loaded into a character receiving memory register for inspection by error detecting logic. The results of the second decision are loaded into a "gray bits" register to guide the error correcting logic in correcting errored characters. In addition to the above, by counting the number of "gray" bits in a received character, it becomes possible to first determine whether the possible error lies within or outside of the "correction radius" of the character coding technique and further to determine whether the incidence of characters with excessive "grayness" (i.e., relative to the "correction radius" of the coding) is sufficient to require a shift in transmission to a more secure coding arrangement.

By way of illustration, the "sure" protection of a single parity protected character coding is up to a one bit error; and the "sure" protection of a Hamming three bit redundancy code is up to a two bit error. Under these conditions with a count being kept of the number of gray bits in each character, it becomes possible to exert control over the error correcting logic of the character receiver permitting it to go into operation when, and only when the number of gray bits in a character lies within the "sure" radius of the character coding. Further, if logic is set up to count the number of characters in a block of characters for which the error correcting logic is disabled—with provisions for a preset limit for such disabling actions within a block of characters—the attainment of the preset limit may be employed in the following ways:

(1) A request signal for a shift from single parity coding to Hamming coding at the same bit transmission rate, and (2) A request signal for a shift from Hamming coding to a lesser or slower bit transmission rate.

These steps may be taken as the noise conditions of a communications link grow worse. Similarly, under the conditions of an improving communications link situation, the reduction in the number of gray bits per block of information and/or the reduction in the number of disabling actions to the error correction logic per block of received characters becomes the decision basis for shifting to higher bit rates and/or lower redundancy coding (i.e., a shift from Hamming coding to single parity).

In its ability to control the specific correction actions of the character receiver, the gray bits register and more specifically the gray bits detection capability is in principle the ability to achieve the equivalent of a vertical parity check operation per character without the assignment to such a check of the band width that such a check would normally imply.

CORRECTION ACTIONS

In order to provide correction actions based on the gray bits locations, two parallel storage registers, a character receiving register and a gray bits register of equal bit length, are provided. Both registers are simultaneously loaded so that each gray bit data falls out (i.e., is positioned vertically beneath each corresponding bit of the character receiving register) so as to identify the bit in the receiving reigster immediately above the gray bit as being tagged gray. Further logical circuitry is also provided to recognize the presence in the character receiver register of two or more error detecting logics, depending on the number of possible character codings. By that is meant the presence of two or more possible valid codes at the same time in the character register whereas only one such valid code should be present at any given instant. Further logic is provided for the purpose of identifying two or more error correcting logics which again depends on the number of possible character codings and the presence of a gray bits counting circuit which counts the number of gray bits in a character and which exerts enabling or disabling control over the error correcting logics according to which logic is being used.

Most significant in the error correction operation is the provision of a special shift register element in the character receiving register having the ability to respond to three pulsed inputs rather than the conventional two pulsed inputs to which present day shift registers are normally responsive. Thus to the normal shift and reset pulses employed to pulse a shift register there is a capability of a third pulse to which the shift register is responsive and upon receipt of such a pulse the shift register has the capability of inverting the status of the binary bit stored in that position of the shift register.

The operation is such that upon the receipt of coded characters, both the gray bits and the character registers are loaded until an end of character signal is developed. When the end of character signal occurs the pertinent error detecting logic is "consulted" and it in turn develops a signal indicating whether an error exists. If error is indicated the pertinent control output of the gray bits counting circuit is "consulted" to indicate whether the error lies within the "correction radius" of the character coding. If the error does lie within the coding "correction radius" the pertinent error correcting logic is signaled to go into operation.

With the typical instances of single error correcting logic and double error correcting logic the modes of operation are as follows:

(a) Single error correcting logic

Upon the occurrence of a signal indicating the presence of an error simultaneously with the occurrence of a signal indicating that the error lies within the coding "correction radius" a correction signal is generated and is simultaneously employed to energize the bit correction circuit and the receiver facility parity generating circuit.

Each bit correcting gate is of two input AND logic to which an output of the gray bit register is one input and the correction pulses is the second. The output of each such gate feeds the correction input terminal of the corresponding stage of the character receiving register. Accordingly by the correction of the parity counter to take the bit correction into account by the inversion of the bit identified as gray in the character receiving register, a correction action is taken. Under given circumstances the then corrected character in the character receiving register can be "tested" upon completion of the correction action.

(b) Double error correcting logic

As in the case given immediately above, a signal is generated to cause the bit in the character register tagged as gray to be inverted. However, since two bits in the character register have been tagged as gray there are any one of four possible combinations which may be employed to correct the character being operated upon, namely, only one of the gray bits may have to be inverted, or the other of the gray bits may have to be inverted, or both of the gray bits, or neither of the gray bits may have to be inverted. It should be noted, however, that the choice that neither have to be inverted is not a valid choice since if this were true that would meant that a valid character is stored in the character receiving register, while to the contrary the error detecting logic shows that an invalid character is stored in the characters receiving register. In order to make corrections in the character receiving register for characters containing two such gray bits, Hamming coding and supervisory logic circuits must be employed, which schemes will be more fully described.

DESCRIPTION OF THE ERROR DETECTING AND ERROR CORRECTING MEANS

FIGURE 3 shows the Nyquist interval counting circuit 300 employed for the purpose of counting the number of Nyquist information intervals within a bit interval which are in the binary one state. The circuit 300 is comprised of an input terminal 301 for receiving square wave pulses represented by the waveform 302 and is provided with a second input terminal 306 for receiving the carrier frequency signal after it has been fullwave rectified, as shown by the waveform 303. In the example given it will be assumed that the carrier frequency is 2500 c.p.s. and that the bit rate at which the information interval counting circuit 300 is being operated is the 1250 bit per second speed. Thus the clocking signal represented by waveform 302 is comprised of a train of square pulses wherein each square pulse is separated from the next succeeding square pulse by a time duration of T. It can be seen from a consideration of waveforms 302 and 303 that two half cycles, such as for example, the half cycles 307 and 308, occur during the time in which square pulse 309 is being transmitted. The binary data bits received at the receiver location from the remote transmitter location (not shown) are impressed upon the input terminal 310. It should be understood that the received data bits may have been modified by noise injected into the link and this indeed is the function therefore of the Nyquist interval counting circuit 300 to determine the number of binary one Nyquist intervals in each bit interval of the bits being received. The square clocking pulses, such as, for example, the square clocking pulse 309 are impressed upon one input terminal 311a of AND gate 311 while the receive data bits are impressed upon the input terminal 311b of AND gate 311. The simultaneous occurrence of a binary one condition at these terminals cause AND gate 311 to generate a binary one condition which is impressed upon the input terminal 321 of a pulse AND gate circuit 320. The pulse AND gate 320 generates a voltage spike such as the voltage spike 327 at its output terminal upon the receipt of binary one square pulses at its input terminals 321 and 322 with the further proviso that the square pulse impressed upon the input terminal 322 precede the square pulse impressed upon the input terminal 321 by a predetermined time period. A detailed description of the pulse AND gate can be found in copending application Ser. No. 241,917, entitled Data Receiver, filed Dec. 3, 1962, by A. Brothman et al., and assigned to the assignee of the instant invention. As a further aside, it should be noted that substantially all of the logical gates employed in the instant invention are likewise described in detail on pages 12–26a of the aforementioned application and these descriptions are hereby incorporated in the instant application by reference thereto.

Simultaneously with the receipt of the clocking signal square pulses represented by waveform 302 and the receipt of incoming data bits which are impressed upon input terminal 310, the full-wave rectified carrier frequency represented by waveform 303 is impressed upon input terminal 306 where it is first amplified by amplifier circuit 312 and then impressed upon the input terminal 315 of a monostable multivibrator 314. The function of the multivibrator 314 is to produce a square pulse represented by waveform 316 at its output terminal 317 in response to a positive-going voltage being impressed upon its input terminal 315. The pulse width of the pulse 316 is independent of the positive-going signals impressed upon its input terminal 315 with the proviso that the pulse width of pulse 316 is shorter in pulse duration than the distance between the leading edges of the full-wave rectified pulses, such as, for example, the leading edge of the half cycle pulses 307 and 308. Thus, monostable multivibrator 314 generates a pulse 316 at its output terminal 317 each time it receives the leading edge of a half cycle pulse, such as, for example, the half cycle pulses 307 and 308. The square pulses, such as, for example, the square pulses 316 are impressed through emitter follower 318 upon the input terminal 322 of pulse AND gate 320 which generates output spikes, such as, for example, the output spike 327, which in turn is impressed upon the input terminal 326 of a count-of-nine counter circuit 325. The count-of-nine counter circuit 325 has a first group of output terminals C0–C8, only one of which terminals are in the binary one state at any given instant. The terminal which is in the binary one state provides an indication of the number of Nyquist information intervals which are in the binary one state during each bit interval. Simultaneously therewith counter 325 is further provided with a group of output terminals B1–B3 which are provided for generating a binary coded decimal representation of the number of binary one Nyquist information intervals present during a bit interval. The correlation between the decimal output represented by the terminal group, that is, C0–C8 and the binary coded decimal terminal group B1–B3 is shown by chart 330. For example, if the count-of-nine counter has counted four Nyquist information intervals in the binary one state then the output terminal C4 will be in the binary one condition while the output terminals C0–C3 and C5–C8 will be in the binary zero state. Simultaneously therewith, as can be seen from chart 330, output terminals B1 and B2 will be in the binary zero state and output terminal B3 will be in the binary one state representative of a count-of-four Nyquist information intervals. However, the binary coded decimal representation of the Nyquist information interval count represents the number of minority intervals present during a bit interval. For example, let it be assumed that a bit interval is comprised of eight Nyquist information intervals and let it further be assumed that the incoming bit upon examination has been shown to be comprised of six binary one Nyquist information intervals and two binary zero Nyquist information intervals. Under this condition counter 325 will provide a binary one output at its C6 terminal and simultaneously therewith the output terminal group B1–B3 will generate a binary coded decimal representation for the decimal number 2, as can be seen from the chart 330. Thus, it should be understood that the binary coded decimal representation generated by counter 325 produces an output representing the number of minority intervals present during a bit interval. This means that if six information intervals out of a total of eight are in one binary state, then there are two remaining intervals in the opposite binary state. These remaining intervals which are always less than ½ of the total intervals are designated as the minority intervals.

The operation of the Nyquist interval counting circuit 300 is as follows:

Let it be assumed that the bit tarnsmission rate is 1250 bits per second and the carrier frequency is 2500 c.p.s. and further that the bit received at the tone input channel 310 is shown by waveform 331. Thus considering waveforms 331 and 302 at time $t_0$, terminals 311a and 311d of AND gate 311 are in the binary one state causing a binary one level to be impressed upon the input terminal 321 of pulse AND gate 320. Likewise at time $t_0$, the leading edge of half cycle 307 is impressed upon multivibrator 314 causing it to pulse input terminal 322 of pulse AND gate 320 with pulse 316. This causes pulse AND gate 320 to generate a spike 327 substantially at time $t_0$ causing the count-of-nine counter 325 to increase its count by one. It should be understood that the counter 325 prior to the receipt of bit 331 has been reset so that its output terminal C0 is in the binary one state. Therefore, upon the receipt of voltage spike 327 at time $t_0$ counter 325 operates to provide a binary one output at its terminal C1. At time $C_a$ halfway between $t_0$ and $t_1$ the leading edge of square 308 is impressed upon multivibrator 314 which impresses a second square pulse AND gate 320. At time $t_e$ square pulse 309 and data bit 331 are still in the binary one state so that AND gate 311 remains in the binary one state. The occurrence of binary one conditions at both input terminals of pulse AND gate 320 causes counter 325 to increase its count by one. This causes terminals C2 to go to the binary one state. Since the circuit is operating at the 1250 bit per second transmission rate each bit contains only two Nyquist information intervals. Thus the outputs generated by the binary coded decimal output terminals B1–B3 are shown by chart 340 so that the minority count occurring at the time when terminal C2 is at the binary one level is zero, as shown by chart 340. This simply means that both Nyquist information intervals are in the same state. It should further be noted with respect to pulse AND gate 320 that the monostable multivibrator 314 has an inherent delay time so that the binary one signal from AND gate 311 which is impressed upon input terminal 321 of pulse AND gate 320 will always occur before the square pulse 316 generated by multivibrator 314. The output signals from terminal group C0–C8 and B1–B3 are employed during the error detection and error correction process, in a manner to be more fully described.

Input terminal 301 of counting circuit 300 is further impressed upon the input terminal of an inverter circuit 332 which inverts the square pulse clocking source, shown by waveform 302 such that during the time interval $t_0$–$t_1$ the output of inverter 332 is binary zero. From the time interval $t_1$–$t_2$ the output of inverter circuit 332 is binary one, and so forth, whereby it can be seen that the output of inverter 332 is always in the opposite state of the waveform 302. It can therefore be seen that the leading edge of pulse 334 of waveform 333 occurs at the end of a bit interval, that is, occurs at time $t_1$ and remains in the binary one condition between time $t_1$ and $t_2$, which is the time period T between adjacent bit intervals which will hereinafter be designated as the dead interval. The leading edge of square pulse 334 is used to trigger a monostable multivibrator 335 which generates an output pulse 336. The length of this output pulse is D and after this time length or delay period D the trailing edge of square pulse 336 is used to trigger a second monostable multivibrator 337 so as to generate a square pulse 338 the leading edge of which occurs at time D seconds after time $t_1$. This square pulse 338 is impressed upon the reset terminal 339 of counter 325 causing the counter 325 to be reset to show a count of zero. It should be noted that the delay period D is less than the length T of a bit interval so that the count-of-nine counter 325 is reset to zero at a time prior to the receipt of the next data bit to be examined. The square pulse 338 also appears at the output terminal 341 and is used as a timing pulse for other circuits of the error detection and correction means in a manner to be more fully described.

The zero and one bits detection circuitry 400 is shown in FIGURE 4 and is employed for the purpose of detecting the presence of a binary one bit for each of the bit transmission rates of 1250 bits per second, 625 bits per second and 312 bits per second, respectively. As was previously described, the presence of a binary one bit at any bit transmission rate will be recognized as a situation in which a majority of the information intervals occurring during a bit interval are in the binary one state. Thus, for example, at the 1250 bit per second transmission rate, two binary one information intervals must be received during the bit interval. This causes the counter 325 of FIGURE 3 to generate a decimal count of two at its output terminal C2. This is impressed upon the input terminal 408a of AND gate 408 which is employed for the purpose of detecting the presence of a binary one bit. It should be noted that the terminal designated 408a has written immediately adjacent the numeral 408a the designation C2. This identifies the place where the signal has originated and this procedure will be used throughout the specification. The input terminal 408b receives a binary one level signal from output terminal 2507d [FIGURE 25] of the circuit which identifies the bit rate at which the communications system is operating and which circuit will be more fully described. Input terminal 408c receives a binary one level signal from the output terminal 342 of inverter circuit 332, shown in FIGURE 3, which is indicative of the fact that a receiver circuitry is operating within a dead interval which further represents the fact that the Nyquist interval count has been completed. Thus, upon the simultaneous occurrence of a decimal count of two from counter 325 and of a signal indicative of the fact that we are operating at the 1250 bit per second rate and are further operating during a dead interval, this causes AND gate 408 to generate a binary one condition, which binary one condition is transferred from its output terminal 408d and through an emitter follower circuit to the input terminal 409c of an OR gate 409.

When operating during the 625 bit per second transmission rate, at this transmission speed there are four Nyquist intervals contained in each bit interval so that a majority count will be a count of three or a count of four binary one information intervals. Thus, at the 625 bits per second transmission rate the OR gate 406 has its input terminals 406a and 406b connected to the output terminals C3 and C4 of counter 325. If a count of three or four is present, this generates a binary one condition at the output of OR gate 406 which is impressed after passing through an emitter follower upon the input terminal 407b of AND gate 407. Input terminal 407c is connected to the output terminal 342 of inverter circuit 332 shown in FIGURE 3, indicative of the fact that the receiver facility is in a dead interval while input terminal 407a is in the binary one condition if the output terminal 1804d of the receiver supervisory control circuit shows that the system is operating at the 625 bit per second transmission rate. Thus if all three terminals are at binary one level AND gate 407 generates a binary one output which passes through an emitter follower to the input terminal of 409b of OR gate 409.

At the 312.5 bits per second transmission rate each bit interval contains eight Nyquist intervals so that a majority count will be comprised of either five, six, seven, or eight binary one information intervals. These counts are impressed upon the input terminals 404a–404d, respectively, of OR gate 404, such that if any of these terminals are at binary one OR gate 404 generates a binary one level which is passed through an emitter follower to the input terminal 405b of AND gate 405. In a like manner to that previously described, the input terminal 405c is at binary one during the dead interval and the input terminal 405a is at binary one when the supervisory control circuitry, to be more fully described, has its output terminal 1804e at binary one level indicative of the fact that the system is operating at the 312.5 bits per second transmission rate. The simultaneous presence of the three binary one levels causes AND gate 405 to generate a binary one output which is passed through an emitter follower to the input terminal 409a of OR gate 409. Thus, if a binary one condition is present at any of the three bit rates, this binary one condition will appear at the output 410 of OR gate 409 and is employed to operate a loading circuit for the character receiving register, which loading circuit and register will be more fully described.

The loading elements for the characters receiving register is comprised of a bistable dual input flip-flop circuit 411 having a set input terminal 412 connected to the output of OR gate 409 and a reset input terminal 413 connected to the reset pulse output terminal 341 of FIGURE 3. Thus upon the occurrence of a binary one level at the set input terminal 412 bistable flip-flop circuit 411 generates a binary one level voltage at its output terminal 414 and upon the occurrence of a binary one level signal at its reset terminal 413 generates a binary one level output voltage at its output terminal 415. Thus after having been reset flip-flop 411 has a binary one level at its output terminal 415 and if the next received bit is identified as a binary zero the flip-flop 411 will remain with its output terminal 415 in the binary one state throughout that bit interval and the dead interval immediately following the bit interval.

Upon the completion of ascertaining how many binary one information intervals exist within a bit interval and simultaneously with the operation of identifying the zeroness, one-ness and grayness of a bit [which functions are performed during the dead interval], the weighted averaging means operation is initiated. FIGURE 6 shows the timing or programming means which controls and initiates the plurality of steps which are performed during the weighted averaging operation. The timing means 600 is comprised of a bistable flip-flop circuit 601 having a set input terminal 602 which is connected to the output terminal 342 of FIGURE 3. The receipt of a positive-going or binary one pulse at the set input terminal 602 which is indicative of the beginning of a dead interval causes output terminal 603 of flip-flop 601 to move to the binary one state. This binary one condition is imposed upon the input terminal 605 of a pulse AND gate circuit 604. The second input terminal 606 of pulse AND gate circuit 604 is connected to the output terminal 609 of a free-running multivibrator 608 which generates a pulse train of the type shown by waveform 610. Upon the substantially simultaneous occurrence of binary one conditions upon the input terminals 605 and 606 pulse AND gate 604 generates a voltage spike 614 which is impressed upon the input terminal 607 of a count-of-seven counter 611. Each such voltage spike 614 causes the counter 611 to advance by one step. Counter 611 is provided with seven output terminals which provide a decimal output of 1–7, their terminals being designated as C1'–C7', respectively. Once flip-flop 601 has its output terminal 603 set into the binary one state it remains in this state indefinitely causing pulse AND gate 604 due to the free-running multivibrator action of multivibrator 608 to continuously step counter 611 through a count of seven. When counter 611 achieves a count of seven a binary one state appears at its output terminal C7'. This binary one state is imposed upon the reset terminal 614 of flip-flop 601. This causes the output terminal 603 to go to binary zero and the opposite output terminal 612 to go to binary one. This binary one state is imposed through an emitter follower to the reset input terminal 613 of counter 611 causing counter 611 to be reset to a count of zero. Counter 611 after having been reset will not be advanced through seven counts due to the fact that a binary one condition is absent at input terminal 605 of pulse AND gate 604. The seven decimal counts C1'–C7' are employed to control the weighted averaging operation, in a manner to be more fully described.

As was previously described, upon completion of the operation of counting the number of binary one information intervals in a bit interval, the output terminal of inverter 332 of FIGURE 3 generates a binary one or positive square pulse output which is indicative of a dead interval. This square pulse is impressed upon the input terminal 665 of intermediate storage means 650, shown in FIGURE 7. This binary one condition is imposed upon the input terminal 651b–653b of AND gates 651–653, respectively. The other input terminals 651a–653a are connected to the b3, b2 and b1 outputs, respectively, of count-of-nine counter 325, shown in FIGURE 3. Thus upon initiation of the dead interval the condition of the binary coded decimal outputs b3–b1, respectively, are passed through the AND gates 651–653 respectively, depending upon which of the b3–b1 outputs are in the binary one state. The binary one condition passed by the AND gates, such as, for example, AND gate 651 is impressed upon the set input terminal 654a of a bistable flip-flop circuit 654. Assuming AND gate 651 to generate a binary one condition, this causes flip-flop 654 to drive its output terminal 654b to the binary one state. This binary one condition is passed through an emitter folower to the input terminal 657a of an AND gate 657. Flip-flop circuits 655 and 656 operate in a substantially identical manner. Thus all three conditions of the output terminals b3–b1 are imposed upon the input terminals 657a–659a of the AND gates 657–659, respectively.

As was previously described, the initiation of the dead interval causes the programming circuit 600 of FIGURE 6 to step through a count-of-seven upon receipt of the square pulse identifying the presence of a dead interval. When count-of-seven counter 611 steps to the count of one its output terminal C1' is in the binary one state. This condition is impressed upon the input terminal 659b of AND gate 659 causing this AND gate to generate a binary one condition. If the output terminal b1 of counter 325 of FIGURE 3, and hence the output terminal 656b of flip-flop 656 are in the binary one states this binary one signal therefore appears at the output terminal 663 of AND gate 659 after having passed through an emitter follower circuit. In a like manner, when counter 611 steps to a count-of-two and then a count-of-three, AND gates 658 and 657 are also enabled by these decimal count pulses so as to generate binary one conditions at their output terminals 662 and 661 respectively, depending naturally upon the presence of binary one conditions at the output terminals b2 and b3 of counter 325. It can be seen that the states of flip-flops 654–656 remain in the condition to which they were driven by AND gates 651–653, respectively, until counter 611 reaches a count-of-five at which time its output terminals C5' is connected to a bus 660 which simultaneously impresses binary one conditions upon the reset input terminals 654c–656c of flip-flops 654–656, respectively. This binary one condition occurring at a count-of-five thereby resets all of the flip-flops 654–656 in readiness for receipt of the minory count of the next binary bit to be received at the receiver location.

After the minority count has been simultaneously transfered to the intermediate memory and then sequentially stepped out of the memory output terminals 661–663, the minority count is then transferred into the weighted averaging facility summing circuit 700, shown in FIGURE 8, only a portion of which will be described at this time. The output terminals 661–663 are connected respectively, to the input terminals 708b–710b of OR gate 708–710, respectively. Considering first OR gate 708 and assuming output terminal 661 of FIGURE 7 to be in the binary one condition, this imposes a binary one condition upon OR gate 708. This condition is passed through its output terminal and an emitter follower to the input terminal 711a of a bistable flip-flop circuit 711. This causes output terminal 711c of flip-flop circuit 711 to be moved to the binary one condition which condition is transferred through an emitter follower to the output terminal 711e.

In a like manner, if either of the output terminal 662 or 663 of FIGURE 7 are in the binary one state, this state is passed through OR gates 709 and 710, respectively, and then through the OR gates 714 and 715, respectively, to the input terminals 712a and 713a respectively, of the bistable flip-flop circuits 712 and 713, respectively. In the example given, it will be assumed that the summing circuit comprised of the flip-flops 711–713, respectively, do not have any minority count stored in it previous to the time that the count now being inserted into the summing circuit. Thus at the end of a count of three, all of the binary coded decimal bits are inserted into the summing means of FIGURE 8 and the summing circuit after the completion of the count of three therefore contains the sum of the minority count which has been added to zero and thus contains therefore only the sum of the first minority count received.

After having summed the minority count to zero (in the present example), this sum must next be divided by two in order to produce the weighting factor as was previously derived mathematically on column 10.

The dividing circuit 725 is shown in FIGURE 9 of the specification and is comprised of a four-stage shift register arrangement, each stage of which is designed in accordance with the aforementioned copending application entitled Data Receiver, Ser. No. 241,917, issued as Patent No. 3,328,758 on June 27, 1967.

The sum contained in the summing circuit 700 of FIGURE 8 must now be divided by two in order to multiply the minority count by the weighting factor, which as was previously described, is approximately 0.5, as stated in column 10.

Thus the output terminals 711e–713e and 717e of the summing or accumulator circuit of FIGURE 8 are connected respectively, to the input terminals 729a–726a of AND gates 729–726, respectively, As was previously described, the minority count was loaded into the accumulator circuit of FIGURE 8 during the count-of-three of the count-of-seven counter 611, shown in FIGURE 6. At the count-of-four the output terminal C4' of counter 611 generates a binary one condition which is impressed upon the input bus 730 of dividing circuit 725, which binary one condition is simultaneously impressed upon the input terminals 729b–726b of the AND gates 729–726, respectively. Each of the AND gates 729–726 which have binary one conditions at their input terminals 729a–726a generate binary one conditions at their output terminals, which binary one conditions are passed through emitter follower circuits and impressed upon the set input terminals 727e–733e, respectively, of the flip-flop stages 727–733, respectively, of the summing circuit. Thus some time after the count-of-four [and before the count of five] the sum contained in the accumulator circuit of FIGURE 8 is loaded into the dividing circuit of FIGURE 9 [in the count-of-five counter 611 of FIGURE 6 generates a binary one condition at its output terminal C5']. This condition is simultaneously impressed upon the set input terminals 728d–734d of the shift register logic network circuit 728–734, respectively, causing the information stored in flip-flops 727, 729, 731 and 733 to be shifted to the right, respectively, to the flip-flops 729, 731, 733 and 735. As will be understood, a shift-right operation in binary circuitry is the same thing as taking a binary number and dividing it by two. Thus, the shifted information appears at the output terminals 736 and 739 of flip-flop 729, 737 and 740 of flip-flop 731, 738 and 741 of flip-flop 735.

Upon completion of the division operation, in order to obtain the weighted average factor, the next step in the operation is that of ascertaining what decimal number is represented by the weighted average. This is performed by the logical binary to decimal code conversion circuit 750 shown in FIGURE 10. This circuit takes the binary one outputs 739–741 and the binary zero outputs 736–738 from the dividing circuit 725 of FIGURE 9 and converts these outputs to their decimal equivalents 0–7. For example, let it be assumed that after completion of the division operation the dividing circuit 725 contains a binary coded decimal representation for the decimal number one. In this condition, the binary one outputs 739 and 740 are in the binary zero state while 741 is in the binary one state, whereas the binary zero outputs 736 and 737 are in the binary one state while output terminal 738 is in the binary zero state. These binary outputs are impressed, respectively, upon the inputs 761–759 and 762–764, respectively, of the conversion circuit 750. Each of these binary zero and/or binary one outputs are impressed upon the seven AND gate circuits 751–758 in the manner shown in FIGURE 10. Thus employing the example previously given, input terminals 739 and 740 are at the binary zero level while input terminal 741 is at the binary one level thus causing input terminals 760 and 761 to be binary zero while input terminal 759 is binary one. In a like manner, input terminals 736 and 737 being in the binary one state impose binary one voltage levels upon the input terminals 762 and 763 and since terminal 738 is at the binary zero level this imposes a binary zero upon input terminal 764. It will be noted that AND gate 751 receives a binary one condition at its input terminal 751a from terminal 759; a binary one condition from input terminal 763 impressed upon its terminal 751b; and a binary one condition upon its input terminal 751c which is connected to input terminal 762. The simultaneous occurrence of these binary ones at the input terminal of AND gate 751 cause the AND gate to generate a binary one level voltage at its output terminal which passes through an emitter follower to the output terminal "1." Tracing the input voltages impressed upon the terminal 761–764, 759 and 760, it will be seen that none of the remaining AND gates 752–758 generate a binary one level voltage at their output terminals due to the absence of at least one binary one voltage level at their input terminals. Thus the contents of the division circuit 725 is interpreted as containing a decimal one condition. In a like manner it can be seen that any other binary coded decimal number from two to seven and zero, which may be contained in the division circuit 725 will be interpreted by one of the seven remaining AND gates 752–758 in order to indicate decimally the contents of the division circuit 725 of FIGURE 9.

As one further example, let it be assumed that division circuit 729 of FIGURE 9 contains a decimal count of five. This would mean that its binary one output terminals 739, 740 and 741 are respectively at the binary one, binary zero, and binary one levels, while the binary zero output terminals 736–738 are at the binary zero, binary one and binary zero states. It can be seen tracing these binary one voltage levels in FIGURE 10 that AND gate 755 receives a binary one condition at its input terminal 755a from terminal 759; at input terminal 755b, receives a binary one level condition from input terminal 761 and at AND gate input terminal 755c, receives a binary one from the circuit input terminal 763. This causes AND gate 755 to generate a binary one voltage level at its output terminal which is passed through an emitter follower to output terminal "5." It should be understood that the remaining AND gates operate in a like manner to represent decimally any other binary coded decimal content which may be contained in the division circuit 725. These decimal outputs "0"–"7" are employed for the dual purposes of being fed to a second conversion circuit, shown in FIGURE 10, to be more fully described, in order to replace the minority count which has now been multiplied by a weighting factor back into the accumulator circuit of FIGURE 8 and is further employed for the purpose of determining whether the receiver facility should request a reduced bit transmission rate which requests are generated in the circuitry of FIGURE 11 and is still further employed for the purpose of generating gray or ambiguous bits.

The conversion circuit of FIGURE 10a is further employed for the purpose of making a decision as to what inertia should be read back into the accumulator circuit. In order to better explain this concept, let us first consider one example. Let us assume that a minority count of five has been inserted into the division circuit 725 of FIGURE 9. After division, it will be found that the dividing circuit 725 will generate a binary decimal coded output equal to exactly one-half of the decimal number 5 or 2.5. The .5 is generated by the flip-flop stage 735 of division circuit 725. It is now necessary to decide whether this number should be rounded off to 2.0 or 3.0. This function is performed by the rounding off in conversion circuit 800 of FIGURE 10a. Upon a consideration of rounding off in conversion circuit 800 of FIGURE 10a it will be seen that any number which includes half an integer at the end thereof will be rounded off to the next full integer, such as, for example, the number 2.5 will be rounded off to the decimal number 3. The rounding off circuit 800 of FIGURE 10a is comprised of a plurality of AND gates 803–818, each adapted to receive a decimal output from the conversion circuit 750 of FIGURE 10 and simultaneously therewith the status of the half digit flip-flop stage 735 of the dividing register 725.

As one example, let it be assumed that a minority count of five has been loaded into the division register 725. After the division or shift-right operation, register 725 now contains the binary representation for the decimal number 2.5. This causes output terminal 742 of division register 725 to be in the binary one state and further causes conversion circuit 750 to generate a binary one voltage level at its "2" output terminal. The "2" output terminal is connected simultaneously to the input terminals 807a and 808a of AND gates 807 and 808, respectively. Simultaneously therewith the binary one voltage level from output terminal 742 is impressed upon input terminal 802 of round off circuit 800. It should also be noted that with output terminal 742 of the last stage of the divider circuit 725 being binary one its output terminal 743 is in the binary zero state. This voltage level is impressed upon the input terminal 801 of the round off circuit 800. Therefore, it can be seen that AND gate 807 has a binary one voltage level at its input terminal 807a and a binary zero voltage level at its input terminal 807b due to the fact that output terminal 743 of division register 725 is in the binary zero state. However, AND gate 808 has a binary one voltage level at its input terminal 808a which is connected to the "2" terminal of conversion circuit 750 and simultaneously therewith has a binary one voltage level signal at its input terminal 808b which is received at the circuit input terminal 802 connected to output terminal 742 of dividing register 725. Thus while AND gate 807 will generate no binary one output, AND gate 808 does generate a binary one output which is passed through an emitter follower to the input terminal 821a of OR gate 821. The OR gate passes the binary one voltage level signal through an emitter follower to output terminal C3 thus denoting that a minority count of 2.5 has been rounded off and is now decimally represented by the decimal number 3. In a like manner, the remaining logical circuits of the rounded off circuitry 800 operate to round off any number which is followed by the value ½ so that the decimal number ½ is rounded off to one; the decimal number one and one-half is rounded off to 2; the decimal number 2½ is rounded off to three; the decimal number 3½ is rounded off to four, and so forth. As one further example, let it be assumed that a minority count of four has been inserted into the division register 725. After division, this binary code will represent the decimal number 2 causing conversion circuit 750 to generate a binary one voltage level at its "2" output and causing the output terminals 743 and 742 of division register 725 to be at the binary one and binary zero levels, respectively. Considering now FIGURE 10a, this causes terminal 802 to be at the binary zero level and terminal 801 to be at the binary one level and simultaneously therewith causes input terminals 807a and 808a of AND gates 807 and 808, respectively, to be at the binary one level, having been impressed with the binary one voltage level from the output terminal "2" from conversion circuit 750. In this case AND gate 808 has a binary one voltage level at its input terminal 808a, but has a binary zero voltage level at its input terminal 808b so that it fails to generate a binary one voltage level at its output terminal. However, AND gate 807 has a binary one voltage level at both its input terminals 807a and 807b so that it generates a binary one voltage level at its output terminal which in turn is passed through an emitter follower and through the input terminal 820b of OR gate 820 through a second emitter follower and ultimately to the output terminal $\overline{C2}$. Thus it can be seen that any number containing a one-half is rounded off to the next integer, while any number not containing a one-half remains that number. It should be noted that the remaining logical circuitry of FIGURE 10a operates in a like manner to perform the round off operation.

Upon completion of the "round off" operation, it is now necessary to reinsert the rounded off minority count which has been successfully "weighted" back into the accumulator of FIGURE 8. In order to perform this operation the minority count which is represented decimally at the $\overline{C0}$–$\overline{C8}$ outputs of round off circuit 800, it is necessary therefore to reconvert these decimal representations back into binary representations in order to suitably load the accumulator 700. This is performed by the OR gates 701–703, provided as input circuits to the accumulator of FIGURE 8, which operate in the following manner:

Let it be assumed that after the completion of the round off operation the weighting minority count is the decimal number three. This means that output terminals $\overline{C0}$–$\overline{C2}$ and $\overline{C4}$–$\overline{C8}$ are all in the binary zero state of FIGURE 8, while output terminal $\overline{C3}$ is in the binary one state. Output terminal $\overline{C3}$ is connected to the input terminals 701b of OR gate 701 and 702b of OR gate 702. It can therefore be seen that an output from the OR gate 701 represents a binary bit position $2^0$. The OR gate 702 represents the binary bit position $2^1$ and the OR gate 703 represents the position $2^2$. It can be noted also that the output terminal $\overline{C3}$ is not connected to any input terminal of OR gate $\overline{703}$ so that an output of 011 will appear at the terminals of OR gate 703, 702 and 701, respectively, which is the binary code representing the decimal number three. Considering another example, let us assume that the minority count after weighting generates a decimal number 6. Thus the output terminals $\overline{C0}$–$\overline{C5}$ and $\overline{C7}$–$\overline{C8}$ of circuit 800 generate binary zero voltage levels while the output terminals $\overline{C6}$ generates a binary one voltage level. It can be seen that this terminal is connected respectively to the terminals 702C and 703C of OR gates 702 and 703. This generates at the outputs of OR gates 703–701 the binary code 110 which is the binary representation for the decimal number 6. This information is inserted into the accumulator of FIGURE 8 at a count of six of the count-of-seven counter 611, shown in FIGURE 6 of the drawings. As was previously described, and upon occurrence of the count of six, the count-of-seven counter 611 generates a binary one voltage level at its output terminal C6'. This is impressed upon the input terminal 707 of circuit 700 in FIGURE 8. This binary one voltage level is simultaneously impressed upon the input terminal 704b–706b of AND gates 704–706, respectively. Thus, any binary voltage levels appearing at the output terminal of OR gates 701–703 are passed through emitter followers to the input terminals 704a–706a of AND gates 704–706, respectively, and will be passed through these AND gates upon the occurrence of the count-of-six pulse from the output terminal C6' of counter 611. Considering the example above wherein a decimal number 6 is to be impressed into the accumulator of FIGURE 8, this means that OR gates 702 and 703 generate binary ones at their outputs while OR gate 701 generates a binary zero at its output. Thus upon the occurrence of the count-of-six count all three AND gates are enabled. However, only AND gates 701 are at their output terminals while AND gate 704 remains in the binary zero state at its output terminal. Thus no binary one condition is impressed upon the OR gate 708 and hence the set input terminal 711a of bistable flip-flop 711. Simultaneously therewith since AND gate 705 generates a binary one, this is passed through an emitter follower and through OR gate 709 and OR gate 714 to the set input terminal 712a of bistable flip-flop circuit 712. Likewise, AND gate 706 passes its binary one condition through an emitter follower, OR gate 710, a second emitter follower and OR gate 715 to the set input terminal 713a of bistable flip-flop 713. Thus, flip-flop 711 has its output terminal 711c in the binary zero state, flip-flop 712 has its output terminal 712c in the binary one state and flip-flop 713 has its output terminal 713c in the binary one state thereby containing a binary representation for the decimal number 6.

It is important to note that substantially simultaneously with the initiation of the count-of-six count by counter 611 the accumulator circuit of FIGURE 8 is reset to zero in order to properly receive the rounded off minority count which has been appropriately weighted. This takes place in the following manner:

Input terminal 716 of FIGURE 8 is connected to the output terminal C5' of counter 611, shown in FIGURE 6. Upon the occurrence of a count-of-five count, output terminal C5' goes to the binary one state. This state, however, is inverted by an inverter state 717 which causes binary zero voltage levels to be impressed upon the reset input terminals 711d–713d and 117d of the flip-flop stages 711–713 and 717, respectively. As can be readily understood, a binary zero voltage level upon these terminals fails to reset any of the flip-flop stages. However, upon advancing of counter 611 from the count-of-five count to the count-of-six count, this causes the count-of-five output terminal C5' to go to the binary zero state. This condition is impressed upon input terminal 716 of FIGURE 8 and due to the inverter action of inverter circuit 717 causes a binary one voltage level to be impressed upon the reset terminals 711d–713d and 717d, respectively. This causes a reset to zero operation of the accumulator circuit of FIGURE 8. It should further be understood that the inherent delay of an inverter circuit, such as the inverter circuit 717 which is normally comprised of a single stage amplifier arrangement is substantially less than the inherent delay of a counter circuit which advances its count by one in a regular manner. Thus, the imposition of the inverted C5' pulse upon the reset input terminals of the accumulator circuit will always occur before the weighted minority count is loaded into the accumulator circuit at the count of 6 count.

As was previously described, the function of the digital supervising terminal is that of detecting and correcting errored information which has been transmitted to the receiver facility. The minority counts which are developed represent that portion of a bit interval which has been affected by noise phenomena injected into the communications link. Regardless of which bit speed the system is operating at, whenever 50% of a bit interval which is examined is in a binary one state and the remaining 50% is in the binary state, in accordance with the principles of the instant invention, such a condition is always utilized to request arbitrarily identifying the bit as a binary zero bit. Since the exemplary embodiment of the instant application has been described as having a carrier frequency of 2500 c.p.s., it should therefore be understood that when transmitting at the 1250 bit per second rate each bit interval contains two information intervals. Likewise, when transmitting at the 625 bit per second rate, each bit interval contains four information intervals and at the 312.5 transmission rate each bit interval contains eight information intervals. Thus for each of the aforementioned bit rates, if 50% of the information intervals for the 1250 bit per second rate, or in other words, if one information interval is in one binary state and the other information interval is in the other binary state, this condition must initiate a request for a lower bit transmission rate. Likewise, if the 625 bit per second transmission rate, if one-half of the bit interval, or two information intervals, are in one binary state and the other one-half, or the remaining two information intervals are in the other binary state, this must generate a request for a lower bit transmission rate. Considering the lowest bit rate, or 312.5 bits per second, if 50% of the information intervals, or in other words four information intervals are in one binary condition and the remaining four information intervals are in the other binary condition, this again must generate a request for a lower transmission rate. These requests for lower transmission rates are generated by the logical circuits 900, shown in FIGURE 11. For example, at the 1250 bit per second rate, if one-half of the total information intervals in a bit interval, or in other words, if one information interval is in one binary state and the other information interval is in the other binary state, then the output terminal "1" of the conversion circuit 750, shown in FIGURE 10, will be in the binary one condition. This binary one level is impressed upon input terminal 901a of the 1250 bit per second AND gate 901. When operating at the 1250 bit per second rate the supervisory logic of FIGURE 18 generates a binary one voltage level at its output terminal 1804c which is impresed upon the input terminal 901b of AND gate 901. Such a condition therefore indicates that when operating a 1250 bit per second rate that one-half of an examined bit or one information interval out of a possible two information intervals of an examined bit is in one state, whereas the remaining information interval is in the opposite state. This condition is passed by AND gate 901 and through an emitter follower to the input terminal 905a of an OR gate 905. OR gate 905 passes the binary one condition through an emitter follower to the input terminal 906a of an AND gate 906. The remaining input terminal 906b of AND gate 906 is connected to the output of a gate OUT circuit, shown in FIGURE 14 of the drawings, which will be more fully described, but suffice it to say for an understanding of the circuitry of FIGURE 11, that this pulse occurs upon the receipt of a complete coded character which it should be understood is comprised of a group of such information bits. Thus, upon completion of the coded character in which this errored information bit is contained, a binary one level is generated at the output terminal 907 and AND gate 906 which is employed by the supervision logic of FIGURE 17 to be more fully described in order to transmit a signal to the transmitter location to cause it to operate at a lower bit transmission rate due to the presence of the noise phenomenon on the line.

In a like manner, when operating at the 625 bit per second rate, the input terminal 902b of AND gate 902 receives a binary one voltage level indicative of the fact that the system is now operating at the 625 bit per second rate. Assuming that one-half of the information intervals of an examined bit are in one state and the remaining half are in the other binary state, this is cause for generating a reduced bit transmission rate request. At the 625 bit per second rate the bit interval contains four information intervals so that if two of the information intervals are errored, this causes the conversion circuit 750 of FIGURE 10 to generate a binary one output at its "2" output terminal which is impressed upon the input terminal 902a of AND gate 902. Therefore, AND gate 902 generates a binary one voltage level which is passed through a first emiter follower and then through OR gate 905 through a second emitter follower and hence the input terminal 906a of AND gate 906. Upon the completion of receipt of a coded character, input terminal 906b goes to the binary one level causing a binary one level voltage to be generated at output terminal 907 of AND gate 906, thus generating a request for reduced bit transmission rate.

Continuing to a consideration of the 312.5 bit per second transmission rate, each bit interval contains eight information intervals and if 50% of these information intervals, or four, are in one binary sate and the remaining intervals, or the remaining four, are in the opposite binary state, this must cause the generation of a reduced transmission rate request. In order to provide this operation, AND gate 903 is provided which has its input terminal 903a connected to the "4" output terminal of conversion circuit 750, shown in FIGURE 10, which will generate a binary one output when a minority count of four has been indicated. When operating at the 312.5 bit per second rate, the supervisory logic circuit of FIGURE 18 generates a binary one condition at its terminal 1804e, which is impressed upon the output terminal 903c of AND gate 903. In addition thereto input terminal 903b of AND gate 903 is connected to the count of six output terminals C6' of the count-of-six counter 611 so that when 50% of the information intervals at the 312.5 bit per second rate are in one binary state when a count of six indicator in the count-of-six counter and further, when operating at the 312.5 bit per second rate AND gate 903 generates a binary one voltage level at its output terminal which passes through an emitter follower and appears at the output terminal 908. Since the 312.5 bit per second transmission rate is the lowest transmission rate possible, it is therefore not possible to go to a lower bit transmission rate therefore, this binary one output provides an alarm indication which may be interpreted by the transmitter location as cause for interrupted transmission due to the high frequency of errored bits being received at the receiver facility. It should be understood, however, that an extension of the preferred embodiment contained herein may be made such that a still lower bit rate may be included in the system in order to overcome the frequency of errored bits which are being gathered at the receiver facility.

It should further be understood that the receiver facility may be collecting data bits which are being received error free. An ouput must also be generated to indicate such a condition in order to cause the communication system to operate at a higher bit transmission rate if the system shows a history of a predetermined number of such error free data bits having been received. For example, the system may be operating at the 312.5 bit per second transmission rate. The receipt of a predetermined number of error free data bits will cause shifting to a higher bit transmission rate. Therefore, AND gate 904 serves this function by having its input terminal 904a connected to the count-of-six count terminal of counter 611 in the terminals C6' and having its second input terminal 904b connected to the "0" output terminal of the conversion circuit 750, shown in FIGURE 10. Thus, if an examined data bit is shown to be error free, that is, is shown to have all of its information intervals in either one state or the other state, thin a binary one condition would appear at the output terminal "0" which is impressed upon the input terminal 904b of AND gate 904 and upon the occurrence of a count-of-six count AND gate 904 generates a binary one voltage level which passes through an emitter follower to output terminal 909. This is impressed upon the link optimum signal input terminal 1708a, shown in FIGURE 17 of the drawings, whose function it is to keep a count of the number of error free data bits which have been received and after receipt of this predetermined number to cause the communications system to move to a higher bit transmission rate. Naturally it can be understood that if the communications system is already at the highest bit transmission rate the receipt of the predetermined number of error free data bits will be ignored.

In order to detect the presence of gray bits in a manner substanitally similar to that employed for the detection of binary one or binary zero bits the circuit 500 of FIGURE 5 is employed. When operating at the 1250 bit per second rate and with a carrier frequency of 2500 c.p.s., each bit interval contains two information intervals, as was previously described. Thus a "gray" or ambiguous condition exists when one of the two information intervals is in a first binary state and the other of the two information intervals is in a second binary state. Thus a data bit having this make-up must be tagged as "gray." AND gate 504 of FIGURE 5 serves this function. When operating at the 1250 bit per second transmission rate the supervisory logic circuit of FIGURE 18 has its output terminal 1804c at the binary one condition indicative of operation at the 1250 bit per second rate. This terminal is connected to the input terminal 504b of AND gate 504. After completion of examination of the information intervals contained in the data bit, counter 325 of FIGURE 3 generates a binary one level voltage at its output terminal C1 indicative of the fact that one of the two information intervals for a received data bit is in the binary one state. This is impressed upon input terminal 512 and passes through an emitter follower to the input terminal 504a of AND gate 504. The simultaneous occurrence of these binary one conditions causes a binary one condition to be generated at the output of AND gate 504 which passes through an emitter follower to the input terminal 509c of OR gate 509. OR gate 509 passes the binary one condition through its output terminal and an emitter follower to input terminal 510a of AND gate 510. Input terminal 510b of AND gate 510 receives a binary one condition from output terminal 342 of FIGURE 3 indicative of the presence of a dead interval. The binary one condition is passed during the occurrence of the dead interval by AND gate 510 and through an emitter follower to the set input terminal 511a of a bistable flip-flop circuit 511. The binary one state impressed upon the set input terminal 511a causes output terminal 511c of flip-flop 511 to go to the binary one state. The output terminals 512 and 513 of flip-flop 511 are employed to load the gray bits register to be more fully described. At a predetermined time period D, after the beginning of the dead interval and before the beginning of the next data bit interval, output terminal 341 of FIGURE 3 generates a binary one condition which is impressed upon the reset input terminal 511d of flip-flop circuit 511. This causes the flip-flop 511 to reset, driving its output terminal 511c to the binary zero condition at a time immediately prior to the examination of the next received data bit so that upon completion of examination of the next received data bit it may be properly inserted into the loading flip-flop 511 of circuit 500.

When operating at the 625 bit per second transmission rate, received data bits are tagged gray in two different ways:

At the 625 bit per second rate each data bit interval contains four information intervals. Thus if two of the four information intervals are in the first binary state and the remaining two of the four information intervals are in the second binary state, this automatically tags the received data bit as a gray bit. This condition is recognized by the counter 325 of FIGURE 3 when it contains a count-of-two indicated by a binary one condition at its output terminal C2. This binary one level is connected to input terminal 503a of OR gate 503. OR gate 503 passes the binary one condition through its output terminal and an emitter follower to the input terminal 506a of AND gate 506. The supervisory control logic of FIGURE 18 generates a binary one condition at its output terminal 1804d indicative of the fact that the system is operating at the 625 bit per second rate. In these two conditions the binary one at the input terminals of AND gate 506, the AND gate generates a binary one at its output terminal which is impressed upon input terminal 509b of OR gate 509 and passed by OR gate 509 and an emitter follower circuit to the input terminal 510a of AND gate 510. Upon the occurrence of a dead interval terminal 510b of AND gate 510 goes to the binary one state in the manner as previously described, in order to insert the binary one condition into the flip-flop loading element 511, in the same manner as previously described.

The second manner in which gray bits are detected at the 625 bit per second transmission rate can best be shown by an example. Let it first be assumed that the first received data bit at the 625 bit per second rate contains one information interval in the binary one state and three information intervals in the binary zero state. After an examination of the information intervals, counter 325 of FIGURE 3 will generate a count of one so that its output terminal C1 goes to the binary one state. This is shifted into the accumulator register of FIGURE 8 of the drawings, to be added to an already examined count. However, since it is assumed that this is the first received data bit the accumulator register will contain no count. Therefore, the total sum in the accumulator register will be a binary coded decimal count of one. This minority count is loaded into the dividing register and divided by two. Division by two gives a result of one-half which is then loaded into the round-off circuitry of FIGURE 10a. The round-off causes this decimal count of one-half to be rounded-off to decimal count one. This count of one is then reinserted into the accumulator register of FIGURE 8. Let it now be assumed that the next received data bit has two information intervals in the binary one state and the remaining two information intervals in the binary zero state. Thus counter 325 generates a count of two at its output terminal C2 which decimal count is loaded into the accumulator register of FIGURE 8. These binary coded decimal counts are then added together to give a total count in the accumulator register of a binary coded decimal three. This is operated upon by the division register giving a binary coded decimal count of 1.5. The round-off circuit rounds this number off to a decimal two. Thus the C2 output terminal of the round-off circuit of FIGURE 10a is impressed upon the input terminal 503b of OR gate 503. OR gate 503 passes this binary one level voltage at its output terminal and through an emitter follower circuit to the input terminal 506a of AND gate 506. Input terminal 506b is up [i.e., binary one] to indicate operation of the system at the 625 bit per second rate. This causes AND gate 506 to pass a binary one level voltage due to the input terminal 509b of OR gate 509 which is passed through OR gate 509 and through an emitter follower circuit to the input terminal 510a of AND gate 510. This is again passed during a dead interval through AND gate 510 in order to load the gray bit loading element flip-flop 511 in the manner previously described. Whereas the usage of the input terminals 503c and 503d are quite unlikely, it is nevertheless possible that due to a lag in the changeover to a lower bit transmission rate into a highly errored line that minority counts may reach a decimal level of three or four. If such conditions do arise they may be readily handled by the input terminals 503c and 503d provided therefore. In these cases, as in the cases of signals impressed upon the input terminals 503a and 503b of OR gate 503, gray bits will be inserted into the gray bits loading element flip-flop 511, in the same manner as previously described.

A consideration of the 312.5 bit per second transmission rate shows us that each bit interval contains eight information intervals. If any data bits examined are shown to contain only three, four or five information intervals within a bit interval which are in the binary one state, a gray bits indication must be generated. These conditions are provided for by the input terminals 502a, 501a and 502b of OR gates 502 and 501, as shown in FIGURE 5. If, for example, a data bit received has three information intervals in the binary one state and five information intervals in the binary zero state a count of three will be generated by the counter 325 of FIGURE 3. This will cause its output terminal C3 to go to binary one state which condition is impressed upon terminal 502a of OR gate 502. This condition is passed through an emitter follower to the input terminal 505a of AND gate 505. When this condition is accompanied with a rounded-off count of three provided by the round-off circuit of FIGURE 10a, this generates a binary one at its output terminal $\overline{C3}$. The simultaneous presence of these conditions are passed by AND gate 505 and through an emitter follower to input terminal 507b of OR gate 507. This is passed by OR gate 507 and through an emitter follower circuit to the input terminal 508a of AND gate 508. Input terminal 508b is at the binary one level when the output terminal 1804e of the supervisory logic circuit, shown in FIGURE 18, is binary one, indicating operation of the 312.5 bit per second rate. This causes AND gate 508 to generate a binary one level voltage which is passed through an emitter follower circuit and on to the inuput terminal 509a of OR gate 509 and is ultimately loaded into the gray bits loading element flip-flop 511 in the manner previously described. In a like manner (the input terminals 502a of OR gate 502 and 501a of OR gate 501 pass the count-of-five and count-of-four counts which are interpreted as gray bits designations and ultimately loaded into the gray bits register loading element flip-flop 511. As was previously described, the input terminals 501c–501f of OR gate 501 receive the rounded-off counts of 5, 6, 7 and 8, respectively, from the output terminals $\overline{C5}$–$\overline{C8}$ respectively, and while it is quite unlikely that such conditions will exist, nevertheless these input terminals are provided in order to tag a received data bit as a gray bit, if such conditions should occur.

The communications system described herein employs a binary coded communications method wherein decimal characters are represented by a start bit, four binary bits representing the decimal character and a parity bit, the function of which is to provide an even parity count. The start bit of each character is always in binary one state and is employed in the manner to be more fully described in order to identify the receipt of all bits of a coded character. The parity bit has a function such that its binary state is determined by a binary summation of the coded character so that in every case this binary summation provides an even count. Consider, for example, the code format for the decimal number five. This format in binary notation is transmitted and received as 110101 where the bits respectively are the start bit, the $2^0$ bit position, the $2^1$ bit position, the $2^2$ bit position, the $2^3$ bit position and the parity bit position, wherein the first bit is the start bit, the last bit is the parity bit and the four intermediate bits are the decimal coded character in binary representation. It can be seen that a binary summation of the four intermediate bits is a total of binary zero so that the partity bit position must contain a binary zero in order to provide an even parity count. As a further example, consider the transmission of the character decimal seven. This is transmitted and received as 111101. Summing the four intermediate binary bits, this gives us a total of binary one necessitating a binary one in the parity bit position in order to provide an even parity count, or in other words, a parity count of binary zero. It should be noted that in the example given, the least significant binary bit position is transmitted first and the most significant binary bit position is transmitted last [i.e., just prior to the parity bit position]. It should be understood that the examples given are given as being merely exemplary and any other arrangements may be employer, such as, for example, the transmission of characters may take place in a reverse order, such that the most significant binary digit position is transmitted first. Another example is that a binary coded decimal format need not be employed but any other binary code fromat may be employed, such as, for example, a two-out-of five code which has inherent self-checking properties or various other modifications and embodiments which may be employed, none of which lend novelty to the device of the instant invention so that their applications in the system of the instant application may be provided for by anyone with ordinary skill in the art.

After examination of each received data bit from the information interval level, each such bit, after a one bits detection and a gray bits detection operation is performed, is inserted into the character receiving register 950, shown in FIGURE 12. Register 950 is comprised of input terminals 951 and 952 which are connected respectively to the output terminals 513 and 512 of the character receiving register loading element flip-flop 511, shown in FIGURE 5 of the drawings, wherein terminal 951 receives a binary one level voltage when the data bit to be loaded into the character receiving register is a binary one bit and wherein input terminal 952 receives a binary one voltage level when the data bit to be loaded into the register is a binary zero data bit. The input terminals 951 and 952 are connected to the shift register logic network 953, previously described in the instant application and referred to in the more detailed description in aforementioned copending application Ser. No. 238,952. Let it be assumed that input terminal 951 receives a binary one voltage level representative of the fact that a start bit has been received. In order to shift or load this data bit [i.e., start bit] into the characters receiving register, it is necessary to apply a shift pulse to the shift pulse input terminal 953e of shift register logic network 953. The shift pulse is generated by the delay circuit of FIGURE 3 and occurs at a time period D after the beginning of the dead interval following receipt of the start data bit, but before the beginning of the next received data bit [which will be the first code bit of the received character to be transmitted to the receiver facility]. Thus, after this time delay period the shift pulse is impressed upon input terminal 953e pressing the binary one voltage level at terminal 951 to appear at the output terminal 953f of the shift register logic network 953. This binary one voltage level is impressed upon the set input terminal 954b of bistable flip-flop stage 954. This causes the output terminal 954d of flip-flop stage 954 is move to the binary one voltage level. This binary one voltage level simultaneously appears at the output terminal 966 and at the input terminal 955c of shift register logic network 955 of the next stage of characters receiving register 950. Upon receipt of the next binary bit of the coded character being transmitted, the shift operation takes place in a similar manner. However, the binary state of the flip-flop stage 954 is now shifted into the flip-flop 956 of the next stage in the characters receiving register 950. This operation continues until the start bit, which is always a binary one bit, as was previously described, is ultimately loaded into the right-handmost flip-flop stage, 964 of characters receiving register 950. At this time when the start pulse is shifted into the right-handmost stage, output terminal 964d of flip-flop 964 goes to the binary one voltage level, which voltage level is transferred through an emitter follower circuit to the output terminal 971. The receipt of the start bit in flip-flop 964 initiates the error correction operations (if any) which may take place, in a manner to be more fully described. Simultaneously, with the insertion or loading of data bits for a coded character into the characters receiving register 950, all of the data bits loaded into the register are loaded into the parity count generating circuit 980 of FIGURE 12, which circuit is provided for the purpose of generating a parity count to determine whether the received coded character has the proper parity count in order to make a first determination upon the validity of the received coded character. The parity generating circuit 980 is comprised of an OR gate 981 having an input terminal 981a which is connected through a capacitor member 982 to the output terminal 966 of the first stage of characters receiving register 950. Prior to the imposition of data bits of the coded character being received the flip-flop element 983 of parity generating circuit 980 is reset by imposing a binary one level voltage upon input terminal 986 of parity circuit 980. This input terminal is connected to the output terminal 1011 in the supervisory logic shown in FIGURE 14 which operates, in a manner to be more fully described, in order to reset flip-flop 983. The reset voltage level causes output terminal 983b of flip-flop 983 to go to the binary one state setting flip-flop 983 in readiness for the next received coded character.

As the data bits (including the start bit) of the coded character being received are shifted into characters receiving register 950, each time one of such bits of the binary one voltage level appear in the flip-flop stage 954 this binary one voltage level appears at the output terminal 966 of the first flip-flop stage which is transferred through capacitor 982 and input terminal 981a of OR gate 981 and through an emitter follower circuit to the set input terminal 983a of bistable flip-flop circuit 983. Since the start bit is always in the binary one state this causes flip-flop 983 to change the states of its output terminals so that output terminal 983c goes to the binary one condition while output terminal 983b goes to the binary zero condition. Let it be assumed, for purposes of explanation, that a coded character representing the decimal number four is being received at the receiver facility. This coded character has the format of 100101. Thus the start bit causes output terminal 983b to go to binary zero. The next received binary one bit, which is the $2^2$ bit position causes a shift so that output terminal 983b goes to the binary one state. The last received bit, the parity bit, causes output terminal 983b to go to the binary zero state. Since this is the last binary one bit in the coded character being received this is the last shift operation which takes place between the output terminals 983b and 983c of flip-flop 983. Thus a binary one state at output terminal 983 which passes through an emitter follower circuit to output terminal 984 is interpreted as an even parity count. This situation is as it should be to identify that the character is correct from the parity check viewpoint.

If the output terminal 984 (i.e., the even count terminal) of the parity check circuit 980 is at the binary one level voltage, this voltage level is impressed upon one input terminal 1029 of the delay circuit 1035, shown in FIGURE 14 of the drawings. This delay circuit, upon receipt of the even count indication, generates a signal at its output terminal 1018 enabling the received character which has been loaded into the characters receiving register to be gated OUT into an intermediate memory, shown in FIGURE 15 of the drawings and likewise, to be more fully described.

Simultaneously with the loading of the characters receiving register, the gray bits register is loaded in a similar manner and in synchronism with loading of the characters receiving register, so that each data bit if it is to be or has been tagged gray will be such that the gray bits designation will occupy the same bit position in the gray bits register as does the gray bit occupy in the characters receiving register.

The gray bits register 1100 is shown in FIGURE 13 of the drawings and is comprised of a six-stage shift register having stages 1103–1108, respectively. For purposes of clarity, the shift register stages 1103–1108 have been shown in block diagram form and it should be understood that they are substantially similar in design and function to the shift register stages of the characters receiving register 950, shown in FIGURE 12. The gray bits register 1100 is further comprised of input terminals 1101 and 1102 which are connected, respectively, to the output terminals 414 and 415 of the gray bits register loading element flip-flop 411, shown in FIGURE 4 of the drawings.

For the purpose of describing the operation of the gray bits register 1100, let it be assumed that the receiver facility has received the start bit and upon examination of the start bit from the information interval level the start bit has been detected as being a gray bit. As was previously described, this causes the output terminal 414 of gray bits loading register element 411, shown in FIGURE 4, to go to the binary one level. This voltage level is impressed upon input terminal 1101 which is connected to the set input terminal 1103a of the first shift register stage 1103. This causes the output terminal 1103e of shift register stage 1103 to move to the binary one voltage level, after the shift register stage 1103 receives a shift-in pulse at its shift pulse input terminal 1103c via input bus 1109 which is connected to the output terminal 342 of the delay circuit shown in FIGURE 3 of the drawings. Thus it can be seen that simultaneously with the loading of the start bit into the flip-flop stage 954 of characters receiving register 950 the gray bits designation is shifted into stage 1103 of gray bits register 1100. As the start bit is shifted from the left to the right through characters receiving register 950, the gray bits designation for this start bit is shifted from the left to the right through gray bits register 1100 and at the same speed that the start bit is shifted through characters receiving register 950. Therefore, upon shifting of the start bit into the right-handmost flip-flop stage 964 of characters receiving register 950 the gray bit is shifted into the right-handmost shift register stage 1108 of gray bits register 1100. It should be understood that a greater or lesser number of gray bits, other than just one gray bit may appear in each coded character received. When such a gray bit designation appears this causes the output terminals 1111–1115 of the shift register stage 1104–1108, respectively, which is shown to contain a gray bit designation. These gray bit designations are employed for the purpose of first determining whether the coded character received has the number of gray bits which permits correction [i.e., the coded character which has been received errored within the "correction radius"]. The second function which the gray bits designations serve is the conversion operation for altering the bit which has been tagged gray in order to see whether or not this corrected coded character now represents a valid character within the coded characters which the system employs for transmission and reception purposes.

Simultaneous with the loading of gray bits into the gray bits register 1100, shown in FIGURE 13, the gray bits are counted to determine whether no, one, or more than one gray bit is present in a received coded character. Assuming that only one gray bit is received for a coded character, this places the coded character which is ostensibly in error within the correction radius of the system. The gray bits are counted in gray bits counting circuit of FIGURE 17. The gray bits counting circuit develops a binary one level voltage at its output terminal 1722c indicative of the fact that only one gray bit is present in the received coded character. This binary one level voltage is impressed upon the input terminal 1020b of AND gate 1020, shown in FIGURE 14 of the drawings. Input terminal 1020a of AND gate 1020 is connected to the output terminal 985 of parity check circuit 980, shown in FIGURE 12 and is in binary one condition when an odd binary count is generated therein, which further serves as an indication that the received coded character is in error. Input terminal 1020c of AND gate 1020 is connected to output terminal 1019 of delay circuit 1035, as shown in FIGURE 14. The output terminal 1015b of monostable multivibrator 1015 in delay circuit 1035 goes to the binary one state after a delay period $d$, which delay period follows the binary one level voltage impressed upon the input trigger termial 1015a of monostable multivibrator 1015. However, output terminal 1015c of multivibrator 1015 generates a binary one level voltage at its output terminal 1019 immediately upon receipt of the start bit of the received coded character at input terminal 1015a.

Thus this binary one level voltage is impressed upon input terminal 1020c of AND gate 1020 indicative of the fact that the coded character has been received and completely loaded into the characters receiving register 950. Thus AND gate 1020 generates a binary one level voltage at its output terminal which passes through an emitter follower to output terminal 1021. This binary one state indicates that a coded character has been fully loaded into characters receiving register 950, that the parity count has been shown to be odd and further, that one gray bit has been indicated as being loaded into the gray bits register 1100. The binary one state generated by AND gate 1020 appearing at its output terminal 1021 is transferred to bus 1001, which bus is electrically connected to input terminals 1002b–1005b of AND gates 1002 and 1005, respectively. The remaining input terminals 1002a–1005a of AND gates 1002–1005 are connected to the output terminals 1111–1114, respectively, of gray bits register 1100. Since only one of these terminals 1111–1114 contains a gray bit indication, only one of the four AND gates 1002–1005 will have binary one conditions at both of its input terminals. Thus the selected one of the AND gate output terminals 1007–1010 will be in the binary one condition. These output terminals 1007–1010 are connected respectively to the input terminals 955d, 957d, 959d and 961d, respectively, of characters receiving register 950. Let it be assumed for the purposes of an operating description that shift register stage 1106 has a binary one condition at its output terminal 1113 indicative of a gray bit indication. As previously described, any bit tagged as gray is loaded into the receiving register as a binary zero bit. The binary one level of output terminal 1113 appears at input terminal 1004a of AND gate 1004 and together with the binary one state from output terminal 1021 causes AND gate 1004 to generate a binary one voltage level at its output terminal. This is transferred through an emitter follower, an output terminal 1009, through input terminal 959d, of the shift register logic network 959. This causes a binary one condition to be impressed upon the input terminal 960b which is the flip-flop set input terminal of flip-flop element 960. This causes the output terminal 969 of the flip-flop stage to go to the binary one condition under control of the binary one condition of the AND gate 1004. The output terminal 1021 of AND gate 1020 is further connected to the input terminal 981b of OR gate 981 causing parity generating circuit 980 to receive a binary one condition at its set input terminal 983a. This causes output terminal 984 of parity generating circuit 980 to go to binary one condition providing an even count for the received character. Thus the character has now been corrected in the one position wherein that data bit had been tagged gray and likewise the parity count has been corrected accordingly.

Considering the delay circuit 1035 of FIGURE 14, as was previously described, the trigger input terminal 1015a of monostable multivibrator 1015 receives a binary one pulse when the start bit is shifted into the righthandmost stage 964 of characters receiving register 950. The output terminal 1019 of monostable multivibrator 1015 goes to binary one at this time enabling AND gate 1020 at input terminal 1020c. Multivibrator 1015 then resets itself causing a negative square pulse, such as the square pulse 1030 to be formed at its output terminal 1015b. The trailing edge 1030a of the square pulse 1030 is employed to trigger the input terminal 1016a of monostable multivibrator 1016. The pulse width d of negative square pulse 1030a thus provides a delay period of d seconds before triggering monostable multivibrator 1016. At the time the monostable multivibrator is triggered it generates a positive square pulse 1031 at its output terminal which is passed through an emitter follower to the input terminal 1017a of AND gate 1017. Input terminal 1017b is connected to the output terminal 984 of parity generating circuit 980 and when parity generating circuit 980 shows an even count this is a binary one state output causing AND gate 117 to generate a binary one voltage level at its output terminal which is passed through an emitter follower to output terminal 1018. Output terminal 1018 is connected to the input terminal 1006a of OR gate 1006 which passes this binary one voltage level through its output terminal and an emitter follower to output terminal 1011. This condition is employed as a reset pulse which is imposed upon characters receiving register 950 and gray bits register 1100 to reset these registers in readiness for the next coded characters to be received and simultaneously therewith to feed the coded character presently contained in the characters receiving register into a memory unit, shown in FIGURE 15. Output terminal 1011 is connected by means of a bus 965, shown in FIGURE 12, which is connected to all of the reset input terminals 953a–963a of characters receiving register 950 to reset the register for the next received coded character. Gray bits register 1100 is provided with an input bus 1110 connected to output terminal 1011 which simultaneously impresses this binary one condition upon the reset input terminals 1103f–1108f, respectively, of gray bits register 1100 thereby resetting the register in readiness for the next coded character to be received. The output terminal 1011 is further connected to the input bus 1201 of memory circuit 1200, shown in FIGURE 15 of the drawings. Bus 1201 is connected to the input terminals 1202b–1206b of AND gates 1202–1206. The other input terminals 1202a–1206a of AND gates 1202–1206 are connected to the output terminals 966–970 respectively, of characters receiving register 950, shown in FIGURE 12. Thus upon the occurrence of the gate OUT signal at output terminal 1011 the received coded character is transferred through the AND gates 1202–1206 into the first level 1230a of the memory circuit portion 1230, and memory means 1200. OR gate 1207 is provided with input terminal 1207a which is connected to output terminal 1021 of FIGURE 14, which shows that a coded character has been treated which contained one gray bit. This condition is passed through an emitter follower to the input terminal 1213a of memory element 1213 which may be, for example, any suitable flip-flop circuit. This places the flip-flop element 1213 in the binary one condition indicative of the fact that the coded character which it accompanies and which is transferred into the flip-flop elements 1208–1212 of level 1230a of the memory has been detected as having contained one gray bit.

Returning to FIGURE 14, an AND gate 1012 is provided therein having its input terminal 1012a connected to the output terminal 1019 of monostable multivibrator 1015. Thus when a character is fully loaded into the characters receiving register 950, terminal 1012a is binary one. Input terminal 1012b is connected to output terminal 985 of the parity generating circuit 980 and is binary one when an odd or incorrect binary count is contained therein. Input terminal 1012c is connected to an inverter circuit 1013 having its input terminal 1013a connected to terminal 1020b of AND gate 1020 which terminal receives a one gray bit indication. Thus for any other gray bit indication, input terminal 1013a is binary zero and upon being inverted by inverter circuit 1013 makes input terminal 1012c of AND gate 1012 binary one. These three conditions generate a binary one voltage at the output of AND gate 1012 which passes through an emitter follower to the input terminal 1006b of OR gate 1006. This again in turn passes through an emitter follower to output terminal 1011 which is used as a reset pulse in the same manner as previously described. In addition thereto, output terminal 1014 is electrically connected to the input terminal 1207b of OR gate 1207 which passes through an emitter follower to the set input terminal of flip-flop element 1213. This likewise tags the coded character which it accompanies as being errored. Thus a binary one condition in flip-flop element 1213 is interpreted as either a correctible or uncorrectible coded character.

A binary one output condition generated by OR gate 1207 of FIGURE 15 and which is stored in the storage element or flip-flop 13 is impressed upon the input terminal 1251 of the vertical parity comparison circuit 1250 shown in FIGURE 16. Before a consideration of the operation of the circuitry shown in FIGURES 15, 16 and 17, the vertical parity operation will first be described from the viewpoint of the mathematical operations which are performed.

Vertical parity information is requested by the receiver and is sent from the transmitter location when the character which has been received and analyzed by the receiver location self-optimizing terminal system is shown to be errored and is further in a condition such that the error lies beyond the one bit correction radius of the error correction and detection means described previously.

Vertical parity is generated in the manner shown in the chart set forth immediately below:

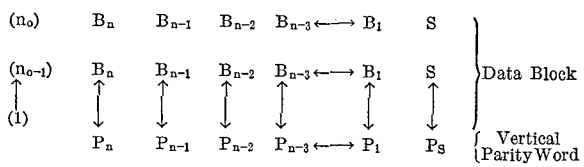

The vertical parity word is comprised of a predetermined number of vertical parity bits equal in number to the number of data bits and parity bits in a coded character. For example, in the examples set forth previously herein, a data word is comprised of four binary bits providing a binary coded decimal representation and of a parity bit to establish an even parity count for the coded character. The chart set forth immediately above $n$ coded characters $1-n_0$ where from the viewpoint of order of transmission coded character tagged $n_0$ is transmitted first and the coded character tagged 1 is transmitted last from the sending location. Each coded character is comprised of $n$ data bits $B_1$-$B_n$ and a single parity bit S which is designed to provide an even parity for the coded character.

The vertical parity word is comprised of $n$ parity bits $P_1$-$P_n$ equal in number to the data bits for the coded characters and is further comprised of a vertical parity bit $P_S$ which is an even parity bit of the single parity bits for the coded characters transmitted. Each vertical parity bit $P_1$-$P_n$ and $P_S$ is formed in the following manner:

In order to form the vertical parity bit $P_n$ all of the data bits $B_n$ for the $n$ coded characters $1-n_0$, respectively, are added in binary fashion. The vertical parity bit $P_n$ is then selected so that, when added to the single parity total of the first column of data bits $B_n$, the vertical parity bit provides an even parity count. Each remaining vertical parity bit $P_n-1-P_1$ is formed in a like manner by adding in a binary fashion the data bits aligned in the same column in which the vertical parity bit is located, thus establishing the designation or name vertical parity. The vertical parity bit $P_S$ is formed by adding in binary fashion the single partiy bits S of the $n$ coded characters $1-n_0$ and then selecting the binary state of the vertical parity bit $P_S$ so as to estblish an even parity count for the summation of the single parity bits S together with the vertical parity bit $P_S$. The size of the data block employed in the generation of the vertical parity word is dependent upon the correction capabilities desired by the user and may be as few as two coded characters per data block or as many as ten coded characters per data block, citing two specific examples. It should, however, be understood that a greater or lesser number than ten coded characters per data block may be employed depending strictly upon the correction capabilities desired for the system application.

In employing such a single parity mode, that is, a one bit parity mode of either odd or even parity, error evasion still exists and the possibilities of the occurrence of an even number of compensating errors in any one vertical line or column inclusive of the error at the vertical parity level of the data block. The probabilities associated with such events are:

$$P_2 = {_2}B^{n_0+1}P_B^2 q_B^{n_0-1}$$
$$P_4 = {_4}B^{n_0+1}P_B^4 q_B^{n_0-3}$$
$$P_x = {_x}B^{n_0+1}P_B^x q_B^{n_0+1-x}$$
$$q_B = 1 - P_B$$

where $x=$ any even integer equal to or less $n_0+1$. Since $P_B$ here is the probability of a bit-error at any bit-position in the block, it follows that for $P_x$ to have a uniform value at all bit-rates, accommodations must be made to the value of P which exists at any given time. Two factors are used to guide the decision:

(a) Whether any new transmission mode involves a shift to or from higher redundancy character codings and (b) Whether or not any new transmission mode involves a shift to or from a higher bit-rate. Theoretically, when an increase in horizontal redundancy is requested the frequency in development of vertical partiy data is increased to reflect both the higher probability of single-character mutilation (due to the higher bit-content) and the higher incidence of bit-error. In these regards, the following is instructive:

At the 1250 b.p.s. information rate, all probabilities for the ultimate rate of a bit are stated by:

$$p^2 + 2Pq + q^2 = 1$$

where:

$q^2 =$ the probability of both "information intervals" arriving unaltered at the Receiving End (since there are two "information intervals" at the 1250 b.p.s. bit rate).

$2Pq =$ the probability of one of two "information intervals" being marred.

$p^2 =$ the probability of both "information intervals" being errored.

In fact $P^2$ also designates the probability of an errored bit arriving undetected under the condition of operation of the terminal. If the probability of an errored bit going undetected is arbitrarily set at $10^{-6}$ (i.e., which gives a character error-of-evasion probability of approximately $10^{-12}$), it can then be said that the probability of erroring of an "information interval" would have to be $10^{-3}$. If the probability of an errored "information interval" were $10^{-3}$, $2(0.001)(0.999) = 2Pq =$ the probability of a "gray" bit under the conditions of operation of the terminal $[\approx 2(10^{-3})]$.

If we take the terms $q^n$ thru $B^n p^{n/2} q^{n/2}$ for a data bit having $n$ information intervals, then $$q^n + {_1}B^n P q^{n-1} + {_2}B^n P^2 q^{n-2} + \ldots + {_{\frac{n}{2}}}B^n P^{\frac{n}{2}} q^{\frac{n}{2}} = A$$

where A represents the probable events which lie within the "decisions" radius of the black-white on gray decision logic of the self-optimizing terminal. On the other hand, $$_{\frac{n}{2}+1}B^n P^{\frac{n}{2}+1} q^{\frac{n}{2}-1} + {_{\frac{n}{2}+2}}B^n P^{\frac{n}{2}+2} q^{\frac{n}{2}-2} + \ldots + P^n = B$$

represents all probabilities lying beyond the decision logic (i.e., all manners of events in which the decisions made by the decision logic are bound to be in error). If we now define a sum of those terms which could be associated with "gray"-designations, $$_aB^n P^a q^{n-a} + {_{a+1}}B^n P^{a+1} q^{n-a-1} + \ldots + {_{\frac{n}{2}}}B^n P^{\frac{n}{2}} q^{\frac{n}{2}} = C$$

C is a quantity which can be evaluated in terms of circuit

"hardware actions." A study of charts I thru III of FIGURES 2a–2c will confirm that:
 (i) the two largest terms in determining C would be $$_{\frac{n}{2}-1}B^n P^{\frac{n}{2}-1} q^{\frac{n}{2}+1}$$

and $$_{\frac{n}{2}}B^n P^{\frac{n}{2}} q^{\frac{n}{2}}$$

(ii) of the two terms, the full-time working term and therefore the more "sensitive" is the latter. If P itself is "kept" by the self-optimizing terminal's actions to any value which justifies its use, the most important, and in fact, value-determining—term in evaluating B is $$_{\frac{n}{2}+1}B^n P^{\frac{n}{2}+1} q^{\frac{n}{2}-}$$

Such a "gray" bits incidence at 12 "information intervals" per single parity protected character would of course mean $$\frac{\frac{2}{1000}}{6} = \frac{2 \text{ "gray"-bits}}{166.67 \text{ characters}}$$

or $$\frac{2 \text{ "gray" bits}}{1000 \text{ bits}} = \frac{1}{500 \text{ bits}} = P_B$$

This is to say, that if the error-of-evasion probability is to be held at $10^{-12}$, a higher redundancy for each character should be invoked as soon as a correction logic use-rate of approximately once per 42 characters is experienced. Given a block of 400 characters as the typical block, $$200(401)P_B^2 q_B^{399} \doteq 200(401)\left(\frac{2}{1000}\right)^2 (0.998)^{399} = 61(10^{-2})$$

would be the probability of a nullification of vertical parity data usefulness. If, on the other hand, we arbitrarily request a probability of $10^{-3}$ for a possible nullification of vertical parity data usefulness, then $$\frac{n_0(n_0+1)}{2}P_B^2 q_B^{399} = \frac{1}{1000} = \frac{n_0^2 + n_0}{2}\left(\frac{2}{1000}\right)^2 = 10^{-3}$$

which can be written as:

$$n_0^2 \doteq \frac{10^3}{2}$$

$$n_0 \doteq 22$$

as long as $P_B = 2(10^{-3})$.

In the most general sense, where n=the number of "information intervals" of which a data bit is composed, then $$(P+q)^n = q^n + B^n P q^{n-1} + {}_2B^n P^2 q^{n-2} + $$

$$\ldots + {}_{\frac{n}{2}}B^n P^{\frac{n}{2}} q^{\frac{n}{2}} + {}_{\frac{n}{2}+1}B^n P^{\frac{n}{2}+1} q^{\frac{n}{2}-1} + \ldots + P^n = 1$$

expresses all probabilities which might apply to a bit as it leaves the transmitting end of the system. This would then justify the conclusion that:

$$\frac{C}{B_{\frac{n}{2}-1}} = \frac{n}{2} \frac{B^n P^{\frac{n}{2}} q^{\frac{n}{2}}}{B^n P^{\frac{n}{2}+1} q^{\frac{n}{2}-1}} \doteq \frac{\left(\frac{n}{2}+1\right)}{\left(\frac{n}{2}\right)P}$$

Taken with the approximation that:

$$P^{\frac{n}{2}} = \frac{\left(\frac{n}{2}!\right)\left(\frac{n}{2}!\right)C}{n!}$$

and means thereby exists for putting a value on B relative to any circuit "hardware-determined" value for C. Such a value of B when entered into the expression $$n_0^2 = P_X / P_B$$

under the approximation $$P_B \doteq B$$

establishes the frequency with which vertical parity data should be collected. If to these understandings, we add the facts that
 $10B^2$=probability of an error-of-evasion under single parity protection
and
 $7B^3$=probability of an error-of-evasion under Hamming [three redundant bits] coding [to be more fully described], we arrive at a general justification for the use of "gray"-bits incidence as an index for the control of:
 (a) Bit speed to bit speed shifting
 (b) Coding to coding shifting
 (c) Frequency of generation of vertical parity check data.
For:

```
n=2
P   =0.1         0.01         0.001
C   =0.2         0.02         0.002
B   =0.01        10⁻⁴         10⁻⁶
[Pᴇ]₁=10⁻³       10⁻⁷         10⁻¹¹
[Pᴇ]₃=0.7[10⁻⁵]  0.7[10⁻¹³]   0.7[10⁻¹⁷]

n=4
P   =0.1         0.01
C   =0.06        6[10⁻⁴]
B   =4[10⁻³]     4[10⁻⁶]
[Pᴇ]₁=1.6[10⁻⁴]  1.6[10⁻¹⁰]
[Pᴇ]₃=4.5[10⁻⁷]  4.5[10⁻¹⁶]

n=8
P   =0.1
C   =7[10⁻³]
B   =5.6[10⁻⁴]
[Pᴇ]₁=3[10⁻⁶]
[Pᴇ]₃=1.23[10⁻⁹]
```

Where:

B=the probability of a nondetected errored bit
 $[P_E]_1$=probability of an error-of-evasion under single parity check
 $[P_E]_3$=probability of an error-of-evasion under Hamming three redundant bits redundancy protection
 P=probability of error for any "information interval"
 C=gray-bits incidence rate
 To illustrate the significances of the quantities given above and the material on which it is based, let it be axiomatic that the probability of an error-of-evasion-$P_e$ be $10^{-8}$.
 On the basis of $$[P_e]_1 = 10B^2$$

and $$[P_e]_3 = 7B^3$$

B could have a value of $3.2[10^{-5}]$ under single parity protection conditions and $1.1[10^{-3}]$ under Hamming coding conditions. Since $$B = \frac{\frac{n}{2}}{\frac{n}{2}+1} PC$$

and $$C_2 \doteq 2P$$
$$C_4 \doteq 6P$$
$$C_8 \doteq 70P^4$$

then $$B_2 = P^2$$
$$B_4 = 4P^3$$
$$B_8 = 56P^5$$

(i) Accordingly, as long as $$p \lesseqgtr 5.66[10^{-3}]$$

or $$C \lesseqgtr 11.32[10^{-3}]$$

it would be permissible to work at $n=2$ and single parity protection;

(ii) After which, as long as $$p \lesseqgtr 3.32[10^{-2}]$$

or $$C \lesseqgtr 6.64[10^{-2}]$$

it would be permissible to work at $n=2$ and Hamming coding;

(iii) After which, as long as $$p \lesseqgtr 0.065$$

or $$C \lesseqgtr 0.0252$$

it would be permissible to work at $n=4$ and Hamming coding;

(iv) After which, as long as $$p \lesseqgtr 0.11$$

or $$C \lesseqgtr 0.01$$

it would be permissible to work at $n=8$ and Hamming coding.

The question of frequency of generation of vertical parity data is connected with:

(a) The frequency with which correction will *not* be possible on a "gray"-bits location basis,
and
(b) The frequency with which errors-of-evasion will occur.

The situation stated by (b) is far more remote than any of the constituent eventualities of which (a) is composed. In the case of item (a), a failure of "gray"-bits guided correction to occur can be caused by:

(1) One (or more) undetected bit-errors in a character; or
(2) A number of "gray"-bits in any single character exceeding the coding's radius of correction. Quantitatively, the most significant cause for a failure to do "gray"-bits guided correction is the presence of a singlet undetected bit-error, whose probability is indeed B. Consequently, setting $$P_b = B$$

we see that $$_2B^{n0+1}P_B^2 q_B^{n0-1}$$

states the probability of nullification of any one vertical single parity bit. If the character data then consists of $n_b$ bit, it follows that $$n_{B2}B^{n0+1}P_B^2 q_B^{n0-1} = P_n$$

states the probability of defeat of a vertical [single] parity protected group of characters. For computational purposes, the expression for $P_n$ can be reduced to $$\frac{n_B n_0^2 P_B^2}{2} = {}_nP$$

Returning now to a consideration of the FIGURES 14, 15 and 16 which set forth the hardware for performing the vertical parity checking operation to perform error detection and correction:

The binary one condition generated at the output terminal 1207c of OR gate 1207 is impressed upon the set input terminal 1251a of the flip-flop 1251 provided in the vertical parity check programming circuit 1250, shown in FIGURE 16. The binary one level causes the output terminal 1251c of flip-flop 1251 to go to binary one, which level is passed through an emitter follower to the input terminal 1252b of AND gate 1252. The other input terminal 1252a is connected to output terminal 1011 which goes to the binary one state upon the completion of the error correcting operation in the manner previously described. The output terminal 1252c passes the binary one condition through an emitter follower to the control input terminal 1253a of flip-flop 1253 to begin a count-of-three count which is to be employed in a manner to be more fully described.

Output terminal 1251c is further connected to bus 1261 which is connected in parallel to the input terminals 1256b–1260b of AND gates 1256–1260, respectively. The input terminals 1256a–1260a are connected to the output terminals 1208b–1212b of the flip-flop memory elements 1208–1212, shown in FIGURE 15, which memory elements contain the coded character which has been tagged as being errored. Thus upon the occurrence of a binary one level in bus 1261 AND gates 1256–1260 pass the binary states of the memory elements 1208–1212 in order to set the flip-flop elements 1261–1265 of FIGURE 16. The output terminals 1261b–1265b of flip-flops 1261–1265 are connected through emitter followers to the input terminals 1266a–1270a of checking circuits 1266–1270, respectively. Checking, or comparison circuits 1266–1270 are employed for the purpose of comparing the vertical parity word transmitted from the sending location against the vertical parity word generated by the vertical parity flip-flops 1261–1265 at the receiver location, in a manner to be more fully described.

In the exemplary embodiment set forth in FIGURES 14–16 the data block size has been selected as being comprised of two coded characters. This means that a vertical parity is formed for every two coded character transmitted by the transmitter location. While the manner in which the vertical parity is generated at the transmitter location will be described more fully later, it should be understood that the transmitter location generates on a stand-by basis a vertical parity word for every two coded characters which it sends to the receiver location. Assuming that the two coded characters from which the vertical parity word has been formed are transmitted and received, such that they are error free, the vertical parity is then erased and a new vertical parity is developed for the next two coded characters which are sent from the transmitter location. Therefore, assuming that a coded character which has been examined at the receiver location and shown to be beyond the correction radius of the self-optimizing terminal, this indication is impressed upon flip-flop 1251 in the manner previously described. However, since the vertical parity will not be sent from the transmitter location until two coded characters have first been sent, the flip-flops 1253 and 1254 are employed to provide a count-of-three indication thereby identifying at the receiver location the fact that two coded characters plus a vertical parity word have been received at the receiver location. Thus the errored character indication causes output terminal 1251c of flip-flop 1251 to go to the binary one state. When this binary one level occurs simultaneously with a binary one level from the output terminal 1011 of FIGURE 14 AND gate 1252 passes a binary one condition from its input 1252c through an emitter follower to the input terminal 1253a of flip-flop 1253. This sets the output terminal 1253c in the binary one condition. The next coded character is then transmitted from the transmitter location in the manner to be more fully described and after it is examined by the self-optimizing terminal output terminal 1011 again generates a binary one condition which is impressed upon the input terminal 1252a of AND gate 1252.

The receiver location upon the generation of the binary one condition at output terminal 1014 of FIGURE 14 establishing the fact that an uncorrectible error condition exists, transmits by means to be more fully described, the signal to the sending location requesting the vertical parity word to be transmitted in order that the uncorrectible coded character may be suitably corrected. Before transmitting the vertical parity word, however, the sending location sends the next coded character to be transmitted in order to complete the data block which is comprised of two data words as was previously described in order to generate a suitable vertical parity word. The transmitter location thereby sends out the next successive coded character which is again examined by the receiver location. Assuming this character to have been received error free upon completion of the examination output terminal 1011 generates a binary one condition which is impressed upon the terminal 1252a of AND gate 1252 causing AND gate 1252 to generate another binary one level signal at the input terminal 1253a of flip-flop 1253. This causes output terminal 1253b to go to binary one while output terminal 1253c goes to binary zero. The binary one level of 1253b is connected to the input terminal 1254a of flip-flop 1254 causing its output terminal 1254b to go to binary one. The next information transmitted from the transmitter location is the vertical parity word which is generated using the last data block, that is the last two coded characters as the basis for the generation of the vertical parity word. The vertical parity word is examined by the receiver location self-optimizing terminal in the same manner as the data word and assuming this vertical parity word to be received error free output terminal 1011 again generates a binary one level signal causing AND gate 1252 to again be enabled placing a binary one level at the input terminal 1253a of flip-flop 1253. This causes output terminal 1253c to go to binary one and output terminal 1253b to go to binary zero. At this output terminals 1253c and 1254b of flip-flops 1253 and 1254, respectively, are in binary one thereby providing an indication of a count-of-three. In other words, providing an indication that three coded characters have been received and examined by the receiver location. These binary one levels are impressed through emitter followers upon the input terminals 1255a and 1255b of AND gate 1255 causing output terminal 1255c to go to binary one. This condition is passed through an emitter follower to the reset input terminal 1251d of flip-flop 1251 thereby resetting the flip-flop to cause the output terminal 1251c to go to binary zero. This prevents any further count from being generated by the count-of-three means comprised of the flip-flops 1253 and 1254. Simultaneously therewith, output terminal 1251b goes to binary one, which condition is passed through an emitter follower to bus 1271. Bus 1271 simultaneously impresses this binary one condition upon the input terminals 1266c–1270c of comparison circuits 1266–1270, respectively.

Before proceeding with a description of the operating mode of comparison circuits 1266–1270, it should first be noted that the first errored character was passed through the AND gates 1202–1206 into the memory elements 1208–1212 which comprise the first level 1230a of the three-storage levels of memory 1230. Upon completion of examination of the first data word which has been shifted into level 1230a of three-level memory 1230, the output pulse 1011 is developed in the manner previously described, which pulse is impressed upon the bus 1272 of FIGURE 15, which is connected to the shift input terminals 1214f–1219f of the level 1230b of memory 1230. This causes the data word stored in level 1230a to be shifted into level 1230b of memory 1230. The pulse 1011 is simultaneously impressed upon the input terminal of a delay circuit 1274, the output of which is connected to bus 1271 which is connected in parallel to the reset input terminals 1208c–1213c of the level 1230a of memory 1230. The delay means 1274 which is provided generates a delay of a sufficient time duration to insure the fact that the data word shifted from level 1230a to 1230b has been shifted in the level 1230b before level 1230a becomes reset.

The next data word to be received, which is the second data word of the two word data block is then transferred through the AND gates 1202–1206 together with OR gate 1207 in to the memory elements 1208–1213 in the manner previously described. The first and second data words are now contained in the memory levels 1230b and 1230a, respectively, of the three level memory 1230. Upon completion of this operation the pulse developed at output terminal 1011 of FIGURE 14 is impressed upon the buses 1272 and 1273 simultaneously, causing the second data word contained in the level 1230b of memory 1230, to be shifted in the level 1230c and the data word contained in level 1230a to be shifted into level 1230b. The output pulse 1011 is again impressed upon the delay means 1274 which provides a predetermined time delay before the reset of the memory level 1230a.

Since the transmission of the two data words completes the data block, the next transmission is that of the vertical parity word which is examined by the self-optimizing terminal in the same manner as are the coded data words. It is then shifted into the first level 1230a of memory 1230 so that level 1230c now contains the first transmitted data word while 1230b contains the second data word of the two word block and level 1230a contains the vertical parity word.

As was previously described, the binary one pulses generated at terminal 1011 are impressed upon the input terminal 1252a of AND gate 1252 and cause a count of three count to be developed in the flip-flop elements 1253 and 1254. At the count of three, output terminals 1253c and 1254b are in the binary one state and are impressed through emitter followers upon the input terminals 1255a and 1255b of AND gate 1255. The AND gate passes this binary one condition through its output terminal 1255c and an emitter follower to the reset input terminal 1251d of flip-flop 1251. The reset of flip-flop 1251 places its output terminal 1251b at the binary one level which is passed through an emitter follower to bus 1271. The binary one pulse impressed upon bus 1271 enables the results of the vertical parity comparison operation to be passed and appear at the output terminals 1266c–1270c of the comparison circuits 1266–1270, respectively. Since all the comparison circuits 1266–1270 are identical only one such comparison circuit is shown in detail for purposes of clarity. The comparison circuit 1267, which is shown in detail, will therefore be described, it being understood that the other comparison circuits 1266 and 1268–1270 are the same in both hardware and operation. Comparison circuit 1267 is provided with two input terminals 1267a and 1267b. Terminal 1267a is connected to the output terminal 1209b of flip-flop element 1209 in memory level 1230a. Input terminal 1267b is connected to the output terminal 1262b of vertical parity flip-flop 1262. It should be understood that the vertical parity flip-flops 1261–1265 generate a vertical parity count in identical manner to the single parity generating flip-flop 983 of FIGURE 12 described previously. Thus the function of comparison circuit 1267 is to compare the locally generated vertical parity bit generated in flop-flop 1262 against the received vertical parity bit stored in flip-flop element 1209.

Input terminal 1267a is connected to input terminal 1280a of AND gate 1280 and input terminal 1281a of OR gate 1281. Input terminal 1267b is connected to input terminal 1280b of AND gate 1280 and input terminal 1281b of OR gate 1281. The output of AND gate 280 is connected to input terminal 1283a of OR gate 1283, while the output terminal of OR gate 1281 is passed through an inverter circuit 1282 and through to the input terminal 1283b of OR gate 1283. The output of OR gate 1283 is connected to input terminal 1284b of AND gate 1284 and the bus 1271 is connected to the input terminal 1267d of comparison circuit 1267, which in turn is connected to the input terminal 1284a of AND gate 1284.

Assuming that both input terminals 1267a and 1267b receive binary one conditions, this condition is passed by AND gate 1280 and OR gate 1283 to AND gate 1284. Upon the occurrence of the binary one level pulse 1271 this comparison is passed by AND gate 1284 to output terminal 1267c. The output terminal 1267c is connected to the correct input terminal 1221d of memory element 1221 in order to perform a correction operation on the errored data bit. Since the output terminal of AND gate 1284 passes through an inverter 1285 before appearing at the output terminal 1267c when a favorable comparison occurs output terminal 1267c is therefore at the binary zero level. The first example given when binary ones are impressed upon both input terminals 1267a and 1267b and was passed through AND gate 1280, OR gate 1283 and AND gate 1284 inverter circuit 1285 presents a binary zero level at the output terminal 1267c thereby preventing any change from occurring in memory element 1221 of memory level 1230c which now contains the errored coded character.

Assuming the input terminals 1267a and 1267b to have binary zero conditions impressed thereon, this prevents AND gate 1280 from generating a binary one condition and likewise prevents OR gate 1281 from generating a binary one condition. However, the output terminal of OR gate 1281 is connected to the input of OR gate 1283 to inverter circuit 1282 which due to the presence of a binary zero condition at OR gate 1281 presents a binary one condition to OR gate 1283 which is passed to AND gate 1284 thereby indicating a favorable comparison of the vertical parity bits impressed upon the input terminals of comparison circuit 1267. This indication is inverted by inverter circuit 1285 to present a binary zero level output at the output terminal 1267c.

Let it now be assumed that a binary one condition is impressed at the input terminal 1267a and a binary zero condition is impressed at the input terminal 1267b. It can clearly be seen that AND gate 1280 will not generate a binary one level condition at its output terminal. However OR gate 1281 will generate a binary one condition at its output terminal which is inverted by inverter circuit 1282 so that OR gate 1283 provides a binary zero level condition at its output terminal. This is impressed upon the input of AND gate 1284 and upon the occurrence of a binary one level condition at its input terminal 1284a, nevertheless fails to generate a binary one level condition at its output terminals. This condition is inverted by inverter circuit 1285 to provide a binary one level output at the output terminal 1267c. This in turn is impressed upon the correction input terminal 1221d of memory element 1221 in order to invert the binary state of the data bit contained therein. The comparison circuits 1266 and 1268–1270 operate in a like manner and will selectively correct or retain the condition of the memory elements 1220 and 1222–1224, respectively, of memory level 1230c.

The binary one pulse appearing at the output terminal 1261 of flip-flop 1251b of flip-flop 1251 and which is impressed upon bus 1271 is simultaneously impressed upon monostable multivibrator 1286 at its trigger input terminal 1286a. This generates a negative square pulse at output terminal 1286b, the trailing edge of which is employed to trigger multivibrator 1287 at its trigger input terminal 1287a, thus establishing a time delay equal in length to the duration of the negative square pulse which is a time $d$. This causes a positive square pulse to be developed at the output terminal 1287b of multivibrator 1287 which is passed through an emitter follower to output terminal 1288. Output terminal 1288 is connected to the set input terminal 1289a of flip-flop 1289 causing its output terminal 1289b to go to binary one. This condition is passed through an emitter follower to one input terminal 1290a of a pulse AND gate circuit 1290. The other input terminal 1290b of pulse AND gate circuit 1290 is connected to the output terminal 1291a of a free running multivibrator 1291. The pulse AND gate circuit 1290 operates in the same manner as the pulse AND gate 320 shown in FIGURE 3 of the drawings and develops positive going voltage spikes at its output terminal 1290c which are impressed upon the input terminal 1293a of count-of-six counter 1293. The count-of-six counter 1293 is advanced by one count at a rate determined by the rate of operation of free running multivibrator 1291. Upon the occurrence of the first input voltage spike to counter 1293 the counter develops a binary one condition at its output terminal C1′ while the remaining output terminals C2′–C6′ are in binary zero state. The terminal C1′ is ANDED with the output terminal 1220e of memory element 1220 contained in memory level 1230c. This AND operation is provided by AND gate 1294. AND gate 1294 passes this condition through an emitter follower circuit to output terminal 1294c. It should be understood that the multivibrator 1286 previously described provides an adequate time delay of duration $d$ so that the ANDING operation which occurs in AND gates 1294–1298 is not initiated before the correction operations have been completed in the memory elements 1220–1225 of memory level 1230c.

The next positive voltage spike impressed upon counter 1293 causes the count to be advanced by one thereby causing output terminal C2′ to go to binary one while output C1′ goes to binary zero. The output C2′ is ANDED with the output terminal 1221e of memory element 1221. Counter 1293 steps in this manner subsequently ANDING the outputs C3′–C5′ with the outputs 1222e–1224e of memory elements 1222–1224, respectively. The output terminals 1294c–1298c are impressed upon the five input terminals 1299a–1299e, respectively, of OR gate 1299. The output of OR gate 1299 is impressed through an emitter follower to the input terminal 1300a of AND gate 1300. Input terminal 1300b of AND gate 1300 is connected to output terminal 1292 of free running multivibrator 1291. The output of AND gate 1300 is connected to the control input terminal 1301a of flip-flop 1301. Flip-flop 1301 generates a parity count for the corrected coded character now stored in level 1230c of memory 1230. Each data bit is sequentially impressed upon OR gate 1299 and hence AND gate 1300 by means of the operation of counter 1293. The output is taken from terminal 1301b of parity generating flip-flop 1301 which is binary one in the presence of an even parity count. Thus after correction of the errored data word contained in level 1230c of memory 1230 and after generation of a parity count for this data word, if an odd count is developed, this indicates that an error still exists in the data word stored in memory level 1230c. Output terminal 1301b is connected to the input terminal 1302a of AND gate 1302, the other terminal of which 1302b receives the six count C6′ to generate an error indication at the output terminal 1303 in the presence of an odd parity count. The presence of an error pulse at output terminal 1303 is employed for the purpose of requesting a repeat transmission of the data words due to the fact that they are now outside of the correction radius of both the self-optimizing terminal and the vertical parity check operations.

The count-of-six count is impressed upon the reset input terminal 1289c of flip-flop 1289 causing its output terminal 1289b to go to binary zero to prevent counter 1293 to run through a new count of six. Output terminal 1289d of flip-flop 1289 goes to binary one which condition is impressed upon input terminal 1293b of counter 1293 to provide a reset operation in counter 1293. Count-of-six count C6', in addition to being impressed upon terminals 1289c and 1302b, as shown in FIGURE 16, is also impressed upon bus 1294, which in turn is connected to the reset input terminals 1253d and 1254c of flip-flop 1253 and 1254, respectively, to reset these flip-flops in readiness for subsequent vertical parity check operations.

It can thus be seen that the vertical parity check operation receives a two data word data block and a vertical parity word, makes a comparison between the locally generated vertical parity word and the transmitted vertical parity word, performs a correction operation on the errored data wod stored in level 1230c of memory 1230, performs a parity check on the corrected word stored in memory level 1230c and provides an error indication if the error data word after correction is still in the errored condition.

If the second received coded character of the two character block is also errored this condition prevents the successful operation of the vertical parity correction circuits of FIGURES 14-16. This condition is taken care of by the AND gate 1296, shown in FIGURE 15. AND gate 1296 has its input terminals 1296a and 1296b connected to the output terminals 1213b of flip-flop element 1213 and output terminal 1219e of flip-flop element 1219. These flip-flop elements contain a binary one condition if both the first and second received data words are beyond the error correction capabilities of the self-optimizing terminal circuitry previously described. Thus, at the time that this data word is contained in level 1230b of the memory and the second data word is contained in level 1230a of the memory 1230 if both of these data words are errored memory elements 1213 and 1219 will be in the binary one states. These binary one states are simultaneously impressed upon AND gate 1296 which generates a binary one pulse indicative of the fact that errors contained in both the first and second data words of the two character block cause the vertical parity operation to be ineffective and thereby providing an error signal which requests for repeat transmission of the two errored coded characters in a manner to be more fully described.

FIGURE 18 shows the bit rate generating means 1800 employed to operate the self-optimizing terminal and is comprised of a source 1801 for generating a sinusoidal signal at the carrier frequency which in the present example has been selected as 2500 c.p.s. The A-C source 1801 may be the same or a similar source which is used to impress the carrier frequency upon the information interval counting circuit 300 shown in FIGURE 3 of the drawings.

The A-C signal, from source 1801, is fed through an amplifier 1802 to the input terminal 1803d of a count-of-eight counter 1803. The count-of-eight counter 1803 may be looked upon as a frequency dividing means whose function is to provide square pulses at bit rates which are $2^{-n}$ power times the carrier frequency [i.e., $2500 \times 2^{-n}$], where $n$ is any real integer. From a consideration of FIGURE 18, it can be seen that the A-C source 1801 provides the sinusoidal waveform 1801' of FIGURE 18a. At time $t_0$ with the waveform increasing in the positive direction this triggers the count-of-eight counter so that the first stage of the count-of-eight counter generates a binary one level condition at its output terminal 1803c. At time $t_1$ the next time at which the carrier wave 1801' crosses the zero axis moving in the positive direction the first stage of the count-of-eight counter changes its state thereby forming the square pulse 1810 having a time duration equal to $t_1-t_0$. Thus at times $t_0$, $t_2$, $t_4$, $t_6$ and so forth, the leading edge of the square pulse is formed and at times $t_1$, $t_3$, $t_5$ and so forth, the trailing edge of the square pulse is formed at the output terminal 1803c of the first stage of the count-of-eight counter 1803. The leading edge of square pulse 1810 is employed to trigger the second stage of the count-of-eight counter so as to cause the second stage of counter 1803 to generate the leading edge of a square pulse 1811. At time $t_2$ the leading edge of square pulse 1810a triggers the second stage of counter 1803 causing its output terminal 1803b to reverse its state so as to form the trailing edge of square pulse 1811. At time $t_0$ the leading edge of square pulse 1811 causes the third stage of counter 1803 to generate a square pulse 1812 at its output terminal 1803a, the trailing edge of which is generated by the leading edge of square pulse 1811a. It can be seen that the output terminal 1803c generates one square pulse for each two complete cycles of the carrier 1801' thereby providing square pulses having a bit rate of 1250 bits per second which is exactly one-half the frequency (2500 c.p.s.) of the A-C source 1801. In a like manner, output terminal 1803b provides square pulses at the rate of one bit per four complete cycles of the carrier providing a bit rate of 625 bits per second and finally, output terminal 1803a generates one square pulse per eight complete cycles of the carrier 1801', thus establishing a bit rate of 312.5 bits per second.

Each of the output terminals 1803a–1803c are connected to the input terminals 1807a–1805a, respectively, of the AND gates 1807–1805, for a purpose to be more fully described.

Bit rate generating means 1800 is further provided with a count-of-three counter 1804 having two input terminals 1804a and 1804b. Counter 1804 is a reversible counter such that when it receives a binary one pulse at input terminal 1804a it advances its count by one and upon receiving a binary one pulse at its input terminal 1804b it diminishes its count by one. Counter 1804 is provided with three output terminals 1804c–1804e which are connected respectively, to the input terminals 1805b–1807b of AND gates 1805–1807. A binary one state at the output terminals 1804c–1804e indicates a count of one, two, or three, respectively. It should be understood that only one of the output terminals 1804c–1804e will be "up" at any given instant of time. Upon initiation of operation of the self-optimizing terminal, all three bit rate outputs are imposed upon the AND gates 1805–1807 by the output terminals 1803a–1803c of counter 1803. On initiation of operation, since there has been no history yet established of the condition of the communications link, operation begins at the maximum bit rate of 1250 bits per second. In this operating condition the output terminal 1804c of reversible counter 1804 is at binary one while the output terminals 1804d and 1804e are at binary zero. This condition enables AND gate 1805 to pass the 1250 bit per second signal imposed upon its input terminal 1805a through to its output terminal 1805c, which in turn passes through an emitter follower to the input 1808a of OR gate 1808. OR gate 1808 passes the 1250 bit per second square pulses through to its output terminal 1809 which is connected to the input terminal 301 of information counting means 300, shown in FIGURE 3, thus establishing the operating bit speed of the system at this time.

If, after a suitable establishment of a link history, an indication is provided that too many errors are occurring, the count-of-three counter receives a binary one pulse at its input terminal 1804b causing the count-of-three counter 1804 to advance its count by one causing output terminal 1804d to be at binary one while output terminals 1804c and 1804e are at binary zero. This condition which is impressed upon the input terminal 1806b of AND gate 1806 enables AND gate 1806 to pass the 625 bit per second square pulses through to its output terminal 1806c and through an emitter follower to OR gate 1808. OR gate 1808 passes these square pulses through its output terminal 1809 so as to establish a new bit speed for the information interval counting means 300 of FIGURE 3.

Increased bit rate signals are generated by the supervisory logic circuit 2000 of FIGURE 20, in a manner to be more fully described, for the purpose of understanding the circuit of FIGURE 18. It should be understood that the supervisory logic circuit of FIGURE 20 samples a predetermined number of transmitted characters and if this predetermined number has been transmitted at a received error, free, provides a binary one pulse at its output terminal which is impressed upon the increased bit rate input terminal 1804 to diminish the count of the count-of-three counter 1804. Assuming counter 1804 to be binary one at its output terminal 1804d, the presence of a pulse at input terminal 1804a causes output terminal 1804c to go binary one and places output terminals 1804d and 1804e at binary zero so as to again enable AND gate 1805 and establish an operating speed at the 1250 bit per second bit rate for the information interval counting means 300 of FIGURE 3. If it is assumed that the count-of-three counter is in the state such that its output terminal 1804c is at binary one and the supervisory logic circuit of FIGURE 20 generates an increased bit rate pulse, the imposition of such a pulse upon counter 1804 at its input terminal 1804a will only serve to maintain its output terminal 1804c in the binary one condition since the system is already operating at the maximum bit rate. It should be understood that the circuitry of FIGURE 18 is merely exemplary and it is obvious to modify the circuit of FIGURE 18 so as to provide greater or fewer operating bit speeds simply by increasing the capacities of the counter 1803 and the reversible counter 1804 and by providing additional AND gates of the nature of AND gates 1805–1807.

RECEIVER SUPERVISORY LOGIC

The receiver facility supervisory logic is shown as the circuit designated 1700 in FIGURE 17. The circuitry of FIGURE 17 is employed for the purpose of controlling the receiver and transmitter bit rate operating speeds dependent upon the short term history of the link. The circuitry 1700 is comprised of an OR gate 1701 having a first input terminal 1701a connected to the output terminal 907 of FIGURE 11 which is an indication of a request for a reduced bit rate. Input terminal 1701b is connected to output terminal 1014 of FIGURE 14, which is an indication of a request for a reduced bit rate due to failure to provide a correction of a character after a vertical parity operation. If either of these requests are present OR gate 1701 impresses a binary one condition upon the set input terminal 1702a of flip-flop 1702. This causes output terminal 1702b to go to binary one. The binary one condition is passed through an emitter follower and is impressed upon the sending means (not shown) which transmits a signal under control of output terminal 1702b requesting the sending location to initiate operation at a reduced bit rate.

The flip-flops 1704 and 1706 of the supervisory logic circuit 1700 cooperate with the AND gate 1012 of FIGURE 14 to provide an indication of the presence of only one gray bit. This operation occurs as follows:

Upon the indication of the presence of a gray bit terminal 513 of FIGURE 5 is at the binary one state. This is impressed upon one input terminal of AND gate 1703. Flip-flop 1706 is moved to the reset state by the impression of a binary one pulse upon bus 1705. Bus 1705 is connected to output terminal 971 of FIGURE 12 which provides an indication that a complete character has been shifted into characters receiving register 950 of FIGURE 12. Thus such an end of character signal impressed upon reset input terminal 1706b causes output terminal 1706c to go to binary one. Thus upon the imposition of a gray bit indication upon AND gate 1703, this is coupled with a binary one condition from output terminal 1706c. AND gate 1703 passes a binary one condition to the input terminal 1704a of flip-flop 1704. Prior to the binary one level signal, flip-flop 1704 was reset by a pulse imposed upon its reset terminal 1704d, causing output terminal 1704b to be at binary one. The presence of the binary one pulse at the input terminal 1704a causes output terminal 1704c to go to binary one. This is therefore an indication that one gray bit is present within the time duration in which one character is being received. This is impressed upon input terminal 1013a of inverter 1013 causing the binary zero to be present at input terminal 1012c of AND gate 1012 shown in FIGURE 14. Thus AND gate 1012 will fail to provide an output pulse and only one gray bit is present in a received coded character. However, if a second gray bit is received, output terminal 1706c of flip-flop 1706 remaining in the one state is coupled with a second gray bit indication at the input terminal of AND gate 1703 causing a control pulse to be impressed upon terminal 1704a. Flip-flop 1704 changes its state, causing terminal 1704b to go to binary one. This condition provides a set pulse upon input 1706a causing output terminal 1706c of flip-flop 1706 to go to binary zero. Also, output terminal 1704c of flip-flop 1704 goes to binary zero which state is coupled to input terminal 1013a of FIGURE 14. This binary zero state is inverted by inverter circuit 1013 enabling AND gate 1012 to generate an output to provide an indication that more than one gray bit is present in the character being received. Flip-flops 1704 and 1706 are then reset by an end of character signal impressed upon the bus 1705 which is connected to terminal 971 of FIGURE 12 which is an indication that the character has been completely shifted in to the register 950.

Output terminal 1702b and bus 1716 are connected to the input terminals of OR gate 1715 so that upon the occurrence of either a reduced bit rate request from the character receiver or a reduced bit rate request from the decision logic or a gray bit indication OR gate 1715 passes a binary one condition to the reset input terminal of a count-of-thirty two counter 1708. The operation of counter 1708 is as follows:

The input terminal 1708a is connected to the output terminal 909 of FIGURE 11 which is in the binary one state to indicate that an error free character has been received and decoded. Each time such an indication is provided counter 1708 advances its count by one. Upon the accumulation of 32 counts counter 1708 provides a binary one pulse at its output terminal 1708b. This is impressed upon one input terminal of AND gate 1710. The other input terminal is connected to the output of an inverter circuit 1709 the input of which 1709a is connected to terminal 1804c of FIGURE 18 which is in the binary one state when the receiver facility is operating at the 1250 bit per second rate and is at the binary zero state when the receiver facility is operating at any other speed, such as, for example, 625 bits per second or 312.5 bits per second. Assuming operation at a speed lower than the 1250 bit per second rate, inverter 1709 inverts the state to a binary one condition which is impressed upon AND gate 1710. Upon the completion of a count-of-thirty two AND gate 1710 impresses a binary one condition through an emitter follower to the set input terminal 1711a of flip-flop 1711. This causes output terminal 1711b to go to binary one which condition is impressed through an emitter follower to the increased bit rate terminal 1804 of FIGURE 18 to increase the bit operating rate of the receiver facility. This terminal is also connected to suitable transmitting means (not shown) to transmit an indication to the remote transmitting location that an increased bit rate is being requested. Thus it can be seen that if counter 1708 receives 32 uninterrupted binary one signals this is an indication that 32 characters have been received in succession which are error free, however, if during any time at which the count-of-thirty two is being accumulated a gray bit is received or a reduced bit rate request is generated by the receiver facility this is impressed upon reset input terminal 1708c of counter 1708 causing the count to begin anew. Thus an increased bit rate request may only be generated when 32 coded characters in sucsuccession are received in the error free condition. Flip-flop 1711 is reset by bus 1705 to erase an increased bit rate request appearing at output terminal 1711b upon completion of examination of the next received coded character.

Flip-flop 1707 is provided for the purpose of providing a request for retransmission of errored coded characters which have failed the vertical parity operation. Output terminal 1303 of FIGURE 16 which is in the binary one state to indicate the presence of failure of the vertical parity check operation impresses this binary one state upon the set input terminal 1707a of flip-flop 1707. This causes output terminal 1707b to go binary one. The binary one level at terminal 1707b is employed to trigger a suitable transmission means which sends a signal of an appropriate tone to the remote transmitting location requesting a retransmission of the errored character which has failed to be corrected during the vertical parity check operation.

HAMMING CODING OPERATION

The basic concept employed in the system of the instant application is that of the transmission of data between two remote locations at the highest possible transmission speeds commensurate with the quality of the link during transmission. Thus if noise phenomenon injected into the line is extremely low or is completely absent, it is thereby unnecessary from a statistical viewpoint to provide a high degree of reliability in the form of providing redundant bits coupled with the transmitted data bits for checking purposes. The system of the instant invention keeps a constant record of the link condition from both the long term and short term history viewpoints, in order to control both the operating speeds of transmitter and receiver locations as well as the amount of redundant information transmitted together with data bits in order to increase the reliability and accuracy of the data being transmitted.

For substantially error free operation, the instant invention is designed to operate at a maximum bit speed of for example, 1250 bits per second. Together with this optimum transmission speed the data is accompanied by a single even parity bit to further enhance the reliability of transmitted and received information. If the constant examination of the link conditions shows that errors are occurring at a rate above a predetermined limit, one choice which the receiver facility may make is that of reducing the bit rate operating speed which understandably increases the reliability of data transmitted and received. However, instead of reducing the bit rate from the maximum bit speed of 1250 bits per second to the next operating speed of 625 bits per second, an intermediate operation is provided which enables operation at the 1250 bit per second operating speed, but the single parity bit is replaced with Hamming coding to enable the system to retain the maximum operating speed while at the same time enhancing the reliability of the data being transmitted and received. If after further examination of the link conditions it is shown that errored data is evading correction under the Hamming coding operation the system may then go to the next highest bit operating speed beneath the maximum operating speed. A detailed discussion of Hamming coding is set forth in the article, entitled "Error Detecting and Error Correcting Codes," by R. W. Hamming which appears in the Bell System Technical Journal, volume 26, No. 2, published April 1950, and appearing on pages 147–160.

With the Hamming code there are $m$ information digits plus $k$ checking digits which make up the format of each coded character. The structure of the code is so arranged that the $k$ checking digits specify in which, if any, of the received digits an error has been made. Thus the $k$ checking digits must identify one of the $m$ plus $k$ error locations or they must specify that no error at all has been made. Hence a total of $m+k+1$ cases must be described by the $k$ digits. It therefore follows that $2^k \geq m+k+1$. For example, if there are four data bits and three check bits, the minimum number of digits required is $4+3+1$, or seven digits. The format of each coded character transmitted in Hamming coding is $$S \ B_1 \ B_2 \ B_3 \ B_4 \ H_1 \ H_2 \ H_3$$

where S is the start bit, $B_1$–$B_4$ are the data bits and $H_1$–$H_3$ are the Hamming coding or check bits. The following equations describe the relationship between the check bits $H_1$–$H_3$ and the data bits $B_1$–$B_4$.

$$H_1 = H_1(B_1 B_2 B_3)$$
$$H_2 = H_2(B_1 B_2 B_4)$$
$$H_3 = H_3(B_2 B_3 B_4)$$

Check bit $H_1$ generates an even parity for the data bits $B_1$, $B_2$ and $B_3$. For example, let it be assumed that the decimal number 7 is to be transmitted. The format for the decimal number 7 is:

| $B_1$ | $B_2$ | $B_3$ | $B_4$ |
|---|---|---|---|
| 0 | 1 | 1 | 1 | where data bit $B_1$ is in binary zero whereas data bits $B_2$–$B_4$ are in the binary one state. Thus to form check bit $H_1$, data bits $B_1$, $B_2$ and $B_3$ are summed. This gives a binary zero total in the least significant bit position. Therefore, in order to form an even parity for these three bits check bit $H_1$ is therefore binary zero. Check bits $H_2$ and $H_3$ are formed in a like manner and can be shown to be binary zero and binary one, respectively. Thus the total format of the transmitted coded character is:

| S | $B_1$ | $B_2$ | $B_3$ | $B_4$ | $H_1$ | $H_2$ | $H_3$ |
|---|---|---|---|---|---|---|---|
| 1 | 0 | 1 | 1 | 1 | 0 | 0 | 1 | where start bit S, data bits $B_2$–$B_4$ and check bit $H_3$ are in binary one and the remaining bits are in binary zero.

In order to check the correctness of a received coded character which is transmitted with Hamming coding check bits, the Hamming coding check bit is summed in a binary addition operation with its associated data bits the result of which must be a binary zero in the least significant digit position. Thus the resultant of the Hamming coding checking operation at the receiver facility is given by the following equations:

$$h_1 = h_1[H_1 B_1 B_2 B_3]$$
$$h_2 = [H_2 B_1 B_2 B_4]$$
$$h_3 = h_3[H_3 B_2 B_3 B_4]$$

where $h_1$ is the binary sum of check bit $H_1$ and data bits $B_1$, $B_2$ and $B_3$; where $h_2$ is the sum of the check bit $H_2$ plus the data bits $B_1$, $B_2$ and $B_4$; and where $h_3$ is equal to the sum of check bit $H_3$ and data bits $B_2$, $B_3$ and $B_4$.

Let it be assumed that during a first transmission operation the decimal number 7 is transmitted and during the second transmission operation decimal number 7 is again transmitted but is received with the incorrect binary notation for the data bit $B_3$. The transmission for these formats are as follows:

| | $B_1$ | $B_2$ | $B_3$ | $B_4$ | $H_1$ | $H_2$ | $H_3$ |
|---|---|---|---|---|---|---|---|
| [1] Correct | 0 | 1 | 1 | 1 | 0 | 0 | 1 |
| [2] Incorrect | 0 | 1 | 0 | 1 | 0 | 0 | 1 |

For correct:
$h_1 = 0110 = 0$
$h_2 = 0110 = 0$
$h_3 = 1111 = 0$

For incorrect:
$h_1 = 0100 = 1$
$h_2 = 0010 = 0$
$h_3 = 1101 = 1$

Considering first the correct transmission [1] and comparing this against the incorrect transmission [2] it can be seen that the data bit $B_3$ has been received as a binary zero whereas it should have been received as a binary one. The receiving facility is provided with means to be more fully described for generating the sums $H_1$–$H_3$ to determine the correctness of the received coded character. For the sum $H_1$ of the correctly received decimal 7 data bits $B_1$, $B_2$ and $B_3$ are summed with check bit $H_1$ the binary values being 011 and 0, respectively. It can be seen that when these are summed in binary fashion the result is a binary zero in the least significant digit position [the binary one which would be carried to the next most significant position being ignored]. In a like manner, it can be seen that during the correct transmission the sum $h_2$ is binary zero and the sum for $h_3$ is binary zero thereby showing that even parity is present for all three checking operations to identify the reception of a correctly received coded character.

For the incorrectly received decimal 7 [2] the sum $h_1$ is comprised of data bits $B_1$, $B_2$ and $B_3$ which are summed with check bit $H_1$. The values for these bits are 010 and 0, respectively. This sum provides a binary one in the least significant digit position thereby indicating the presence of an error in either the data bits $B_1$–$B_3$ or the check bit $H_1$. In a like manner, the sum for $h_2$ is binary zero and for $h_3$ is binary one. Considering the equations for $h_1$–$h_3$ given above, it can be seen that both $h_1$ and $h_3$ are shown to have failed the even parity summing operation. Considering the equations for generating $h_1$ and $h_3$ it can be seen that the only data bits that they have in common are data bits $B_2$ and $B_3$. However, if data bit $B_2$ were incorrect the sum for $h_2$ would likewise be incorrect since this sum includes as one of the elements the data bit $B_2$. Thus the only data bit that can be incorrect is $B_3$. It can therefore be seen how the Hamming coding accurately identifies the incorrect data bit. It is possible, however, to rule out the fact that a check bit is incorrect since if one of the even parity sums is incorrect and the remaining two are correct the error can only exist in the check bit since none of the three sums have the same check bit in common for the generation of these sums. A discussion of how the receiver facility handles coded characters which are transmitted with Hamming coding and which contain more than one error bit will be more fully described with reference to the circuitry employed for carrying out the Hamming coding checking operations.

The circuitry for performing the Hamming coding checking operations is shown in FIGURES 19–22.

FIGURE 19 shows the characters receiving register 1900 which is an eight-stage register comprised of stages 1901–1908. The characters receiving register 1900 is substantially the same as the characters receiving register 950 shown in FIGURE 12 with certain modifications which are to be more fully described. Each individual stage, however, is substantially identical to the stages of characters receiving register 950. The input terminals 1901a and 1901b of first stage 1901 are connected to the output terminals 414 and 415 respectively, of the black-white loading element 411 shown in FIGURE 4 of the drawings. The eight stages 1901–1908 of characters receiving register 1900 are provided for storing the start bit, the four data bits and the three Hamming coding check bits which is a total of eight binary bits. The characters receiving shift register 1900 is loaded at the input terminals 1901a and 1901b of first stage 1901. The order in which the data bits making up the coded character are loaded is the first bit to be loaded into register 1900 is the start bit S followed by the four data bits in the order $B_1$, $B_2$, $B_3$ and $B_4$ followed in turn by the check bits in the order $H_1$, $H_2$ and $H_3$. Thus when a coded character is fully loaded into register 1900 the eighth stage 1908 contains the start bit S, the seventh stage 1907 contains the data bit $B_1$, the sixth stage 1906 contains the data bit $B_2$, etc. As each data bit appears at the input terminals 1901a and 1901b depending upon whether it is binary one or binary zero, a shift pulse is provided from the shift pulse source previously described in order that the data be shifted from left to right through the storage register.

For example, the first bit entering register 1900 is the start bit which enters stage 1901. The next bit presented to the first stage input terminals 1901a and 1901b is data bit $B_1$. Upon the imposition of data bit $B_1$ start bit S is shifted to stage 1902 and data bit $B_1$ is loaded into stage 1901.

As data bits are loaded into register 1900 they are simultaneously loaded into the input terminal 1911a of OR gate 1911 which passes all binary ones to the input terminal 1912 of flip-flop 1913 which is provided for performing a single parity checking operation when register 1900 is employed for the purpose of handling coded characters which are transmitted only with the single parity check bit as opposed to the three Hamming coding check bits.

Since the characters receiving register 1900 is eight stages in length and since it may be used to receive both coded characters transmitted under Hamming coding, as well as receiving coded characters transmitted with single parity, coding means must be provided for utilizing only six of the eight stages of register 1900. Register 1900 is therefore adapted to operate in the manner described immediately above by connecting input terminal 1901a to one input of AND gate 1913 and by connecting input terminal 1901b to one input of AND gate 1916. The other input terminal of AND gate 1913 is connected to means [not shown] which indicates operation of the communications system in the single parity check mode. The output of AND gate 1913 is connected to one terminal of OR gate 1915 the output of which 1915a is connected to the input terminal 1903a of stage 1903 in register 1900. The second AND gate 1914 is connected with OR gate 1915 and has a first input terminal connected to the output terminal 1902e of stage 1902 in register 1900. The other input terminal of AND gate 1914 is connected to means which generate a binary one condition to indicate operation of the communication system in the Hamming coding mode.

In a like manner OR gate 1918 is fed by AND gate 1917 having a first terminal connected to output terminal 1902f of second stage 1902 while the output of OR gate 1918 has its terminal 1918a connected to the input terminal 1903b of third stage 1903.

The operation of this circuitry is as follows:

Let it first be assumed that the circuit is operating in the single parity mode. This means that each coded character is comprised of a start bit S, four data bits $B_1$–$B_4$ and a vertical parity bit P, or a total of six data bits. Thus only six of the eight stages of shift register 1900 may be utilized when operating in the single parity mode. In the single parity mode, one input terminal of AND gate 1913 is in the binary one condition due to operation in single parity mode while the other input terminal is connected to terminal 1901b whereby upon the presence of each binary one bit this bit is passed through AND gate 1913 and OR gate 1915 to the input terminal 1903a of third stage 1903. In a like manner AND gate 1916 is enabled due to the fact that operation is being conducted in the single parity mode and has its other input terminal connected to terminal 1901b. Upon receipt of each binary zero bit AND gate 1916 passes this condition through OR gate 1918 to the input terminal 1903b of third stage 1903. Thus the circuitry bypasses the first two stages 1901 and 1902 and starts loading the coded character into the characters receiving register 1900 at the third stage. It will be noted that although data is simultaneously being fed into the first stage 1901 and will be shifted through to the second stage 1902 since no connection exists between the output terminals 1902e and 1902f of second stage 1902 and the input terminals 1903a and 1903b of third stage 1903 data fed into the first two stages will simply "spill out" as the third, fourth, etc., data bits are shifted into these first two stages. This, however, is immaterial since only data shifted into the third to eighth stage of the register 1900 will be utilized during the single parity operating mode.

When operating in the Hamming coding mode the Hamming coding input terminal of AND gate 1914 is in binary one and the remaining input terminal of the AND gate is connected to output terminal 1902e of second stage 1902. Any binary one state presented to this terminal is passed through AND gate 1914 and OR gate 1915 to the input terminal 1903a of third stage 1903. In a like manner output terminal 1902f of second stage 1902 is connected through AND gate 1917 and OR gate 1918 to the input terminal 1903b of third stage 1903. AND gates 1913 and 1916 are now disabled to prevent the loading of information directly into the third stage during the Hamming coding mode. Thus when operating in the Hamming coding mode received coded characters are loaded into the input terminals of first stage 1901 and are passed between the second stage and third stage 1902 and 1903 by the gates just described.

After the coded character being received has been completely shifted into register 1900 start bit S reaches the eighth stage 1908. This causes output terminal 1908f to be in binary one which condition is impressed upon the input terminal 1919a of OR gate 1919. OR gate 1919 passes this binary one condition to the trigger input terminal of monostable multivibrator 1920. This causes a single square pulse to be generated at output terminal 1920b and a single negative square pulse to be generated at output terminal 1920a. The trailing edge of the negative square pulse generated at terminal 1920a is used to trigger the next monostable multivibrator 1921. In a like manner, monostable multivibrators 1922 and 1923 are triggered to operate in a similar fashion and it can thereby be seen that the positive square pulse generated by each output terminal 1920b–1923b will be delayed from the preceding positive square pulse by a time equal to the width of the negative square pulse generated at the output terminals 1920a–1922a of monostable multivibrators 1920–1922, respectively. The outputs appearing at terminals 1920b–1923b are used for controlling the timing of correction operations performed by the Hamming coding eror detection and error correction circuitry of FIGURES 19–22 respectively. The manner in which these functions are performed will be more fully described.

FIGURE 20 shows the gray bits receiving register 2000 which is likewise comprised of eight stages 2001–2008 respectively. The gray bits receiving register 2000 is substantially identical to the gray bits receiving register 1100 shown in FIGURE 13 and described previously. Whereas gray bits receiving register 2000 is eight stages in length and whereas it must be adaptable for use in both the Hamming coding and single parity operating modes suitable connections are provided between the second and third stages 202 and 203 in a manner substantially identical to the connections provided between stages 1902 and 1903 of characters receiving register 1900. This circuitry has been omitted, however, for purposes of clarity. The loading and shifting of gray bits into gray bits receiving register 2000 is substantially identical to the loading and shifting operation described with respect to characters receiving register 1900 as well as gray bits register 1100 and characters receiving register 950 also previously described. The functions performed by the AND gates 2011–2019 and OR gates 2020–2023 will be more fully described in connection with the correction operations which are performed by the Hamming coding error detection and correction operation.

Turning now to FIGURE 21 a description of the generation of Hamming coding even parity sums $h_1$, $h_2$ and $h_3$ will now be given.

The logical circuitry 2100 for generation of the $h_1$–$h_3$ even parity sums are comprised of three separate circuits for generating these sums the first of which includes first and second flip-flops 2101 and 2102. Immediately prior to the receipt of the coded character about to be received a general reset pulse is impressed upon bus 2103. The reset pulse is simultaneously impressed upon reset terminals 2101b and 2102b. This causes output terminal 2101c to go to binary zero and output terminal 2102c to go to binary one which output terminals are the outputs of flip-flops 2101 and 2102, respectively. Output terminals 2101c and 2102c are connected to the input terminals of AND gate 2104. The coded character presently being received is then shifted into shift register 1900 of FIGURE 19. When the start bit S reaches second stage 1902 output terminal 1902f goes to binary one. This condition is impressed upon set input terminal 2101a causing output terminal 2101c to go to binary one. At this time the start bit is in stage 1902 and the first data bit $B_1$ is in stage 1901. The first data bit $B_1$ is also still present at terminal 1901b which is the output terminal of the characters receiving register loading element 411 described previously as well as being the input terminal to stage 1901. Since the shift pulse applied to bus 1909 precedes the general reset pulse applied to bus 1910 by a predetermined period of time [which reset pulse is also applied to the loading element 1411] the first data bit $B_1$ is still contained in the loading element 411. Thus the input terminal 2104c of AND gate 2104 has the first data bit $B_1$ impressed upon its input terminal. Input terminal 2104d is connected to the shift bus 1909 and upon the presence of the shift pulse shifts a binary one [if the first data pulse $B_1$ is in the binary one condition] through AND gate 2104 to one input terminal of OR gate 2106. The pulse is passed by OR gate 2106 to the input terminal of the modulous two counter 2107 which is a flip-flop circuit. Flip-flop 2107 having been reset by a pulse on its reset input terminal 2107a faces output terminal 2107b in the binary one state. Thus the first binary one pulse impressed upon its input terminal causes output terminal 2107c of flip-flop 2107 to go to binary one. Thus it can be seen that for an odd count of binary ones output terminal 2107c will be in the binary one state and output terminal 2107b will be in the binary one state to designate an even number of binary ones impressed upon the input terminal of flip-flop 2107. Thus far only the first data bit $B_1$ has been impressed upon flip-flop 2107. Considering the character being received to be the decimal 7 coded character the format of which was given previously data bit $B_1$ is binary zero so that output terminal 2107b will remain in the binary one state upon the receipt of data bit $B_1$.

The loading of the coded character continues with the start bit shifting into third stage 1903 of register 1950. Stage 1901 now contains data bit $B_1$ and stage 1901 contains data bit $B_2$. As previously described the loading element still contains data bit $B_2$ due to the fact that the reset pulse has not yet appeared. Data bit $B_2$ is impressed upon terminal 2104c of AND gate 2104 and upon the presence of the shift pulse upon terminal 2104d AND gate 2104 will pass this condition since input terminals 2104a and 2104b remain in the binary one state at this time. Thus the state of data bit $B_2$ is then impressed upon flip-flop 2107. Considering decimal 7 to be the coded character being received data bit $B_2$ is binary one causing output terminal 2107b to go to binary zero and output terminal 2107c to go to binary one in flip-flop 2107.

The start bit is then shifted into the fourth stage 1904 of register 1900 causing the data bits $B_1$, $B_2$ and $B_3$ to be loaded into stages 1903, 1902 and 1901, respectively. At this time data bit $B_3$ is present at input terminal 1901b for the same reasons as previously described and upon the receipt of the shift pulse at terminal 2104d of AND gate 2104 data bit $B_3$ is passed through AND gate 2104, and/ OR gate 2106 to flip-flop 2107. Data bit $B_3$ is binary one causing the output termials 2107b and 2107c of flip-flop 2107 to go to binary one and binary zero respectively. The shifting of start bit S into fourth stage 1904 of register 1900 causes a binary one condition to be present at the output terminal 1904f. This is impressed upon the input terminal 2102a of flip-flop 2102 causing output terminal 2102c to go to binary zero.. This disables AND gate 2104 from passing any subsequent bits through to OR gate 2106. The coded character continues to be loaded into shift register 1900 until it is fully loaded therein. At this time start bit S is loaded into the last stage 1908 of register 1900. This causes output terminal 1908f to go to the binary one state. This binary one condition is impressed upon input terminal 1919a of OR gate 1919, shown in FIGURE 19. This triggers the operation of monostable multivibrator 1920 causing a positive square pulse to be generated at its output terminal 1920b. This output pulse is impressed upon the input terminal 2105a of AND gate 2105. The other input terminal 2105b is connected to the output terminal of the third stage 1903 of shift register 1900. The third stage of shift register 1900 contains the first Hamming coding check bit $H_1$ which for a transmission of a decimal 7 should be in the binary zero state. Thus the simultaneous impression of the state of third stage 1903 and the output pulse of multivibrator 1920 causes AND gate 2105 to pass the state of check bit $H_1$ through OR gate 2106 to the input of flip-flop 2107. For the decimal 7 case check bit $H_1$ is binary zero so that the output terminals 2107b and 2107c of flip-flop 2107 remain in the binary one and binary zero states respectively. Output terminal 2107b when in the binary one state indicates the presence of an even parity count for $h_1$ which is as it should be in order to indicate the presence of an error free coded character.

The even parity check for $h_2$ is generated as follows:

The summation for $h_2$ is formed in the following manner:

The coded character decimal 7 is loaded into the characters receiving register 1900. Immediately prior to loading bus 2108 of FIGURE 21 places the general reset pulse upon the reset input terminals 2109a–2111a of flip-flops 2109–2111, respectively. This sets output terminals 2110c and 2111c at binary one and output terminal 2109c at binary zero. Thus AND gate 2112 whose input terminals 2112a–2112c are connected to output terminals 2109c–2111c, respectively, is unable to generate a binary one condition at its output terminal due to the input terminal 2112a being binary zero. The coded character decimal 7 with the Hamming coding bits is then loaded into characters receiving register 1900. When the start pulse S reaches the second stage 1902 of register 1900 a binary one condition is generated by output terminal 1902f. This is impressed upon input terminal 2109b of flip-flop 2109 causing output terminal 2109c to go to binary one. This causes AND gate 2112 to generate a binary one at its output which condition is impressed upon input terminal 2113a of AND gate 2113. Input terminal 2113b is connected to the input terminal 1901b of the characters receiving register 1900 while input terminal 2113c is connected to bus 1909 of FIGURE 19 which carries the shift pulse with the start bit S in stage 1902. The first data bit $B_1$ is in the first stage 1901 and is also in the loading element 411 of FIGURE 4 described previously. With the presence of the shift pulse AND gate 2113 passes the state of data bit $B_1$ through OR gate 2115 to the input terminal 2116d of flip-flop 2116. For decimal 7 data bit $B_1$ is in the binary zero state so that flip-flop 2116 does not change its state. Start bit S then shifts in to third stage 1903 causing data bit $B_1$ to shift into second stage 1902 and data bit $B_2$ to shift into first stage 1901. As previously described data bit $B_2$ will also be in the loading element 411. Input terminal 1901d being connected to input terminal 2113b of AND gate 2113 places this data $B_2$ upon this terminal. Upon the occurrence of the shift pulse AND gate 2113 passes this condition through OR gate 2115 to the input terminal of flip-flop 2116. Data bit $B_2$ is binary one causing a flip-flop 2116 to change its state. This causes output terminals 2116b and 2116c to go to binary zero and binary one respectively.

The start bit S is then shifted into the fourth stage 1904 causing data bits $B_1$–$B_3$ to be stored in stages 1903–1911, respectively. The presence of start bit in stage 1904 generates a binary one condition at its output terminal 1904f. This condition is impressed upon the set input terminal 2110b of flip-flop 2110 causing output terminal 2110c to go to binary zero. This inhibits the operation of AND gate 2112 thereby preventing data bit $B_3$ to be passed by AND gate 2113. This is as it should be since data bit $B_3$ should not be included as one element in the summation of $h_2$. Start bit S is then shifted into fifth stage 1905 of register 1900. This binary one condition is generated at its output terminal 1905f which is impresed upon the second set input terminal 2110d of flip-flop 2110. This causes output terminal 2110c to return to the binary one state thereby enabling AND gate 2112 to generate a binary one condition upon the input terminal 2113a of AND gate 2113. At this time data bit $B_4$ is contained in loading element 411 of FIGURE 4 and upon the occurrence of the shift pulse is passed through AND gate 2113 through OR gate 2115 to flip-flop 2116. For decimal 7 data bit $B_4$ is binary one condition causing the output terminals 2116b and 2116c to go to binary one and binary zero states, respectively.

Start bit S is then shifted into the sixth stage 1906 of register 1900 causing a binary one pulse to be presented to the set input terminal 2111b of flip-flop 2111. This causes output terminal 2111c to go to binary zero thereby disabling AND gate 2112. This prevents check bit $H_1$ from being passed by AND gate 2113. When start bit S reaches the eighth stage 1908 the output terminal 1908f goes to binary one triggering monostable multivibrator 1920. A positive square pulse is generated at its output terminal 1920b. This is impressed upon the input terminal 2114a of AND gate 2114. The input terminal 2114b is connected with the output of second stage 1902 of characters receiving register 1900 which contains the second check bit $H_2$ at this time. This condition is passed by AND gate 2114 through OR gate 2115 to flip-flop 2116. For decimal 7 check bit $H_2$ is binary zero so that flip-flop 2116 does not change its state and further causing output terminals 2116b and 2116c to remain in the binary one and binary zero states, respectively. This is as it should be since output terminal 2116b when in the binary one state indicates that the summation for $H_2$ is binary zero which is an indication that summation has passed the even parity check operation.

A summation for $H_3$ is as follows:

The general reset pulse is impressed upon bus 2117 which simultaneously impresses this pulse upon rest input terminals 2118a and 2119a of flip-flops 2118 and 2119, respectively. This causes the output terminals 2118c and 2119c to go to binary zero and binary one, respectively. The coded character decimal 7 is then shifted into register 1900. When start bit S reaches third stage 1903 a binary one condition is then generated at output terminal 1903f. This is impressed upon input terminal 2118b causing output terminal 2118c to go to binary one. At this time data bit $B_1$ is stored in stage 1902 and data bit $B_2$ is stored in stage 1901 and in loading element 411. Input terminal 1901b is connected to input terminal 2120b of AND gate 2120. Input terminal 2120d of AND gate 2120 receives the shift pulse input. Upon the occurrence of the shift pulse input the status of data bit $B_2$ is passed by AND gate 2120 through OR gate 2122 to the input of flip-flop 2123. For decimal 7 data bit $B_2$ is binary one. Flip-flop 2123 receives a general reset pulse on its input terminal 2123a causing output terminals 2123b and 2123c to be in the binary one and binary zero states respectively. However, the passing of data bit $B_2$ which is binary one causes these terminals to go to binary zero and binary one, respectively. Start bit S shifts into fourth stage 1904 causing data bit $B_3$ to be stored in first stage 1901 and loading element 411. Input terminal 1901b is connected through input terminal 2120b of AND gate 2120 and upon the occurrence of the shift pulse AND gate 2120 causes the state of data bit $B_3$ to be passed by OR gate 2122 to flip-flop 2123. The state of data bit $B_3$ being binary one causes output terminals 2123b and 2123c to change to binary one and binary zero states, respectively. Start bit S is then shifted into fifth stage 1905 causing data bit $B_4$ to be located in first stage 1901 and loading element 411. Upon the occurrence of the shift pulse data bit $B_4$ is passed by AND gate 2120 and OR gate 2122 to flip-flop 2123. Since data bit $B_4$ is binary one output terminals 2123b and 2123c again change their state to become binary zero and binary one, respectively.

Start bit S shifts into sixth stage 1906 causing a binary one output to be generated at terminal 1906f. This is impressed upon the input terminal 2119b of flip-flop 2119 causing output terminal 2119c to go to binary zero. This prevents AND gate 2120 from passing any additional bits to flip-flop 2123. When start bit S reaches eighth stage 1908 binary one condition is generated at output terminal 1908f and is impressed upon the trigger input of multivibrator 1920. The generation of a positive square pulse at its output terminal 1920b is impressed upon input terminal 2121a of flip-flop 2121. The other input terminal 2121b is connected to output terminal 1901f of first stage 1901 which now contains the third check bit $H_3$. This condition is passed by AND gate 2121 and OR gate 2122 to flip-flop 2123. For the decimal 7 character $H_3$ is binary one causing the output terminals 2123b and 2123c of flip-flop 2123 to go to binary one and binary zero, respectively. The presence of a binary one condition at output terminal 2123b indicates that the summation for $h_3$ has shown to be an even parity check showing the receipt of a correct coded character.

The output terminals 2107b, 2116b and 2123b of $h_1$, $h_2$ and $h_3$, summation flip-flops 2107, 2116 and 2123, respectively, are connected to the input terminals 2132a–2132c, respectively, of AND gate 2132. When the received coded character passes the Hamming coding even parity checks all these input terminals are at binary one causing AND gate 2132 to generate a binary one condition at its output indicative of the receipt of a correct coded character. This output is applied to the supervisory logic circuitry previously described which keeps a cumulative count of the number of consecutive error free characters which are received so that when the number of consecutive correct characters received reaches a predetermined level the communications system may operate with a lower level of redundant bits. In other words, the system may now go to the level of transmission at the same bit rate whereby coded characters are accompanied only by a single parity check bit instead of the three Hamming coding check bits, the lower degree of reliability being permissible due to the excellent history of the line.

The remaining logical gates 2124–2131 of FIGURE 21 are employed to indicate whether the received coded character has failed to pass the even parity checking operations and also to indicate which bit position or bit positions are errored.

OR gate 2124 has its input terminals 2124a–2124c connected to the output terminals 2107c, 2116c and 2123c of flip-flops 2107, 2116 and 2123, respectively. If any of these output terminals are in a binary one state this condition is passed by OR gate 2124 to generate a binary one condition at its output which indicates the presence of an errored condition. This output will be utilized in a manner to be more fully described. AND gates 2125–2131 are employed for the purpose of identifying the bit position which contains the error. Returning to the example described previously, wherein the decimal 7 is transmitted correct in every bit position with the exception of the data bit $B_3$ which is binary zero instead of binary one, this example will aid in the understanding of operation of AND gates 2125–2131. Considering the example described previously, it will be noted that with an error in the data bit $B_3$ the summations $h_1$ and $h_3$ will both fail the even parity checking operation. This will cause the output terminals 2107c of flip-flop 2107 and 2123c of flip-flop 2123 to be in the binary one state while the output terminal 2116b of flip-flop 2116 will be in the binary one state. These three output terminals are connected to the input terminals 2127a–2127c of AND gate 2127. A binary one condition will be generated at the output of AND gate 2127 which is an indication that an error exists in data bit $B_3$. In a like manner AND gates 2125, 2126 and 2128–2131 are provided to indicate errors in bit positions $B_1$, $B_2$, $B_4$, $H_1$, $H_2$ and $H_3$, respectively, with these AND gates being connected to the appropriate output terminals of flip-flops 2107, 2116 and 2123, respectively, to provide these indications. The operations of AND gates 2125, 2126 and 2128–2131 will be omitted for purposes of clarity, but it should be understood that they operate in a like manner in order to identify the bit position which has been received incorrectly. The output terminal 2127d of AND gate 2127 is connected to the input terminal of AND gate 2135 shown in FIGURE 21. The other input terminal 2135b is connected to the output terminal 2005f of stage 2005 in gray bits receiving register 2000 shown in FIGURE 20. Stage 2005 of gray bits receiving register 2000 should contain a gray bit or ambiguous bit indication designating the data bit $B_3$ as an ambiguous bit. The simultaneous presence of these conditions is passed by AND gate 2135 of FIGURE 21 and through OR gate 2140 and OR gate 2142 to the output terminal 2142c. This output terminal in the binary one state therefore indicates the presence of a single errored data bit which is therefore correctible and which is corrected in the following manner:

The output terminal 2135c of AND gate 2135 shown in FIGURE 21 is connected to the input terminal 2204b of AND gate 2204 shown in FIGURE 22. FIGURE 22 shows the logical switching circuitry of 2200 employed for the purpose of performing the error correction functions. The first error correction operation is performed by the logical switching gate group 2210 of FIGURE 22. The remaining input terminal 2204a of AND gate 2204 is connected to the output terminal of AND gate 2201. Input terminal 2201a of AND gate 2201 is connected to the output terminal of OR gate 2124 shown in FIGURE 21 which is an indication that a Hamming coding error exists and which is generated in a manner previously described. Input terminal 2201c is connected to the means (not shown) which indicates that the communication system is operating in the Hamming coding mode. Input terminal 2201b is connected to output terminal 1922b of multivibrator 1922 shown in FIGURE 19. As was previously described output terminal 1922 generates a positive square pulse upon the receipt of the trailing edge of the negative square pulse generated at the output terminal 1921a of the second multivibrator 1921. When this positive square pulse is impressed upon AND gate 2201 this enables the operation of all AND gates 2203–2209 provided in the first correction operation gate group 2210. However, at this time only AND gate 2204 has a binary one condition on its remaining input terminal 2204b causing it to generate a binary one condition at its output terminal 2204c. This is impressed upon the OR gate 2022 at its input terminal 2022a shown in FIGURE 20 of the drawings. OR gate 2022 passes this binary one condition to its output terminal 2022d which is connected to the correction input terminal 1905g of fifth stage 1905 in characters receiving register 1900. The impression of the binary one condition upon the correction input terminal 1905g causes the state of stage 1905 to be changed thereby establishing the correct state of the data bit $B_3$ which is stored in stage 1905 at this time. Thus, at this time the characters receiving register 1900 now contains a correctly coded decimal 7 character.

However, it should be noted that although the data bits $B_1$–$B_4$ stored in register 1900 are all correct two of the Hamming coding check bits $H_1$ and $H_3$ are still nevertheless incorrect since they have not been altered in co-operation with the alternation of data bit $B_3$. This function, however, is performed by the Hamming coding check bit correction circuitry 2240 shown in FIGURE 22 of the drawings. Output terminal 2204c of AND gate 2204 shown in FIGURE 22 is connected to the input terminal 2225b of OR gate 2205 which is contained in the Hamming coding correction circuitry 2240. This binary one condition is passed by OR gate 2225 and OR gate 2227 which generates a binary one condition at its output terminal 2227c. This binary one condition is connected to the input terminal 2106b of OR gate 2106 shown in FIGURE 21 which is passed to the $h_1$ generating flip-flop 2107. This causes the states of output terminals 2107b and 2107c to go to binary one and binary zero, respectively, thereby providing the correct even parity count for the $h_1$ summation.

Output terminal 2204c and AND gate 2204 is also connected to the input terminal 2232a of OR gate 2232. This passes a binary one condition through OR gate 2232 and OR gate 2234 to its output terminal 2234c. This condition is impressed upon the input terminal 2122a of OR gate 2122 shown in FIGURE 21. OR gate 2122 passes this binary one condition to the $h_3$ summing flip-flop 2123 thus causing output terminals 2123a and 2123c to go to the binary one and binary zero states respectively. Thus at this time the $h_1$, $h_2$ and $h_3$ summations all meet the even parity requirement. This indication is provided by AND gate 2132 the output of which generates a binary one indicative of the presence of a good coded character, the operation of this AND gate being previously described. Simultaneously therewith OR gate 2124 fails to have any binary one conditions impressed upon its input terminals so that its output terminal goes to binary zero thereby failing to indicate the presence of a Hamming coding error. This causes the input terminal 2201a of AND gate 2201 shown in FIGURE 22 to go to the binary zero state thereby preventing any of the AND gates 2203–2209 in the first correction operation level group 2210 from performing any subsequent correction operations. It can thus be seen that the circuitry described in FIGURES 19–22 are thereby capable of providing an error detecting operation by means of a Hamming coding summation functions and is able subsequently to make the appropriate correction of the errored single bit in the manner previously described.

The Hamming coding error detecting and correction circuitry of FIGURES 19–22 is further capable of both detecting and correcting a coded character which has been transmitted with two errored data bits. Considered the following example:

Let it be assumed that the decimal 7 is transmitted first correctly and then incorrectly in the following manner:

|           | $H_3$ | $H_2$ | $H_1$ | $B_4$ | $B_3$ | $B_2$ | $B_1$ | S |
|-----------|-------|-------|-------|-------|-------|-------|-------|---|
| Correct   | 1 | 0 | 0 | 1 | 1 | 1 | 0 | 1 |
| Incorrect | 1 | 0 | 0 | 1 | 1 | 0 | 1 | 1 |

It will be noted that data bits $B_1$ and $B_2$ in the incorrect transmission are binary zero whereas in the correct transmission they are both binary one. In generating the $h_1$–$h_3$ summations it can be seen from the following:

$$h_1 = 0011 = 0$$
$$h_2 = 0101 = 0$$
$$h_3 = 1011 = 1$$

that only $h_3$ appears to be incorrect. This would appear to indicate an error in only the check bit $h_3$ which, however, is not the case. The operation for performing the detection and correction of the two errored data bits $B_1$ and $B_2$ is as follows:

The characters receiving register 1900 and the gray bits receiving register 2000 are loaded in the manner previously described and the $h_1$–$h_3$ generating circuits likewise perform their even parity operations in the manner as previously described. Since only $h_3$ is incorrect, output terminal 2107c of flip-flop 2107 will be in the binary one state. This will be impressed on OR gate 2124 which will generated a binary one condition at its output indicating the presence of an errored character. AND gate 2129 has its input terminals 2129a–2129c connected to terminals 2107c, 2116b and 2123b which are all in the binary one state causing the output terminal of AND gate 2129 to generate a binary one condition to indicate the presence of an error in the Hamming coding check bit $H_3$. Output terminal 2129c is connected to input terminal 2137a of AND gate 2137 in FIGURE 21. The other input terminal 2137b is connected to the output terminal 2003f of stage 2003 in gray bits receiving register 2000 of FIGURE 20. Since this bit it not designated gray or ambiguous AND gate 2137 will not generate a binary one condition at its output terminal so that no output signal will appear at the output of OR gate 2142c to indicate the presence of a correctible error.

Whereas output terminal 2137c is connected to the input terminal 2207b of AND gate 2207 shown in FIGURE 22, since it is in the binary one state, AND gate 2207 will not generate a binary one condition at its output even though its other input terminals are binary one due to the presence of a Hamming coding error indication at the output of OR gate 2124, a positive square pulse at the output of multivibrator 1921, and an indication that the system is operating at the Hamming coding mode (which outputs are connected to AND gate 2201 of FIGURE 22). Thus it can be seen that no correction operation will occur during the time in which multivibrator 1921 of FIGURE 19 generates a square pulse at its output terminal 1921b. However, output terminal 1920a generates a positive square pulse prior to triggering of monostable multivibrator 1921, upon receipt of a binary one state from output 1908f of register 1900. This positive square pulse is impressed upon input terminal 2211b of AND gate 2211. Input terminal 2211a is connected to the output of OR gate 2124 which indicates the presence of a Hamming coding error. Input terminal 2211c is connected to the output terminal of an inverter means 2241 the input of which is connected to the output terminal 2142c of OR gate 2142 shown in FIGURE 21. The output of 2142c is binary zero which indicates the apparent absence of a correctible single error. The inverter circuit 2241, however, inverts this condition to impress a binary one upon AND gate input terminal 2211c. Terminal 2211d is binary one during the Hamming coding mode thereby causing AND gate 2211 to impress a binary one condition upon one input terminal of the AND gates 2213–2218, respectively. At this time, since data bit $B_1$ is tagged as being ambiguous, output terminal 2007f of stage 2007 in gray bits receiving register 2000 is in the binary one state. This causes AND gate 2213 to generate a binary one condition at its output terminal 2213c which is connected to the input terminal 2023b of OR gate 2023 shown in FIGURE 20. OR gate 2023 generates a binary one condition at its output terminal 2023e which is connected to the correction input terminal 1907g of stage 1907 in characters receiving register 1900. This causes the state of data bit $B_1$ to be changed to binary zero.

Simultaneously therewith output terminal 2213c of AND gate 2113 is impressed upon the input terminals 2226a and 2229a of OR gates 2226 and 2229, respectively, shown in FIGURE 22. These are passed through the OR gates 2227 and 2231 to the input terminals of OR gates 2106 and 2115, respectively, to change the state of summation flip-flops 2107 and 2116, respectively. Thus at this time there is an indication that all three summations $h_1$ and $h_3$ are incorrect and since all three summations have the data bit $B_2$ in common this provides an indication that data bit $B_2$ is incorrect. Thus the output terminals 2107c, 2116c and 2123c are impressed upon the input terminals 2126a–2126c respectively, of AND gate 2126 which generates a binary one condition at its output terminal indicating the presence of an error in data bit $B_2$.

This condition is impressed upon the input terminal 2134a of AND gate 2134, which coupled with the ambiguity bit indication in stage 2006 of gray bits receiving register 2000 passes a binary one condition through OR gate 2140 and 2142 to indicate the presence of a single correctible error. The output terminal 2135c of AND gate 2135 is impressed upon the input terminal 2205b of AND gate 2205 shown in FIGURE 22, the opposite terminal of which goes to binary one due to the presence of a Hamming coding error being present, operation in the Hamming coding mode and the presence of the positive square pulse at the terminal 1921b of multivibrator 1921. AND gate 2205 impresses a binary one condition therefore upon input terminal 2022a of OR gate 2022 shown in FIGURE 20 the output of which 2022d is connected to the correction input terminal 1906g of sixth range 1906 which contains the data bit $B_2$ thus correcting this data bit. The output of terminal 2205c is also impressed upon the input terminals 2225c, 2228b and 2232b of OR gates 2225, 2228 and 2232, respectively. These conditions are passed by OR gates 2227, 2231 and 2234, respectively, to the inputs of OR gates 2106, 2115 and 2122, respectively, of FIGURE 21. Each of these OR gates pass these binary one states to the flip-flops 2107, 2116 and 2123, respectively, causing the outputs of these flip-flops to be altered. Each of these flip-flops therefore generate binary one conditions at their output terminals 2107b, 2116b and 2123b, respectively, indicating the presence of a correct coded character. Thus it can be seen that the Hamming coding error detection and correction circuitry is further capable of providing two bit error corrections as well as one bit error corrections.

The operation of the logical gates 2011–2019 shown in FIGURE 20 of the drawings is as follows:

Let it be assumed that the stage 2007 of gray bit receiving register 2000 did not contain an indication of an ambiguity bit in that bit position and its output terminal 2007e would be in the binary one state. This condition is impressed upon the input terminal 2011b of AND gate 2011 which has its remaining input terminal 2011a connected to the output terminal 2006f of stage 2006. If this stage contains an ambikuity bit indication then AND gate 2011 will generate a binary one indication which will be impressed upon the input terminal 2214b of AND gate 2214 shown in FIGURE 22 so that this will be the first data bit to be corrected. In a like manner AND gates 2011–2019 "sense" the conditions of the stages 2007–2002 in a sequential fashion to determine which is the first data bit which is indicated as being ambiguous. This operation thus automatically locates the first ambiguous bit position which is indicated as such during the performance of a two bit correction operation. Considering one further example, let it be assumed that the first data bit indicated as ambiguous has a gray bit indication in stage 2005. Then output terminal 2007e of stage 2007 will be in binary one. This will be impressed upon AND gate 2011, but since stage 2006 does not contain an ambiguity indication AND gate 2011 will not generate a binary one condition at its output terminal. However, output terminal 2006e will be in the binary one state which condition is impressed upon terminal 2012b of AND gate 2012, the other input terminal of which is connected to the output terminal 2007e of stage 2007. Since this stage does not contain an ambiguity indication AND gate 2012 will pass a binary one condition to the input terminal 2013b of AND gate 2013, the other input terminal of which is connected to the output terminal 2005f of stage 2005. Since this stage contains an ambiguity bit a binary one will be impressed upon input terminal 2013a of AND gate 2013 which generates a binary one indication at its output terminal 2013c. This condition is impressed upon input terminal 2215b of AND gate 2215 shown in FIGURE 22 and will initiate a correction operation in stage 1905 of characters receiving register 1900 since output terminal 2215c of AND gate 2215 is connected to the input terminal 2021b of OR gate 2021 whose output terminal is connected to the correction input terminal 1905g of stage 1905, as it can be seen that the stages 2007–2002 are sensed in a sequential manner until the first ambiguity indicaton is reached at which time a correction operation will begin.

If the received coded character has three incorrectly received data bits, this is beyond the correction radium of the Hamming coding detection and correction circuitry of FIGURES 19–22 and an uncorrectible error indication must be provided. This function is performed by AND gate 2243 of FIGURE 22 which has input terminal 2243a connected to the output terminal 2124c of OR gate 2124 of FIGURE 21. The other input terminal 2243b is in binary one state when operating in the Hamming coding mode. This condition is passed through OR gate 2244 to one input terminal 2245a of AND gate 2245, the other input terminal of which is connected to output terminal 1922b of multivibrator 1922 shown in FIGURE 19. This output terminal generates a positive square pulse upon receipt of the trailing edge of the negative square pulse generated at the output terminal 1921a. Thus AND gate 2245 generates a binary one condition at its output terminal to indicate the presence of an uncorrectible error which indication is employed to initiate a request for a vertical parity transmission from the remote transmitter location. Thus the Hamming coding circuitry is capable of performing correction operations for the presence of either one or two data bit errors and will subsequently provide an indication of an uncorrectible error condition in the presence of more than two data bit errors which automatically initiates a request for both retransmission of the uncorrectible errored data and either a reduction in the bit rate operating speed or in the redundant coding arrangement.

Briefly reviewing the system described to this point, the self-optimizing terminal is a system facility located at the receiver location of a communication system which controls the rate and type of transmission of data from a remote transmitting location. The main objective of the self-optimizing terminal is that of enabling the transmission to be performed at the highest possible bit rate and the lowest level of redundant check bits permissible in accordance with the quality of link conditions. The self-optimizing terminal automatically shifts to lower bit rates or higher redundancy rates as the quality of the link diminishes and has the further capability of returning to higher bit rates and/or lower redundancy rates as the quality of the link increases. Thus the communication system under complete control of the self-optimizing terminal which is located at the receiver facility has the capability of automatically adapting itself to a transmission mode concomitant with the link conditions from both a long term and short term history viewpoint. The exemplary embodiment described so far is designed so as to operate when ideal conditions are present at a 1250 bit per second operating speed wherein the data is accompanied with a single redundant bit to provide an even parity check on the accuracy of transmitted information. If the link history shows that errors are occurring at a frequency to cause the data to be valueless, the self-optimizing terminal automatically shifts to Hamming coding operation at the same bit speed, namely, 1250 bits per second. If the frequency of error still persists under this mode of operation the self-optimizing terminal will then shift to the vertical parity check operation at the 1250 bit per second rate. If, after this operation the coded data received is shown to be uncorrectible a retransmission request may be made.

If, however, the data received is correctible, but the frequency of errors still persists, the self-optimizing terminal is able to go to other operating speeds and redundancy modes in the following order: From vertical parity operation at 1250 bits per second to single parity operation at 625 bits per second, to Hamming coding operation at 625 bits per second; vertical parity at 625 bits per second, single parity operation at 312.5 bits per second, Hamming coding operation at 312.5 bits per second and vertical parity operation at 312.5 bits per second. It should be noted that the vertical parity operation at each bit rate need not be employed except in cases where uncorrectible errors are present. As one example, if the system is operating at Hamming coding at 625 bits per second and errors are occurring but all errors are within the correction radius, the link history nevertheless will resort to the next lowest bit rate in order to insure reliable operation of the communication system. It is therefore only upon the occurrence of an uncorrectible error that the system will operate in the vertical parity mode. It should be understood that any one of the above operating modes may be eliminated from the system or other operating modes may be added to the system, depending only upon the needs of the user. As one example, the single parity operation may be employed only at the maximum bit rate whereas the remaining bit rates employ only Hamming coding operation. Also, it is possible to use a greater or lesser number of bit rates than the three bit rates employed in the examples given in the description of the system.

SELF-OPTIMIZING TERMINAL-SYSTEMS OPERATION

From a complete systems viewpoint there are basically two main modes of operation for the self-optimizing terminal. The first mode is that in which both remote locations of the system are operated in an on-line fashion or a "four-wire" facility. In other words, a duplex operation where both locations of the system are capable of transmitting simultaneously. The other method is that in which one end of the system is buffered and wherein the link is either a two or four-wire facility. In other words, only one of the locations is capable of transmitting in any given instant of time. This is defined as a half duplex operation where operation may occur in either direction at one given time but not in both directions simultaneously.

In the half duplex operation data is transmitted in blocks of information. The number of characters per information block can be of any arbitrary length or may be of such length as would correspond to the frequency with which vertical parity data is generated. Also, the length of the information block may be determined both by the convenience of the buffering or storing operation and the convenience of transacting the vertical parity operation between the two ends of the system. The operation is briefly as follows:

At the transmitting end characters are transmitted in an unbroken sequence and at predetermined intervals which are coded upon the interlocking arrangement between transmitter and receiver. Vertical parity data is generated and stored. During prearranged "link reversal" the transmitting end is instructed as to whether the stored vertical parity data should be erased or transmitted. If the instruction from the receiving end is a request for the transmission of the vertical parity data this data is held in storage at the transmitting end until an explicit instruction to erase is received and of course data transmission is not resumed until the vertical parity operation has been resolved.

At the receiving end, whenever a character is received in error and in addition thereto it is not possible to correct the character on the basis of the gray bits data, the character is delivered as received to the receiving location buffer, but is accompanied by a distinguished flag bit identifying the character as being errored. All unloading of the receiving and storage buffer into a load means is done through a vertical parity data correction buffer means in which the receiving end generates a vertical parity character in a continuous manner during the unloading of the storage buffer. The unloading of the receiving and storage buffer occurs only during the "link reversal" periods and it proceeds in an uninterrupted fashion until the buffer means is empty. If a flag character is noted during the unloading operation, the receiving means uses its supervisory signalling capabilities at the conclusion of the unloading process to request vertical parity data from the transmitting end. Upon receipt of the vertical parity data from the transmitting end the correction is performed on the flagged character, or characters, which is located in the flag character memory of the vertical parity data correction buffer. After the post-correction checking has occurred the receiving end commands the transmitting end to erase the stored vertical parity data and proceed with normal data transmission. It should be understood that the transmitting is at all times under complete control of the receiving end which monitors the conditions of the communications link and acts accordingly to control the operating speed and coding mode employed by the communications system during both data transmission and "link reversal" periods.

The transmitter facility circuitry is shown in FIGURES 23–25, 26a and 26b. Considering first FIGURE 23, the coding generating means and data sequencing means 2300 is shown therein which is comprised of a data source 2350. The data source 2350 is any suitable source for coded data, such as, for example, a magnetic drum, magnetic paper tape, magnetic core matrix and so forth. The data contained in the data source is capable of being fed out of the data source with all the data bits of each coded character being available in parallel at the outputs of the data source. Employing a binary coded decimal format, data source 2350 is provided with four output terminals which are impressed upon one input terminal each of the AND gates 2303–2306 for sequentially stepping out these data bits in a manner to be more fully described. The data sequencing and code generating means is further provided with a signal generating means 2360 for generating a sinusoidal output operating at a frequency suitable to transmit the data. The clocking signal output is impressed upon input 2302 to a count-of-eight counter 2301 which is provided with eight separate output means $C_1$–$C_8$. Counter 2301 operates in the same manner as those counters previously described. Output terminals $C_2$-$C_8$ are impressed upon one input terminal of the AND gates 2303–2309, respectively. The remaining input terminals of AND gates 2303–2309 are connected to the output terminal of AND gate 2370. AND gate 2370 generates a binary one condition, in a manner to be more fully described, in order to enable operation of gates 2303–2309. Upon the occurrence of binary one conditions at output terminals $C_2$–$C_8$ AND gates 2303–2309 pass the binary conditions of the data bits and the single parity bits or Hamming coding bits impressed upon their input terminals to one input terminal of the OR gates 2425–2431 of FIGURE 24. The outputs of these OR gates are impressed upon an OR gate 2470 the output of which transmits the data which has been stepped out in a sequential fashion to the receiver facility.

The single parity generating means is comprised of an OR gate 2310 having its input terminal connected to the output terminals of OR gates 2303–2306, respectively. Thus during the time at which AND gates 2303–2306 are being enabled by counter 2301 this data is likewise being impressed upon OR gate 2310 the output of which is impressed upon the input terminal of a flop-flop 2311. Flip-flop 2311 is reset prior to the count $C_2$ by count $C_1$ impressed upon its reset terminal 2311a causing its output terminal 2311b to be in the binary zero state. Thus upon the occurrence of each binary one condition due to the enabling of gates 2303–2306 flip-flop 2311 changes its state accordingly so as to generate the single parity bit. The single parity bit is passed through AND gate 2312 when operating in a single parity mode which passes this parity bit through OR gate 2326 and one input terminal of AND gate 2307 which during the single parity mode contains the single parity bit for transmission thereof. The single parity bit is only passed through AND gate 2312 when its input terminal 2312b is binary one, which it is during the single parity transmission mode. The means for controlling the state of this input terminal will be more fully described.

The Hamming coding check bits $H_1$–$H_3$ are generated in the following manner:

Check bit $H_1$ is the modulus two sum of data bits $B_1$–$B_3$. Thus the output terminals of AND gates 2303–2305 are impressed upon the input terminals of OR gate 2315. When these terminals are binary one they cause the flip-flop 2316 which has been reset at the count-of-one output by counter 2301 to change its state each time a binary one condition is impressed upon the input terminal. This generates the Hamming coding check bit $H_1$ at the output terminal 2316a of flip-flop 2316 which is impressed upon AND gate 2317. Terminal 2317b of AND gate 2317 is binary one when the system is operating in the Hamming coding mode passing the check bit $H_1$ through OR gate 2326 to one input terminal of AND gate 2307. In a like manner, the check bits $H_2$ and $H_3$ are generated wherein the OR gate 2318 receives the data bits $B_1$, $B_2$ and $B_4$ and OR gate 2321 receives the data bits $B_2$, $B_3$ and $B_4$. The output of flip-flop 2319 is impressed upon one input of AND gate 2320 as is the output of flip-flop 2322 impressed upon one input of AND gate 2323. The remaining input terminals of AND gates 2320 and 2323 are in binary one state during the Hamming coding mode in order to pass the check bits $H_2$ and $H_3$, respectively. The output terminals of AND gates 2320 and 2323 are connected to one input terminal of AND gates 2308 and 2309, respectively.

When in the Hamming coding mode it can be seen that as counter 2301 steps through its count-of-eight during the period of the count $C_2$–$C_5$ the Hamming coding check bits $H_1$–$H_3$ are being generated and are impressed upon AND gates 2307–2309 be stepped out during counts $C_6$–$C_8$, respectively.

When operating in the single parity mode, the single parity bit is impressed upon one input of AND gate 2307 so that the coded character is effectively paid out upon the count-of-six. In order to avoid the necessity of stepping through two unneeded counts [$C_7$ and $C_8$] AND gate 2316 is provided having a first input terminal receiving count $C_7$ and a second input terminal which is binary one during the single parity operation. This output terminal is connected to the reset input terminal 2301a of count-of-eight counter 2301, resetting the counter to begin a new count. When in the single parity operating mode no specific reset means is necessary since counter 2301 automatically resets itself upon completion of a count-of-eight count.

Vertical parity generating means 2400 is shown in FIGURE 24 and is comprised of AND gates 2401–2407 which receive the four data bits $B_1$–$B_4$ and either the single parity bit or the three Hamming coding bits respectively. All these bits are impressed in parallel upon the input terminals of AND gates 2401–2407 and are read out in parallel at the count-of-six count $C_6$. The states of these data bits are impressed upon the input terminals of flip-flops 2408–2414 respectively, in order to generate a vertical parity word in the manner substantially as described with respect to the vertical parity means provided in the receiver facility. The output terminals of flip-flops 2408–2414 are impressed upon one input terminal of AND gates 2418–2424, respectively.

The vertical parity generation and transmission takes place in the following manner:

The vertical parity generating means 2400 is provided with a count-of-nine counter 2431 which advances its count by one each time it receives a $C_1$ pulse from the count-of-eight counter 2301 shown in FIGURE 23. Upon receipt of the first $C_1$ pulse counter 2434 generates a binary state as its output terminal 2434-1. This is impressed upon the input terminal of an inverter 2433 causing a binary zero state to be impressed upon the reset input terminal of flip-flop 2432. Output terminal 2432a thereby goes to binary one condition which condition is impressed upon one input terminal of AND gate 2370 of FIGURE 1 enabling operation of the AND gate. Thus in the presence of the binary one condition this indicates that the transmitter facility is in the data transmission phase of the transmission cycle and not in the vertical parity transmission phase of the cycle. Counter 2434 continues to receive $C_1$ output pulses from counter 2301 and upon receipt of the fifth such count generates a binary one state at its output terminal 2434-5. This is impressed upon AND gate 2436 the other input of which goes to binary one during the Hamming coding mode. Assuming Hamming coding operation the AND gate generates a binary one condition through OR gate 2437 to the set input terminal of flip-flop 2432. This causes output terminal 2432a to go to binary zero thereby preventing an output to be generated at AND gate 2370 and further causes output terminal 2432b to go to binary one. This is impressed upon one input terminal of AND gate 2417 to enable operation of this gate. A second input terminal of AND gate 2417 is binary one when in the transmit mode as controlled by the receiver location, generation of this state to be more fully described. The remaining input terminal of AND gate 2417 is connected to the output of inverter 2303 shown in FIGURE 23 which goes to binary one during the dead interval of clocking source 2360. The dead interval being the same as that described previously with respect to the operation of the receiver facility self-optimizing terminal. Thus after four coded characters have been transmitted a vertical parity word of the four coded characters are then transmitted to the receiver location. This is done in the following manner:

When AND gate 2417 goes to binary one this enables the operation of AND gates 2418–2424, respectively. One input terminal of each AND gate is connected to the output terminals of vertical parity generating flip-flops 2408–2414, respectively. The remaining input terminals are connected to the outputs $C_2$–$C_8$ of counter 2301 shown in FIGURE 23. These AND gates are sequentially stepped out and have their output terminals connected to one input terminal respectively of the OR gates 2425–2531 which pass their binary states through to OR gate 2470 the output of which goes to the receiver facility.

If the system is operating in the single parity mode upon receipt of the eighth count of one output $C_1$ from counter 2301 counter 2434 generates a binary one condition at its output terminal 2434-8. This is impressed upon AND gate 2435 which passes this condition through AND gate 2437 to the set input terminal of flip-flop 2432. This causes a read out of the vertical parity word in the same manner as described for the Hamming coding operation, the only distinction being that a vertical parity word is transmitted for every seven coded characters transmitted.

When in the Hamming coding code output terminal 2431-1 is connected to one input terminal of AND gate 2438, the other input terminal of which is in binary one during the Hamming coding mode. This condition is passed through OR gate 2440 to the reset input terminal of flip-flop 2441 causing the output terminal 2441a to go to binary zero. However, when count-of-nine counter 2434 reaches the count-of-five, output terminal 2432a of flip-flop 2432 presses a binary one condition upon set input terminal of flip-flop 2441 causing output terminal 2441a to go to binary one. This condition transmits a predetermined signal to the receiver location to ascertain whether the receiver location desires transmission of the vertical parity word. If the vertical parity transmission is desired output terminal 2417b of AND gate 2417 will go to binary one in a manner to be more fully described in order to enable transmission of the vertical parity word.

Under single parity operation AND gate 2439 is provided which receives a binary one condition from output terminal 2434-8 of counter 2434 the other terminal goes to binary one during single parity operation which condition is passed through AND gate 2440 to the reset input terminal of flip-flop 2441. When the set input terminal of flip-flop 2441 goes to binary one, however, output terminal 2441a goes to binary one to provide a similar operation for the single parity transmission mode.

Control of the transmitter location is performed by the circuitry 2600 shown in FIGURES 26a and 26b. In order to control the transmitter location the receiver facility is provided with three separate tone generating means [not shown] each of which may be in either the on or off condition to provide eight different combinations of operations thereof each one of the eight combinations representing a specific type of operation desired by the transmitter location. As shown in the chart 2650 of FIGURE 26a five different operations which are desired are coded in the manner shown therein the operations being single parity at the maximum bit rate, Hamming coding at the maximum bit rate, Hamming coding at the intermediate bit rate, Hamming coding at the minimum bit rate and repeat transmission. For example, if the receiver facility desires that the system operate at single parity at the maximum bit rate, referring to the chart 2650, tone No. 1 is absent [as represented by the binary zero symbol] and tones Nos. 2 and 3 are present [as represented by the binary one symbol]. The remaining coding arrangements are represented in a similar fashion.

The receiver facility is provided with filtering means 2601, 2603 and 2605 each being capable of filtering out the tones No. 1, No. 2 and No. 3, respectively. It should be noted that the three tones generated by the receiver facility and transmitted to the transmitter facility may be sent on three separate lines or may be mixed in one single line either of which operation does not alter the operating functions of the filters 2601, 2603 and 2605. If, for example, the tone No. 1 is present, filter 2601 will generate an output at its output terminal 2601a. If tone No. 1 is absent no output will appear at output terminal 2601a which condition will be impressed upon inverter 2602 which generates a binary one at its output 2602a to indicate the absence of tone No. 1.

In order to establish which control is being transmitted by the receiver facility AND gates 2607–2612 are provided. Let it be assumed that the receiver facility is requesting operation in the Hamming coding intermediate bit rate. Referring to chart 2650 it can be seen that tones 1 and 3 will be present and tone 2 will be absent. This means that output terminals 2601a and 2605 will be at binary one and output terminal 2604a will be at binary zero. These conditions are impressed upon the three input terminals, respectively, of AND gate 2609 which will generate a binary one condition at its output terminal 2609a to indicate the fact that the receiver facility is requesting operation at the Hamming coding intermediate bit rate mode. This is impressed upon one input terminal of AND gate 2638 shown in FIGURE 26b to cause the transmitter facility to operate at this desired mode in a manner to be more fully described.

In order to distinguish the control tones received from the receiver facility from possible noise phenomenon which may be present on the line the output terminals of all of the AND gates 2607–2612 are impressed upon respective inputs of OR gates 2613. The output of OR gate 2613 is connected to AND gate 2615 the other input terminal of which is connected to the output 2302 of clock pulse source 2360 shown in FIGURE 23. Thus, after a predetermined tone combination is received and decoded in the AND gates 2606–2612 [only one of which will conduct] this is impressed through OR gate 2613 and ANDED in gate 2615 with the clock pulse source to advance a count-of-three counter 2617. If the decoded tone combination lasts for a period at least equal to three counts a clocking signal impressed upon AND gate 2615 causes counter 2617 to advance through a count-of-three to provide an output at its terminal 2617a. This output is impressed upon the set input terminal of flip-flop 2618 which generates a binary one condition at its output terminal 2618b. Output terminal 2618b is connected to bus 2635 of FIGURE 26b which simultaneously impresses binary one condition upon one input of each of the AND gates 2636–2639 respectively. Assuming again that the code combination transmitted from the receiver location is for Hamming coding at the intermediate bit rate the output terminal of AND gate 2609 shown in FIGURE 26a, as well as being impressed upon OR gate 2613, is simultaneously impressed upon one input terminal of AND gate 2638. So long as the tones identifying a Hamming coding intermediate bit rate mode of operation persists for at least three bit lengths, bus 2635 goes to binary one causing AND gate 2638 to go to binary one. This binary one state is passed through OR gates 2640 and 2643 to the set input terminal of flip-flop 2511 shown in FIGURE 25 of the drawings which flip-flop controls the operating speed at the transmitter facility in a manner to be more fully described.

The outputs of AND gates 2637–2639 are all connected to OR gate 2643, all of which indicate operation in the Hamming coding mode. The outputs of AND gates 2636 and 2637 are connected to OR gate 2642 which designate operation at the maximum bit rate mode. The outputs of OR gates 2640 and 2641 are impressed upon the input terminals of OR gates 2642 to initiate an operation which is designated as a "framing" operation, which is to be more fully described.

When the first, second and third tones are received, as well as being received by the AND gates 2607–2612 of FIGURE 26a, these tones are passed upon the AND gates 2621–2623 of FIGURE 26b. Returning again to the example wherein the receiver facility requests Hamming coding at the intermediate bit rate, it will again be noted that tones 1 and 3 are present and tone 2 is absent. This places binary one conditions at the input terminals of AND gates 2621 and 2623. Bus 2620 is connected to the output terminal 2441a of FIGURE 24 which is in the binary one state indicative of the fact that the transmitter location is awaiting some control signal from the receiver facility. Assuming this state to be present the outputs 2624b and 2626b of flip-flops 2624 and 2626 respectively, go to binary one while output 2625a of flip-flop 2625 is in binary one state. These outputs are connected to selective input terminals of the AND gates 2607–2612 and contribute toward the identification of the coded control signal sent to the transmitting location. For example, AND gate 2609 has two of its input terminals connected to the outputs 2624b and 2626b, respectively, and its third input terminal connected to output terminal 2625a.

AND gates 2621–2623 each have a first input terminal connected to the output terminals 2602a, 2604a and 2606a shown in FIGURE 26a. Thus, if any of these tones disappear momentarily, these terminals will go to binary one. Bus 2627 is connected to output terminal 2618a of flip-flop 2618 shown in FIGURE 26a. This terminal is binary one state until flip-flop 2618 is set by the output of counter 2617 thus placing bus 2627 in the binary one condition. Therefore, if any one or all three of the tones received from the receiver facility drop out prior to the completion of a period equal to three bit lengths the AND gates 2621–2623 will generate binary one conditions which are passed through the respective OR gates 2632–2634 to reset flip-flops 2624–2626, respectively. Flip-flops 2624–2626 may also be reset upon recognition of a control operation from the receiver facility in the following manner:

OR gates 2632–2634 are further provided with second input terminals each of which is tied to a common bus 2631. The bus 2631 is connected to output 3128b which is binary one a delay period after a space recognition by counter 3124. This operation resets flip-flops 2624–2626 in readiness for receipt of subsequent commands from the receiver facility.

Thus after a coded control persists for at least three bit lengths and is appropriately decoded, the control is acknowledged and simultaneously therewith is employed to alter the operating mode of the transmitter facility.

Continuing with the example of a Hamming coding intermediate bit rate control, this generates a binary one at the output of AND gate 2638. As previously described, this is impressed upon the input terminal 2511a of flip-flop 2511 shown in FIGURE 25. This causes output terminal 2511b to go to binary one which condition is impressed upon the input terminals of the AND gates 2317, 2320 and 2323 used in the Hamming coding generating circuits of FIGURE 23; AND gate 2438 of FIGURE 24 and the AND gate 2436 of FIGURE 24. It should also be obvious that if AND gate 2636 generates a binary one condition, the output of this AND gate being impressed upon the set input terminal 2511c of flip-flop 2511 this causes output terminal 2511d to go to binary one [at which time terminal 2511b goes to binary zero] which is used to control AND gaate 2312 of FIGURE 23, AND gate 2439 of FIGURE 24 and AND gate 2435 of FIGURE 24.

The output terminal of AND gate 2638 is also impressed upon the set input terminal of flip-flop 2509 causing its output terminal 2509a to go to binary one. This condition is impressed upon one input terminal of AND gate 2505 to control the bit operating speed of the transmitter facility.

The transmitter facility is provided witth a signal source 2501 which operates at the carrier frequency which is amplified by means 2502 and employed to operate the count-of-eight counter 2503. Three outputs are taken from each of the stages [not shown] of counter 2503, each of which provides a frequency one-half, one-quarter and one-eighth, respectively, of the carrier frequency imposed upon the input terminal of counter 2503. This circuit is identical in configuration and operation to the circuit of FIGURE 18 described previously. Each of the outputs 2503a–2503c are connected respectively, to one input terminal of the AND gates 2504–2506. Thus upon an intermediaate speed request AND gate 2505 has one input terminal at binary one and the other input terminal connected to output terminal 2503b which operates at one-fourth of the carrier frequency, or 625 bits per second, causing AND gate 2505 to pay out 625 square pulses or bits per second. This condition is passed through OR gate 2507 which is connected to the input terminal 2302 of FIGURE 23 and is the clocking source for the counter 2301 shown in that figure. In a like manner, the flip-flops 2508 and 2510 are employed to control a speed change to either the maximum speed request of 1250 bits per second or the minimum speed request of 312.5 bits per second. These flip-flop output terminals are connected to the AND gates 2504 and 2506, respectively.

When a speed change is requested, it is necessary to reset the flip-flop containing the previous speed rate in order to have only one of these flip-flops providing a binary one at its output terminal. Thus upon the request of an intermediate speed rate the output terminal of AND gate 2638, shown in FIGURE 26b, is connected to the input terminals of OR gates 2512 and 2514, the outputs of which are connected to the reset input terminals of flip-flops 2508 and 2510, resetting these so that their output terminals are in binary zero. This thereby prevents the impression of more than one bit rate upon OR gate 2507. As one further example, if a low speed request is made, this will cause AND gate 2639 of FIGURE 26b to be in the binary one state. This condition is impressed upon the set input terminal of flip-flop 2510 and also upon the input terminals of OR gates 2512 and 2513 which reset the flip-flops 2508 and 2509, respectively. Thus, in addition to the transmitter facility having the capability of shifting to a different bit rate, it should also be noted that the shift is under the complete control of the receiver facility which is provided with the long-term and short-term link monitoring means in order to select the optimum bit speed and coding arrangement dependent upon link conditions.

In cases where data received at the receiver facility lies beyond the correction radius of the receiver facility, even after the vertical parity operation, the receiver facility is then capable of generating a repeat command controlling the transmitter facility to repeat the data lying beyond the correction radius. In order to perform such a repeat operation, the transmitter facility is provided with the circuitry 2700 and 2800 shown in FIGURES 27 and 28 respectively. FIGURE 27 shows an eight-level shift registry memory 2700 comprised of memory levels 2710–2780, respectively. This level 2710 is comprised of flip-flops 2711–2714 which are set at their set input terminals by the output states of AND gates 2303–2306 shown in FIGURE 23, which AND gates step out the data bits $B_1$–$B_4$, respectively. Thus as the AND gates 2303–2306 generate outputs, these outputs are employed to set flip-flops 2711–2714. At count $C_1$ of counter 2301 of FIGURE 23, this pulses monostable multivibrator 2701 which generates a binary one at its output terminal 2701a which is impressed upon the shift input terminals of each flip-flop stage of the memory levels 2720–2780, respectively. Thus, for example, if the first data word is shifted into memory level 2710, the next $C_1$ count, this coded character is shifted into memory level 2720. Output terminal 2701b of monostable multivibrator 2701 then triggers monostable multivibrator 2702 after a predetermined time delay equal in length to the pulse width of the negative square pulse generated at output terminal 2701b. This causes the output 2702a to generate a binary one condition causing flip-flops 2711–2714 of first memory level 2710 to be reset in readiness for the next coded character. In a like manner, coded characters are shifted downward from first level 2710 through level 2780 in a continuous fashion.

Upon the occurrence of a repeat command AND gate 2611 generates a binary one condition [see FIGURE 26a] which is impressed upon the input terminal 2830a of flip-flop 2830 shown in FIGURE 28. This condition is impressed upon one input of each of the AND gates 2813–2816, respectively, by means of terminal 2830c which goes to binary one state thus enabling these AND gates. AND gates 2717–2820 are disabled due to the fact that output terminal 2830b of flip-flop 2830 goes to binary zero. As will be noted, output terminals 2751a–2754a of memory level 2750, shown in FIGURE 27, are impressed upon respective inputs of AND gates 2801–2804, shown in FIGURE 28. Likewise, output terminals 2781a–2784a are imposed upon respective input terminals of AND gates 2805–2808. This arrangement is provided due to the fact that when in the Hamming coding operation mode data blocks are comprised of five coded characters, while in the single parity operation mode data blocks are comprised of eight coded characters. It is therefore necessary to repeat only those characters of the last preceding data block. For example, considering Hamming coding operation, five coded characters should be stored in the levels 2710–2750 of memory 2700. When in Hamming coding operation, flip-flop 2511 of FIGURE 25 has its output terminal 2511b in binary one state, its output terminal 2511d in binary zero states. This causes the enabling of AND gate group 2801–2804 and the disabling of AND gate group 2805–2808. Thus upon the initiation of the repeat operation data will initially be stepped out from the output terminals of the fifth level 2750 of memory 2700. Data passed by AND gates 2801–2804 through OR gates 2809–2812 to the input terminals of AND gates 2813–2816. These AND gates are enabled due to the fact that the transmitter facility is operating in a repeat mode. The AND gates 2813–2816 therefore pass the coded characters through OR gates 2822–2825, respectively, to data source 2350, shown in FIGURE 23 of the drawings, in order to again be impressed upon the AND gates 2303–2306 for operation in the same manner as previously described. Since operation is now taking place in a repeat mode, data from the data source 2821 is inhibited from being passed through AND gates 2817–2820 respectively. It should be noted that data source 2821 is the basic source of data, such as, for example, a magnetic tape, magnetic drum, punch cards. etc.

Assuming that operation is taking place in the single parity mode when a repeat command is received, this simply causes output terminal 2511b of flip-flop 2511 to go to binary zero while its output terminal 2511d goes to binary one, thus enabling operation of AND gates 2805–2808 and disabling AND gates 2801–2804. This data is passed through OR gates 2809–2812 and enabled AND gates 2813–2816 and through OR gates 2822–2825 to the data source 2350 shown in FIGURE 23 of the drawings. Thus data is then read from the eighth level 2780 of eight, level memory 2700 until all eight coded characters are stepped into the AND gates 2303–2306 respectively. After the eighth coded character is transmitted, the count-of-nine counter 2434 causes OR gate 2437 to generate a binary one condition, in a manner previously described to reset flip-flop 2830. This terminates the repeat operation mode and reestablishes the data gating operation mode.

TWO-WIRE SYSTEM RECEIVER FACILITY

The receiver facility in the two-wire system is comprised of the self-optimizing terminal information interval counting means and the vertical parity and Hamming coding circuitry described previously, as well as the supervisory logic, shown in FIGURE 17. All of the aforementioned circuitry, in addition to being capable of error detection and correction, generates the indications of speed change requests and/or coding change requests. In the two-wire system the commands consist of the same commands shown in the chart 2650 of FIGURE 26a which are given for the transmitter facility.

The speed change and framing circuitry is shown in FIGURES 29–32 which complement the circuitry of FIGURES 17 and 18 to perform the speed change and framing operations. Referring first to FIGURE 17, it can be seen that AND gates 1720–1723 are provided for generating indications of two gray bits, three gray bits, or one gray bit per coded character received. These AND gates are connected in a predetermined manner to the output terminals 1704b and 1704c of flip-flop 1704, as well as terminals 1706b and 1706c of flip-flop 1706; flip-flops 1704 and 1706 forming a two-stage counter circuit capable of counting to at least a count of three.

The output terminlas 1720c and 1721c are connected to the input terminals of flip-flops 2901 and 2902 shown in the speed change circuitry 2900 of FIGURE 29. The outputs 2901b and 2902, respectively, of these flip-flops are connected to input terminals of the AND gates 2903 and 2904, the outputs of which pass through an OR gate 2905 and a second OR gate 2906 to an output terminal 2906c. The second input terminals of AND gates 2903 and 2904 are connected to the output terminals 1821b and 1820d of OR gates 1821 and 1820, shown in FIGURE 18. The outputs of these gates provide an indication of whether the system is operating in either Hamming coding or single parity mode. For example, output terminal 1804f provides an indication that the system is operating at 1250 bit per second speed in the single parity checking mode, while an output of binary one in OR gate 1821 indicates a single parity operating mode. Terminals 1804c–1804e indicate, respectively, 1250 bit per second speed in the Hamming coding, 625 bit per second speed in the Hamming coding and 312.5 bit per second speed in the Hamming coding. Thus a binary one indication at the output of OR gate 1820 indicates the Hamming coding mode. As was previously described, the presence of two or more gray bits when operating in the single parity mode or with the operation in the single parity mode, this causes AND gate 2903 to generate a binary one which is passed through OR gates 2905 and 2906 to generate a binary one at 2906c which is a vertical parity request. In a like manner, when in the Hamming coding mode, if there are three or more gray bits per character present, terminal 1820d is binary one, causing AND gate 2904 to pass a binary one condition through the OR gates to output terminal 2906c to generate a vertical parity request. The binary one condition at terminal 2906c is impressed upon a set input terminal of flip-flop 2910 which generates a binary one condition at its output tedminal 2911 upon the generation of a vertical parity request.

In order to generate a speed change of the type which reduces the operation from a higher speed to a lower operating speed, the output terminal 1702b of FIGURE 17 goes to binary one in the manner previously described. This is impressed upon one input terminal of AND gate 2912 for a purpose to be more fully described. The binary one condition at output terminal 1702b is also available at terminal 2913 of FIGURE 29 for use in generating a reduced speed request in a manner to be more fully described.

In order to provide a speed change from a lower speed to a higher speed, this is provided for in FIGURE 17 whereby upon the presence of a cumulative count of 32 in counter 1708 which indicates that 32 error free characters have been received, this provides an output at terminal 1711b of flip-flop 1711 which is impressed upon the input terminal 1723a of AND gate 1723, the other terminal of which goes to binary one upon the presence of a good long-term history indication, the circuitry of which will be more fully described. The output terminal 1723c which is binary one to indicate a request for an increased bit rate is pressed upon the input terminal 2907 of flip-flop 2908, shown in FIGURE 29, to generate a binary one at the output terminal 2908b thereof, which is connected to one input terminal of AND gate 2909. A binary one at terminal 2908b is used to generate an increased speed change, in the manner to be more fully described.

OR gate 2913 is connected to the output terminal 1303 of the vertical parity operation circuitry of FIGURE 13 which is binary one when a coded character, after having been operated on through the vertical parity operation, proves to be beyond the correction capabilities of the system. This generates a binary one condition at the output terminal 2913b to start a repeat transmission operation. This condition is impressed upon the set input terminal of flip-flop 2914 which generates a binary one condition at its output terminal 2914b to initiate a repeat transmission at the transmitter location. The terminals 2913, 2911, 2908 and 2914b are impressed upon the input terminals of OR gate 2915. The remaining input terminal is employed for receiving a binary one condition upon initiation of operation of the system (i.e., system start). If any one of these conditions are present a binary one is passed through OR gate 2915 and OR gate 2916 to the set input terminal of flip-flop 2919. This generates a binary one condition at its output terminal 2919c which is employed to enable the generation of the appropriate tone frequencies to control the transmitter to respond to the appropriate request.

Turning now to FIGURE 30, the circuitry 3000 shown therein, is that employed for the purpose of generating the speed change or other request, depending upon the link history.

Consider first the generation of a request for operation at the 625 bit per second rate. This request can be brought about in two ways:

(1) A reduced request from operation at the 1250 bit per second Hamming coding operation mode due to the high frequency of error occurring.

(2) An increased bit speed request due to the receipt of error free coded characters (32 such characters) at the 312.5 bit operating speed.

Considering this circuitry, AND gate 3001 is provided with a first input terminal which is connected to the output terminal 1804c of counter 1804, shown in FIGURE 18. When this terminal is binary one, this is an indication of operation at the 1250 bit per second Hamming coding operating mode. At this time when terminal 2913 goes to binary one, this is an indication of a reduced bit rate request, for reasons previously described. Thus AND gate 3001 passes a binary one condition through an emitter follower at OR gate 3003 to set input terminal of flip-flop 3004. This generates a binary one at terminal 3004b which is impressed upon one input of AND gate 3005. The other terminal of AND gate 3005 is connected to terminal 2919c of FIGURE 29, which is binary one upon the occurrence of either a system start, reduced bit rate, increased bit rate, repeat or vertical parity request. This generates a binary one indication at the output terminal 3005c of AND gate 3005. In a like manner, if the system is operating at the 312.5 bit speed, output terminal 1804e of counter 1804 is binary one and upon the occurrence of a binary one condition at terminal 2908b which indicates the receipt of a predetermined number of error free characters, AND gate 3002 goes to binary one in the manner just previously described.

When operating at the 1250 bit speed with the Hamming coding checking mode, output terminal 1804c is at binary one, which condition is impressed upon AND gate 3006. If the system has received at the receiver facility the predetermined number of error free characters, terminal 2908b goes to binary one, causing AND gate 3006 to generate a binary one at its output terminal. This situation thereby enables the system to go from 1250 bit per second Hamming coding operation to 1250 bit per second single parity operation. This is done in the following manner:

AND gate 3006 then generates a binary one condition which is passed through OR gate 3007 to the set input terminal of flip-flop 3008. This generates a binary one condition at terminal 3008b which is impressed upon AND gate 3009. The other terminal of AND gate 3009 is connected to the output terminal 2919c of FIGURE 29 to enable AND gate 3009 to generate a binary one condition at its terminal 3009c. Also, upon the occurrence of a system start, a binary one condition is impressed upon the input terminal 3007b of OR gate 3007 in order to enable AND gate 3009 to generate a binary one condition, as just previously described, since in the absence of any link history whatsoever, the system initially begins its operation at the 1250 bit per second single parity operating mode.

If the operation occurring at the 625 bit per second Hamming coding mode and a reduced bit rate request is present, output terminal 2913 of FIGURE 29 goes to binary one, which condition is impressed upon one input terminal of AND gate 3010. The other input terminal is connected to output terminal 1804d of FIGURE 18 which indicates operation at the 625 bit per second speed. This causes AND gate 3010 to generate a binary one condition which is impressed upon the set input terminal of flip-flop 3011. Output terminal 3011b goes to binary one which condition is impressed upon AND gate 3012. The other input terminal of the AND gate is connected to output terminal 2919c of FIGURE 29 to enable AND gate 3012 to generate a binary one condition at its output terminal 3012c. Thus when operating at the 625 bit per second speed and a reduced request is generated, output terminal 3012c generates the necessary signal for requesting a 312.5 per second operating speed.

When operating at the 625 bit per second speed and a good line history is shown to be present, a speed increase is generated by means of AND gate 3013 having a first input terminal connected to the output terminal 1804d of FIGURE 18 which is binary one when operating at the 625 bit per second operating speed. The other input terminal is connected to the output terminal 2908b which is binary one to indicate a speed increase request due to the receipt of a predetermined number of error free characters. This binary one condition is passed by AND gate 3013 and OR gate 3015 through flip-flop 3016 which enables AND gate 3017 in the same manner as previously described with respect to flip-flops 3004, 3008 and 3011. The other input terminal of AND gate 3017 is connected to output terminal 2919c which is binary one to indicate the generation of the speed change request. Output terminal 3017c goes to binary one to request operation at the 1250 bit per second Hamming coding operating mode.

If the system is operating at 1250 bits per second single parity mode and a reduced speed request is generated, these signals are interpreted by AND gate 3014 of the 1250 bit per second single parity mode. The other input terminal is connected to output terminal 2913 to indicate a reduced speed request which upon simultaneous occurrence of these conditions causes AND gate 3014 to generate a binary one to trigger flip-flop 3016 and AND gate 3017 in the same manner as perviously described. Thus output terminals 3009c, 3017c, 3005c and 3012c provide indications for requests to operate at 1250 bits per second single parity, 1250 bits per second Hamming coding, 625 bits per second Hamming coding and 312.5 bits per second Hamming coding modes respectively. These signals are employed by the tone generating equipment 3050 shown in FIGURE 30a of the drawings to generate the appropriate tones for transmission to the transmitter location. The chart 3080 which is identical to the chart previously shown in FIGURE 26a of the drawings shows the combinations of tones generated to represent each request to be made by the receiver facility. For example, if a request is made upon the transmitter facility to operate at 1250 bits per second single parity, considering the chart 3080, tones No. 2 and 3 must be present while tone No. 1 is absent. Circuit wise, this is done in the following manner:

Output terminal 3009c is binary one to indicate a request for operation at 1250 bits per second single parity, which is generated either upon a system start signal or an increased bit rate signal, as was previously described. Output terminal 3009c is connected to one input terminal of OR gate 3052 and OR gate 3053. These binary one conditions are passed by OR gates 3052 and 3053 to one input terminal of AND gates 3055 and 3056, respectively. The other terminals of these AND gates are connected to a bus 3060 which is connected to output terminal 2919c of FIGURE 29 which is binary one to indicate the presence of a request. These conditions are passed by AND gates 3055 and 3056 in order to enable operation of the tone generator No. 2 [3058] and tone generator No. 3 [3059] the outputs of which are connected to the suitable transmitters for these tones which transmitters may either be amplifiers connected to a wire line or suitable radio transmitters for transmission through atmospheric medium.

In a like manner, the other tone combinations are generated in order to initiate operation at the transmitter location to another or a repeat transmission, as the case may be.

TRANSMITTER SPEED CHANGE COOPERATING CIRCUITRY

As was previously described with respect to FIGURE 26 of the drawings, the transmitter location is provided with suitable tone receiver devices shown as 2601, 2603 and 2605, respectively, in FIGURE 26a. These tones are suitably decoded to determine what type of a command is being transmitted by the receiver facility to the transmitter facility so that the transmitter facility may react accordingly. Interpretation of the command is performed by the AND gates 2607–2612 and 2619, as was previously described, and when the command persists for at least three bit lengths a binary one indication is generated at the output terminal 2618b of flip-flop 2618.

This condition is impressed upon one input terminal of AND gate 3101 shown in FIGURE 1 of the drawings. The other input terminal receives the count $C_1$ of counter 2301 shown in FIGURE 23 which is the first pulse generated upon the transmission of the next coded character to be sent to the receiver facility. At this instant of time AND gate 3101 generates a binary one which is impressed upon the set input terminal of flip-flop 3102 generating a binary one condition at the output terminal 3102a and a binary zero condition simultaneously therewith. The binary one condition is impressed upon the set input terminal of flip-flop 3103 causing terminals 3103a and 3103b to go to binary zero and binary one respectively. Output terminal 3102a is impressed upon one input of OR gate 3114 which passes to one input terminal of AND gate 3115. The other input terminal of AND gate 3115 is connected to output terminal 3103b causing this AND gate 3115 to pass this condition through OR gate 3116 to the tone generator 3117. Tone generator 3117 generates a fourth tone having a different frequency from tones 1, 2 and 3 already employed. This impresses a steady tone upon the communications line which is thereby used as a recognition or acknowledgment of the control received from the receiver facility.

Considering for a moment FIGURE 31a, there is a waveform representation of the operation between receiver and transmitter. For example, at time $t_0$ the receiver facility requests a speed change [or other suitable command]. The receiver facility therefore places a specific tone [or combination of tones] upon the line which tone is represented by the square pulse 3150. At time $t_0$ the transmitter is transmitting data to the receiver facility as represented by the pulses 3151. However, the count-of-three counter 2617 which was previously described, upon recognition of persistence of tone 3150 for the minimum of three bit intervals, causes the generation of the binary one condition at output terminal 2618b and hence output terminals 3102a and 3103b of FIGURE 31 and subsequently the steady tone No. 4 as generated by the tone generator 3117. This occurs at time $t_1$ and is represented by the square pulse 3152.

The circuit 3200 of FIGURE 32 is employed for the purpose of recognizing the acknowledgment signal 3152 sent from transmitter to receiver. The circuit is comprised of a filtering means 3201 for generating an output at its output terminal indicative of the presence of tone No. 4. This condition is impressed upon one input terminal of AND gate 3202 the other input terminal of which is connected to the clocking signal output 1809 of FIGURE 18, the bit rate of which is determined by the previous link conditions. AND gate 3202 impresses its output upon the input terminal 3203a of a count-of-three counter 3203 and if the tone represented by square pulse 3152 of FIGURE 31a persists for three bit intervals, counter 3203 generates an output at its terminal 3203b which is impressed upon multivibrator 3204 which in turn will generate an output binary one condition at its terminal 3205 which is indicative of recognition of the tone No. 4 generated by the transmitter facility and sent to the receiver facility.

When output terminal 3205 goes to binary one to indicate the presence of the persistent tone No. 4, this condition is impressed upon the input terminal 2920b of OR gate 2920, shown in FIGURE 29. OR gate 2920 passes this condition to the reset terminal of flip-flop 2919 causing output terminal 2919c to go to the binary zero state. As will be noted, output terminal 2919c is connected to the inputs of AND gates 3005, 3009, 3012 and 3017 of FIGURE 30 and the absence of this binary one condition disables these AND gates thereby disabling the tone generators 3057, 3058, and 3059 of FIGURE 30a. Therefore, the receiver facility transmits no tones whatsoever to the transmitter facility. This occurs at time $t_2$, as shown in FIGURE 31a. As will be in FIGURE 26 of the drawings, an AND gate 2612 is provided for the recognition of no tones whatsoever [i.e., space recognition], which condition is impressed upon one input to OR gate 2613 of FIGURE 26a. However, immediately prior to the receipt of the space recognition signal, it should be noted that the count-of-three counter 2617 of FIGURE 26a is first reset in the following manner:

After the command represented by square pulse 3150 persists for at least three bit intervals, which at any case is less than the time $t_2$ shown in FIGURE 31a, the absence of such a signal is impressed upon inverter 2614 causing a binary one condition to be impressed upon the multivibrator 2616. The output of monostable multivibrator 2616 is employed to reset counter 2617 at its reset input terminal 2617b, thus placing it in readiness for the next control signal to be received from the receiver facility.

Upon receipt of the space recognition signal, this signal is impressed upon one input terminal of AND gate 3120 of FIGURE 31, the other input terminal being connected to the output terminal 2618b of FIGURE 26a which is a recognition of the command tones received from the receiver facility. These conditions are passed by AND gate 3120 to one input terminal of AND gate 3121. The other input terminal 3121b of the AND gate is connected to the output terminal 1809 which is the clocking signal output terminal for the transmitter facility. Thus, upon receipt of the clocking pulse AND gate 3121 passes a binary one condition to the count-of-three counter 3124. If the space condition persists for at least three bit intervals count-of-three counter 3124 generates an output signal at its terminal 3124b which is employed to control flip-flop 3125. Upon occurrence of such a condition, flip-flop 3125 generates a binary one at its terminal 3125b which is employed to operate the trigger input terminal of monostable multivibrator 3126. This causes output terminal 3126b to generate a positive square pulse and output terminal 3126c to generate a negative square pulse. Output terminal 3126b is connected to reset input terminal 3102c of flip-flop 3102 causing its output terminal 3102a to go to binary zero and 3102b to go to binary one. Terminal 3102a goes to binary zero. This removes the tone being sent by the transmitter to the receiver from the line which occurs at time $t_3$. At the trailing edge of the negative square pulse generated at output terminal 3126c this trailing edge which is a positive going pulse is impressed upon the trigger input terminal of monostable multivibrator 3128. This triggers a generation of a positive square pulse at the output terminal 3128b which is connected to the reset input terminals of flip-flops 2618 shown in FIGURE 26a and 3125 shown in FIGURE 31. This causes the command recognition output terminal 2618b to go to the binary zero condition and further causes output terminal 3125b to go to the binary zero condition as well.

Output terminal 3128c of monostable multivibrator 3128 generates a negative square pulse which is employed to trigger the monostable multivibrator 3129 upon the occurrence of the trailing edge of the negative square pulse. This generates a positive square pulse at terminal 3129b which is used to control the set input terminal of flip-flop 3130. Output terminal 3130b thus goes to binary one which condition is impressed upon one input terminal of AND gate 3131.

Since the output terminal 3126b has reset flip-flop 3102 so that its output terminal 3102b is in binary one, this condition is impressed upon the set input terminal of flip-flop 3104 causing its output terminal 3104b to go to the binary one state. This condition is impressed upon one input terminal of AND gate 3112, the other input of which is connected to the output terminal 2303a of FIGURE 23. This output terminal generates the clocking signal [bit rate speed] at which the communications system is operating. That is, 1250, 625 or 312.5 bits per second. This causes AND gate 3112 to pass the new bit rate speed through its output terminal and OR gate 3114 to the input of AND gate 3115. The other input terminal is connected to output terminal 3103b which is in the binary one condition during the supervisory cycle, thereby passing the new clocking rate through OR gate 3116 to the tone generator 3117 which impresses the tone upon the communications link or line. The clock rate which is impressed upon the communications link is determined and controlled by the command signals transmitted by receiver to transmitter facility by the tone generators 3057, 3058 and 3059, shown in FIGURE 30a of the drawings, which signals are used to control the flip-flops 2508–2510 shown in FIGURE 25 of the drawings. The outputs of these flip-flops are employed to enable selectively one of the AND gates 2504–2506 in order to determine the clock pulse generated by the transmitter facility. These clock pulses are received by the receiver facility and synchronized at the receiver facility by the self-synchronizing circuitry 3200 shown in FIGURES 32a and 32b of the drawings. This circuitry will be more fully described, but for the present purposes, suffice it to say that at the recognition and synchronism of the transmitted clock pulse which persists for a minimum of three bit intervals, the output of the self-synchronizing circuitry generates an acknowledgment signal at its output terminal 3270 which is employed to reset flip-flops 3004, 3008, 3011 and 3016 of FIGURE 30 and further enables AND gates 2918 of FIGURE 29 by being impressed on one input terminal, the other of which receives the output of OR gate 2917. OR gate 2917 provides a binary one condition when either a decrease or increase operating speed command is present causing AND gate 2918 to generate a binary one condition which is passed through OR gate 2916 to the set input terminal of flip-flop 2919. This causes a binary one condition at the output terminal 2919c to again enable AND gates 3005, 3009, 3012 and 3017 of FIGURE 30, which would disable upon the presence of a binary one condition at the input terminal 2920b of OR gate 2920 which was binary one to indicate recognition of a mark condition. The speed change command, however, again selectively enables one of the AND gates 3005, 3009, 3012 or 3017 to again generate and place upon the line the speed change command which is in turn transmitted to the transmitter facility as an acknowledgment of receipt of the framing portion of the cycle which is comprised of the data pulses 3153, shown in FIGURE 31a of the drawings.

The return of the command to the line causes the operation of the count-of-three counter 2617 shown in FIGURE 26 of the drawings, which upon the persistence of the command for at least three bit intervals causes output terminal 2618b again to go to the binary one state. This condition is impressed upon one input terminal of AND gate 3120 and if it persists another three bit intervals, causes output terminal 3126b to go to the binary one state to initiate a binary one condition upon the reset input terminal of flip-flop 3102 causing output terminal 3102a to go to binary zero thus preventing the impression of a steady mark condition upon the outgoing line.

Simultaneously therewith, output terminal 2618b impresses its binary one condition upon the input terminal 3131b of AND gate 3131 shown in FIGURE 31 which was enabled by the setting of flip-flop 3130. This condition generates a binary one at the output of AND gate 3131 which is impressed upon the reset input terminal of flip-flop 3104 causing output terminal 3104b to go to binary zero and output terminal 3104a to go to binary one. The output terminal 3104b in moving to the binary zero state disables AND gate 3112 to prevent the continuation of the framing pulses to be impressed upon the communication link so that neither the framing pulses nor the steady mark condition can be impressed upon the line.

At this time with output terminal 3104a and 3102b of flip-flops 3104 and 3102, respectively, at binary one, these conditions are impressed upon two of the four input terminals of AND gate 3108. A third input terminal is connected to the output terminal 3103b of flip-flop 3103 while the remaining input terminal is connected to the output terminal $C_1$ of the count-of-eight counter 2301 shown in FIGURE 23. Thus AND gate 3108 generates a binary one condition at its output terminal indicative of the transmitter facility being in a supervisory cycle [terminal 3103b being binary one], a completion of the acknowledgment signal [terminal 3102b being binary one], and the completion of the framing cycle [terminal 3104a being binary one]. Thus upon the occurrence of the $C_1$ count the binary one condition of AND gate 3108 is employed to trigger flip-flop 3109 whose output 3109a triggers monostable multivibrator 3110 to generate a binary one positive square pulse at its output terminal 3110a. This condition is impressed upon one input terminal of OR gate 3107 which passes this state to the reset input terminal 3103d of flip-flop 3103 causing terminals 3103a and 3103b to go to binary one and binary zero respectively, thus indicating the initiation and termination of data and supervisory portions of the cycle, respectively. The return of output 3103a to the binary one condition is impressed upon the AND gate 2314 of FIGURE 23 which enables this AND gate to go to a binary one condition in order to advance characters to the data source 2350 during the data transmitting portion of the cycle and further the output 3103a is impressed upon one input terminal of AND gate 2370 to enable the AND gates 2303–2309 for the purpose of transmitting data in any sequential fashion from transmitter facility to receiver facility. It should be noted that in the absence of a binary one condition at output terminal 3103a that data can neither be advanced to the data source 2350 nor sequentially stepped through the AND gates 2303–2309, respectively, thereby preventing transmission of data during a command cycle [i.e., during either a vertical parity request, repeat transmission request, or a change of speed request].

During either a vertical parity transmit request or a repeat request, if either of these conditions are impressed upon either of the input terminals of OR gate 3105 shown in FIGURE 31 which conditions are received at the outputs 2611d and 2619d of AND gates 2611 and 2619, respectively, as shown in FIGURE 26a of the drawings, these are the AND gates which are used to identify the vertical parity or repeat request. Upon the presence of either such conditions this is impressed upon one input terminal of AND gate 3106, the other input of which is connected to the space recognition output terminal 3126b. When this is in the binary one state this condition is passed through OR gate 3107 to the reset input terminal 3103d of flip-flop 3103 to reset the system at the transmitter facility back to the data transmission phase of the operating cycle. Thus for either a vertical parity or repeat transmission request the operation is as follows:

The request is transmitted and if it persists for a minimum of three bit intervals the command is recognized by generating a binary one condition at output terminal 2618b of FIGURE 26a. This is employed to set flip-flop 3102 to initiate transmission of a steady mark upon the line by tone means 3117. The mark condition is recognized by the count-of-three counter 3203 of FIGURE 32 which removes the command from the line so as to effectively transmit a steady space condition. The steady space condition is recognized by means of counter 3124 to generate a space recognition signal at output terminal 3126b. As soon as the space recognition signal is generated, however, this enables AND gate 3106 causing this condition to reset flip-flop 3103 to place it immediately in the data cycle. Since no speed changes occurred, no framing pulses, such as, for example, the framing pulses 3153, will be transmitted in this case.

The circuitry for receiving the framing pulses 3153, synchronizing the receiver facility to the framing pulses and acknowledging synchronism thereof is shown in FIGURES 32a and 32b. Before considering these figures, however, consider first FIGURE 31a. It will be noted that when the receiver facility recognizes the presence of the steady mark tone condition represented by the square pulse 3152, if this steady mark tone condition persists for a minimum of three bit intervals, this is recognized by the count-of-three mark interval counter 3203 shown in FIGURE 32 which generates a binary one output at its terminal 3205. Thus the transmitter facility having recognized the request for a speed change and transmitted an acknowledgment to identify this recognition, the binary one output at terminal 3205 is impressed upon the input terminals of either the increase or decrease AND gates 2912 or 2909 shown in FIGURE 29, depending upon which type of speed change has been requested. For example, assuming that a decrease speed change has been requested, upon the mark recognition the output terminal 3205 generates a binary one which is impressed upon AND gate 2912 of FIGURE 29 which generates a binary one condition at its output terminal 2912c. This decrease speed command is thereby impressed upon the decrease bit rate input terminal 1804b of the count-of-three counter 1804 shown in FIGURE 18 of the drawings. This will control the counter so that the output terminal representative of the next lowest bit rate will go to binary one in order to control the clock pulse rate generated at the output terminal 1809 of OR gate 1808, the generation of which was previously described. Thus the system has now commanded the transmitter facility to go to the decrease speed operation and acknowledgment of this command has controlled the receiver facility to go to the decrease speed rate.

Turning now to the synchronizing circuitry of FIGURES 32a and 32b, the initiation of operation of this circuitry is by means of driving one of the input terminals to OR gate 3221. The input terminals to OR gate 3221 are connected to the output terminals 2912c and 2909c which are binary one upon the presence of a local decrease or local increase in bit rate while the remaining input terminal is connected to terminal 3007b of FIGURE 30 which constitutes a start up command. If any of these three conditions are present OR gate 3221 passes this binary one condition through an emitter follower to the set input terminal of flip-flop 3222. This causes output terminal 3222a to go to binary one and 322b to go to binary zero. Output terminal 322b is impressed upon one input terminal of AND gate 3238 the output of which is employed for the purpose of supplying the clocking pulse to the receiver facility. Thus upon a speed change, output terminal 3222b having gone to binary zero, this prevents the clocking pulse from being transmitted to the various places wherein the clocking pulse is used in order to sequentially receive data transmitted from the transmitter facility thus preventing the receipt of data during a speed change or start up operation. A clocking pulse, however, is available at output terminal 3237d of OR gate 3237 and is impressed upon one input terminal of AND gate 3223 the other terminal of which is connected to output terminal 3222a of flip-flop 3222. This makes the clocking pulse available at the output terminal 3223c of AND gate 3223 which clock pulse is impressed upon bus 3255 for a purpose to be more fully described.

The count-of-eight counter 1803 of FIGURE 18 is shown reproduced in FIGURE 32a for purposes of clarity and is represented there by the designation 1803'. In a similar manner, AND gates 1805, 1806 and 1807 have been reproduced in FIGURE 32a and are designated by the numerals 1805'–1807', respectively. In the same manner as previously described, a decrease bit rate signal having been impressed upon the counter 1804 of FIGURE 18, one of the output terminals 1804c–1804e goes to binary one [namely the one which indicates a decrease in bit rate from the previous bit rate speed] and is selectively impressed upon one of the AND gates 1805'–1807'. For example, if it is assumed that operation was at 1250 bits per second Hamming coding, a decrease bit rate will cause output terminal 1804c to go to binary zero and output terminal 1804d to go to binary one, which condition will be impressed upon one input terminal of AND gate 1806', the other terminal of AND gate 1806' being connected to the output terminal 1803b' of counter 1803' which is the output terminal which generates the 625 bit per second square pulses.

Thus to this point it can be seen that the receiver facility has seen fit in accordance with a consideration of the link history to decrease the bit operating speed. The receiver facility has sent a command requesting a reduced bit rate to the transmitter facility which has received the request and transmitted and acknowledged [steady mark tone], which triggers the receiver facility to make a like decrease in bit rate at the receiver location. Both transmitter and receiver facilities having stepped down to the lower bit rate, it is now necessary to synchronize the clocking pulse source at the transmitter facility with the clocking pulse source at the transmitter facility. It will be noted that, as shown in FIGURE 31a, the receiver facility acknowledges the steady mark condition (square pulse 3152) by transmitting a steady space condition from time $t_2$ to time $t_4$. Recognition of the steady space condition takes place at the transmitter facility if it persists for at least three bit intervals so that at time $t_3$ the transmitter facility has an acknowledgment of the steady space condition, pays out the new clock pulse rate represented by the pulses 3153 on to the line, which clock pulses the receiver facility to place itself in synchronism with the clock pulses at the transmitter facility.

The primary basis for operation of the self-synchronizing logic circuitry of FIGURES 32a and 32b lies in the fact that both receiver and transmitter facilities are provided with oscillating means which operate at the 2500 cycle per second speed and which synchronize with one another. The novel manner in which this synchronism occurs is fully described in copending U.S. application Ser. No. 301,110, entitled "Phase Shift Transmitter," filed Aug. 3, 1963, by Brothman et al., and assigned to the assignee of the instant invention. Thus with the transmitter and receiver facility oscillating means operating in synchronism, it will be immaterial whether they are inverted in phase (i.e., by 180°) due to the arrangement provided in the self-synchronizing logic of FIGURES 32a and 32b. This will be more clearly seen from a consideration of the circuitry of FIGURES 32a and 32b taken together with the waveform shown in FIGURE 33 which aid in the description of the self-synchronizing circuitry.

In FIGURE 32a the local reference oscillator generates a 2500 c.p.s. carrier signal which is squared by squaring means 3227. The output of squaring means 3227 is shown by waveform 3301 of FIGURE 33. The output of squarer 3227 is impressed upon the input of an inverter circuit 3228 the output of which 3228 inverts the square pulse to form the waveform 3302. A few examples of the synchronizing operation will now be given.

Let it be assumed that a speed change was requested such that the command to the transmitter requests operation at the 1250 bit per second operating speed. Let it first be assumed that the first example is that wherein the 1250 bit per second train of framing pulses [such as the framing pulses 3153 of FIGURE 31a] transmitted to the receiver facility is in exact synchronism with the operation at the receiver facility. These framing or square pulses are imposed upon one input terminal of AND gate 3240, the other terminal of which is connected to the output 3221c of OR gate 3221 shown in FIGURE 32b which is binary one upon the occurrence of a decrease speed change, increase speed change, or start up command. Thus AND gate 3240 is enabled only during a speed change or start up operation. At this time, therefore, AND gate 3240 passes the 1250 bit per second square pulse waveform 3302, shown in FIGURE 33. This appears at the output of AND gate 3240 and passes through an emitter follower to inverter 3241 which inverts the waveform 3302 to form the waveform 3303, as shown in FIGURE 33. Inverted waveform 3303 is then impressed upon the trigger input of a monostable multivibrator 3242, having an output terminal 3242a. Multivibrator 3242 is triggered into operation upon the occurrence of a positive going square pulse which occurs at time $t_0$ as shown in FIGURE 33. This causes the multivibrator to generate a negative square pulse at time $t_0$ shown by waveform 3305. The pulse duration of this negative square pulse can be seen to be substantially less than a half-cycle of the local reference oscillator clocking pulses 3301. A time $t_1$ the trailing edge of this negative square pulse 3304 is formed and passes through an emitter follower to the trigger input of another monostable multivibrator 3243. This causes a positive square pulse to be generated at time $t_1$ at the output terminal 3243a of multivibrator 3243. This is impressed through an emitter follower upon one input terminal of each of the AND gates 3244 and 3245. Output terminal 3243a is also connected to the reset input bus 1803d' of count-of-eight counter 1803' to reset the counter to zero in order to re-establish synchronism between receiver and transmitter facility, in a manner to be more fully described.

AND gates 3244 and 3245 have second input terminals which are connected to the output terminal 3227a of squaring amplifier 3227 and the output terminal 3228a of inverter 3228. Thus AND gate 3245 receives the clocking pulse 3301 and the AND gate 3244 receives the inverted clocking pulse 3302. As can be seen in FIGURE 33, the 1250 bit per second waveform 3303 has its leading edges in exact synchronism with the leading edges of the square pulses in waveform 3301 thus requiring the output of squarer 3227 to drive the counter 1803'. The circuitry therefore operates in the following manner:

The positive square pulse 3306 formed at time $t_1$ is generated some time after the leading edge of square pulse 3301' of waveform 3301. It is therefore this leading edge which is in synchronism with the leading edge of the 1250 bit per second inverted waveform 3304 having the leading edge 3304' occurring simultaneously with the leading edge 3301'. It is thus desired to have the output of squarer 3227 driving counter 1803'. Thus the square pulse 3306 which is formed at time $t_1$ is impressed upon the reset input bus 1803d' of the counter 1803' to reset the counter for the synchronous operation. Simultaneously therewith this square pulse enables both AND gates 3244 and 3245. However, only AND gate 3245 will generate a binary one condition at its output since its input terminal is connected to output 3227a of squarer 3227 which is binary one at time $t_1$, whereas the output of inverter 3228 is binary zero at this time thereby disabling the generation of a binary one by AND gate 3244. This binary one condition generated by AND gate 3245 is impressed upon the reset input terminal 3229a of flip-flop 3229 causing the output terminal 3229c to go to binary one. This condition is impressed upon one input terminal of AND gate 3230 the other of which is connected to the output of squarer 3227 thus enabling the passage of the waveform 3301 through AND gate 3230 and OR gate 3232 to the input terminal of the counter 1803'. The next leading edge of a positive square pulse in waveform 3301 occurs at time $t_2$ which causes output terminal 1803a' to generate a positive going pulse 3307' shown in waveform 3307 which it will be noted is in exact synchronism with the pulse 3303' of the waveform 3303 which is as it should be.

Consider now the example wherein the 1250 bit per second waveform is sent with its leading edge delayed by one-half of a bit length behind the clocking pulse source. Considering FIGURE 33, at starting time $t_s$ clocking pulse source 3301 generates the leading edge 3301'' from a square pulse. However, it is not until $t_s+1$ [one-half bit length later] that the leading edge 3308' of a 1250 bit per second waveform 3308 is being formed at the transmitter location. To synchronize a system in this example, waveform 3308 is again inverted by inverter 3241 to form the inverted waveform 3309. The leading edge 3309' is used to trigger multivibrator 3242 to form the negative square pulse 3310. This in turn triggers multivibrator 3243 to form the positive square pulse 331 at time $t_1'$. This resets counter 1803' and causes gate 3244 to operate since the inverted waveform 3302 of the clocking pulse is binary one at time $t_1'$. The opening of gate 3244 causes a binary one to be impressed upon the set input terminal 3229b of flip-flop 3229 causing output terminal 3229d to go to binary one. This enables AND gate 3231 which then permits the passage of the inverted square pulse waveform 3302 through OR gate 3232 to the input of the counter 1803'. The next positive square pulse formed by the inverted waveform occurs at time $t_2'$ causing output terminal 1803a' to generate the waveform 3312 having a square pulse 3312' whose leading edge occurs simultaneously with the leading edge 3302' of the square pulse shown in waveform 3302, again placing the system in synchronism.

Considering still another example, let it be assumed that the new speed change requested an operating speed of 625 bits per second so that the transmitter transmits the waveform 3313 to the receiver facility. Also let it be assumed that this waveform is out of step with the waveform 3301 such that its leading edge 3313' occurs in synchronism with the trailing edge 3301a of the waveform 3301' instead of the leading edge 3301''.

As before, the waveform 3313 is inverted to form the waveform 3314 which is used to trigger multivibrator 3242 to generate the negative square pulse 3315 at time $t_A$. This triggers the positive square pulse at output terminal 3243a at time $t_B$. It should be noted that this positive square pulse 3316 occurs when the inverted waveform 3302 is in the binary one state thus causing AND gate 3244 to go to binary one in order to generate a reset pulse upon input terminal 3229b of flip-flop 3229 causing AND gate 3231 to pass the inverted waveform through OR gate 3232 to the input of counter 1803'. It should also be noted that counter 1803' was reset by pulse 3316 in the same manner as previously described. Counter 1803' having been reset has its output terminal 1803a' going to binary one upon the occurrence of the square pulse generated at time $t_C$. Upon the occurrence of the next square pulse which begins at $t_D$ output terminal 1803a' goes to binary zero and output terminal 1803b' goes to binary one thus forming the square pulse 3317 shown in FIGURE 33. It will be noted that this is in exact synchronism with the square pulse occurring at time $t_D$ of waveform 3313 thus placing the 625 bit per second clocking rate at both receiver and transmitter into exact synchronism. The operation is substantially identical at all other speed changes, such as for example, the 312.5 bit per second speed change and a description thereof will be omitted for purposes of clarity.

In order to acknowledge successful completion of the framing operation the arrangement of FIGURE 32b is employed. As was previously described, AND gate 3223 has its output 3223c impressed upon the bus 3255 which impresses the local clocking pulse upon the input terminal 3246a of count-of-three counter 3246 upon input terminal 3247a of pulse AND gate 3247, input terminal 3249a of pulse AND gate 3249 and input terminal 3250a of inverter 3250. Considering this circuitry in cooperation with the waveforms of FIGURE 34 the clocking pulse waveform is shown by waveform 3401 which, it will be assumed is a 1250 bit per second clocking pulse. It should be noted that the first square pulse has its leading edge formed at $t_0$. This first pulse is impressed upon input terminal 3246a of count-of-three counter to advance the count by one. Since the counter has been reset it will be assumed that the counter now contains a count-of-one count. This positive square pulse whose leading edge is generated at $t_0$ is also impressed upon the input terminals 3247a, 3249a, 3250a, as was previously described. Let it now be assumed that the 1250 bit per second framing pulses transmitted from the transmitter location were initially one-half of a bit interval behind the local clocking pulses so that the leading edge of the first square pulse does not occure until time $t_1$, as shown by waveform 3402. This positive going square pulse generated at time $t_1$ is impressed upon the input terminal 3247b of pulse AND gate 3247 and upon the input terminal 3251b of pulse AND gate 3251 as well as the input terminal 3248 of inverter 3248. As was previously described the characteristic of the pulse AND gate circuitry is such that the gate will generate an output only when the binary one condition impressed upon its "b" terminal occurs after the impression of a binary one level condition upon its "a" terminal. Thus with the waveform 3401 having its leading edge occurring at time $t_0$ the waveform 3402 having its leading edge occurring at time $t_1$ which is after $t_0$, pulse AND gate 3247 will generate a binary one output condition which is indicative of a late step condition. This is passed through OR gate 3252 to trigger monostable multivibrator 3253. The multivibrator generates a positive square pulse at its output terminal 3253b which is used to reset the count-of-three counter 3246 to erase the count-of-one which has been established therein. This is done in order to prevent the accumulation of a count-of-three since synchronism does not yet exist.

It will be noted, however, that at time $t_3$ waveform 3402 falls into synchronism with waveform 3401. At this time pulse AND gate 3247 will not generate an output since the leading edges of the positive square pulses of waveform 3402 does not occur after the leading edges of the positive square pulses of waveform 3401, but occurs simultaneously therewith. This prevents the pulse AND gate 3247 from generating an output. The framing pulses represented by waveform 3402 are inverted by inverter 3248 to form the waveform 3402a. In this case, the input at terminal 3249b of pulse AND gate 3249 must occur after the positive input to the terminal 3249a of the pulse AND gate. However, pulse AND gate 3249 will not generate an output since every time a leading edge of the inverted waveform 3402a is formed, waveform 3401 is forming a trailing edge. That is, is going in the negative direction, thus preventing an output from being generated at the pulse AND gate 3249. The same relationship exists at pulse AND gate 3251 since while the framing pulses impressed upon input terminal 3251b are not inverted, the local clocking pulses are inverted by the inverter 3250 to establish the same relative relationship, thereby preventing pulse AND gate 3251 from generating an output. Under these circumstances, multivibrator 3253 will fail to be triggered enabling the count-of-three counter 3246 to accumulate a count-of-three under control of the clocking pulses of the local clocking pulse source which are impressed upon bus 3255. When a count-of-three has been accumulated in counter 3246 it generates a binary one indication at its output terminal 3246b which is used to trigger multivibrator 3254 which generates an acknowledgment of framing at its output terminal 3270. This is employed in the same manner as previously described to cause the transmitter facility to transmit steady space for at least three bit intervals and then transmit data in the normal manner, as was previously described.

If, for example, the received framing has the leading edges of the square pulses occurring before the leading edges of the local clock pulse square pulses, this is represented by waveforms 3401 and 3403 where 3401 again represents the local clocking pulse source and 3403 represents the framing pulses received from the transmitter facility. It can be seen that the first leading edge, which occurs at time $t_A$ occurs before the first leading edge of waveform 3401 which occurs at time $t_0$. This is recognized by pulse AND gate 3249 which receives waveform 3403 inverted [see waveform 3403a] such that at time $t_B$ the leading edge of the next square pulse is impressed upon input terminal 3249b which occurs after the leading edge of the local clocking pulse source whose leading edge occurs at time $t_0$. This permits pulse AND gate 3249 to generate a binary one condition which is again used to trigger multivibrator 3253 in order to reset the count-of-three counter 3246. After synchronism is established by the circuitry of FIGURE 32a waveform 3403 is again in synchronism at time $t_3$ with waveform 3401 enabling counter 3246 to accumulate the count-of-three to establish acknowlegment of the framing operation.

As a third example, if spurious noise occurs it is again imperative that the counter 3246 be prevented from accumulating a count-of-three until these spurious signals are absent. Waveform 3404 represents the framing clock pulses which are transmitted and which carries a spurious pulse which occurs at time $t_4$ which is during the "dead interval" between two square pulses. Local clocking pulse waveform 3401 is inverted by inverter means 3250 to form the waveform 3401a. The leading edge of the square pulse which occurs at time $t_D$ occurs before the leading edge of the noise signal the leading edge of which occurs at time $t_4$ thereby enabling pulse AND gate 3251 to generate a binary one condition to again trigger multivibrator 3253 to prevent the accumulation of a count-of-three in counter 3246. As soon as the noise condition disappears counter 3246 will be permitted to accumulate a count-of-three to establish the acknowledgement of framing signal 3270.

When this signal is generated it is impressed upon the set input terminal of flip-flop 3225 the output of which is impressed upon AND gate 3224. After recognition of the steady space condition for a minimum of three bit intervals by the space counter 3208 of FIGURE 32, this circuit generates an output at its output terminal 3211 which is impressed upon the other input terminal of AND gate 3224. This causes AND gate 3224 to open, impressing a reset input pulse open flip-flop 3222 causing its output terminal 3222a to go to binary zero and output terminal 3222b to go to binary one. This transition disables the operation of AND gate 3223 to prevent counter 3246 from generating any additional count-of-three and further, enables AND gate 3238 to pass the local clocking pulse source to all of the receiver facility circuitry requiring the clocking pulse for operation thereof which has, for example, the information interval, counting circuitry, the vertical parity operation circuitry, etc. Thus the synchronizing logic automatically synchronizes the local clocking pulse source with the transmitter clocking pulse source and upon persistence of the synchronous condition for at least three bit intervals generates an acknowledged signal enabling the transmitter to first send a steady space condition and then begin the normal transmission of data.

Returning to a consideration of FIGURE 17, it will be noted that the supervisory circuitry 1700 is provided with means for generating an increased bit rate request if a predetermined number of error free characters are processed at the receiver facility. However, before this signal, which appears at output terminal 1723c can be generated the receipt of the predetermined number of error free characters must simultaneously occur with an indication of a good long term history indication which indication is impressed upon the input terminal 1723b of the AND gate 1723. The long term history logic which provides this signal is shown in FIGURE 35 the circuitry of which is designated by numeral 3500. The purpose of this circuitry 3500 is to provide signals indicative of the fact that the errors are occurring at a frequency which lies beyond the protection limit of the particular operating mode at which the system is functioning.

Circuitry 3500 is comprised of an AND gate 3501 having a first input terminal 3501a which is in the binary one condition during the receiving cycle. That is, the AND gate 3501 is disabled during the supervisory portion of the cycle and is enabled only during the data receiving portion of the cycle. The other input terminal 3501b is connected to the output of the clocking pulses employed in the Nyquist interval counting operation which pulses occur at the carrier frequency of 2500 bits per second, for example. The output of AND gate 3501 is impressed upon the input 3502a of a count-of-1024 counter 3502. The counter 3502, which is capable of providing a count-of-1024, is adapted to advance its count by one each time a Nyquist interval clocking pulse is passed by AND gate 3501. The output terminals taken from counter 3502 are 3502b–3502e and are, respectively, binary one when the counter 2502 has accumulated the counts of one, 512, 513 and 1024. These outputs are employed for the purpose of advancing the count-of-A counters 3505 and 3520 in a manner to be more fully described.

The count-of-A counters 3505 and 3520 are cumulative counters which are employed for the purpose of counting the number of errored Nyquist indications, which indications are generated by the circuitry 300 of FIGURE 3. The counting capacity of the count-of-A counters 3505 and 3520 are determined strictly by the protection limit afforded by the operating speed and protective coding used during any operating cycle. In the present exemplary embodiment, counter 3505 is provided with the output terminals 3505b–3505e each of which when in the binary one state, respectively, indicates the count at which protection limit of single parity at the 1250 bit per second rate is reached; the count at which the protection limit of Hamming coding at the 1250 bit per second rate is reached; the count at which the protection limit of Hamming coding at the 625 bit per second rate is reached; and finally, the count at which the protection limit of Hamming coding at the 312.5 bit per second rate is reached. The operation of these counters are as follows:

Upon the occurrence of a receiving cycle indication AND gate 3501 causes the data bits being examined to advance the counter 3502 by one count each time the data bit has been examined. After the first data bit has been examined, this advances a count of counter 3502 from zero to the count of one. This indication appears as a binary one state at output terminal 3502b. This is impressed upon the set input terminal of flip-flop 3518 which generates a binary one indication at its output terminal 3518b to enable the operation of AND gate 3519. The other input terminal 3519b of the AND gate receives ambiguous indications from the Nyquist interval counting means each time a data bit is identified as being ambiguous. Thus advancing the count-of-A counter 3520 by one count each time a data bit is identified as being ambiguous, thus counter 3502 counts the total number of data bits being processed while counter 3520 counts the number of errored data bits being processed. Let it be assumed that the system is operating at the 1250 bit per second single parity operating mode and let it further be assumed that if ten ambiguous data bits are received for every five hundred data bits processed, that this condition exceeds the protection limit of operation at single parity 1250 bit per second operating mode. Thus at the start of the receiving cycle counter 3502 begins to advance its count for each data bit processed while counter 3520 advances its count for each ambiguous bit which is indicated by the Nyquist interval counting means 300 of FIGURE 3. Let it be assumed that the ten ambiguous bit indications cause counter 3520 to generate an indication at its terminal 3520b that ten errored bits have been processed. This binary one condition is impressed upon the set input terminal of flip-flop 3521 causing its output terminal 3521a to go to the binary zero state. It should be noted that flip-flop 3521, as well as flip-flops 3522–3524 receive at their reset input terminals via bus 3534 a binary one pulse to reset these flip-flops when count-of-1024 counter 3502 reaches a count-of-1024 (or zero) causing its output terminal 3502e to go to binary one which terminals are connected to bus 3534. Thus prior to the setting of flip-flop 3521, all flip-flops 3521–3524 have their output terminals 3521a–3524a, respectively, at binary one. All these conditions are impressed upon one input terminal of the respective AND gates 3525–3528. As soon as counter 3502 accumulates a count of one this sets flip-flop 3518 so that its output terminal 3518b is at binary one. This terminal is connected to bus 3535 which enables each of the AND gates 3525–3528. Thus upon the count of one in counter 302 all of the AND gates 3525–3528 are open. These AND gates impress their binary one outputs upon the OR gates 3514–3517, respectively, which is indicative of the fact the system can operate at any one of the operating modes so far as the long term history logic is concerned. Returning to the assumption that counter 3520 has developed a count of ten indicating that ten errored data bits have been received, output terminal 3520b generates the binary one condition which is impressed upon the set input terminal of flip-flop 3521 causing output terminal 3521a to go to binary zero. This disables AND gate 3525 from passing a binary one condition. Thus the output at OR gate 3514 which receives the input of AND gate 3525 is likewise at binary zero. This condition is impressed upon the input of inverter 3530 which generates a binary one at its output which in turn is impressed upon one input terminal of AND gate 3533. The other input terminal of AND gate 3533 is connected to the output terminal 1804f of FIGURE 18 which is indicative of system operation at the 1250 bit per second single parity mode. When these conditions occur simultaneously AND gate 3533 passes a binary one through OR gate 3536 to output terminal 3536d which is used as a reduced bit operating request which is impressed upon the input terminal 1701c of FIGURE 17 to generate a reduced bit rate request.

Let it next be assumed that at the 1250 bit per second Hamming coding operating mode, the protection limit is 20 errored bits. If count-of-A counter 3520 accumulates a count of 20 then it generates a binary one condition at its output terminal 3520c. This is impressed upon the set input terminal of flip-flop 3522 causing its output terminal 3522a to go to binary zero thus disabling AND gate 3526. This prevents a binary one from being passed through AND gate 3526 and OR gate 3515 so as to establish a binary zero upon the input to inverter 3531 which in turn generates a binary one at the input terminal of AND gate 3534. When this is coupled with an indication that this system is operating at the 1250 bit per second Hamming coding operating mode this condition is passed by AND gate 3534 and through OR gate 3536 to generate a reduced bit rate request at the input terminal 1701c of OR gate 1701.

In a like manner, when the protection limits are exceeded for the Hamming coding 625 bit per second operating mode and the Hamming coding 312.5 bit per second Hamming coding mode, then output terminals 3520d and 3520e generate binary one conditions to set flip-flops 3523 and 3524, respectively, in order to disable AND gates 3527 and 3528, respectively. These outputs are used in a like manner to generate a decrease bit rate request. Output terminal 3514c is impressed upon input terminal 1723b of AND gate 1723, shown in FIGURE 17, and when it is in the binary one condition this is indicative of a good long term history condition. That is, a condition which does not exceed the protection limits of the operation at single parity 1250 bit per second operating mode.

The counter 3502 continues to advance its count by one each time a data bit is processed at the receiver facility until it accumulates a count-of-512 such bits received. This causes a binary one condition to be generated at output terminal 3502c. This is impressed upon the reset input terminal of counter 3505 to reset the count therein to zero and also to reset flip-flop 3503 so that its output terminal 3503a is at the binary zero level. Upon the receipt of the next data bit to be processed, counter 3502 advances its count to 513 causing a binary one condition to be generated at its output terminal 3502d. This binary one condition is impressed upon the input to flip-flop 3503 causing its output terminal 3503a to go to binary one. This enables AND gate 3504 which has its other input terminal 3504b connected to the Nyquist interval counting means output which is indicative of an error data bit. Thus count-of-A counter 3505 is enabled to start counting errored bits when counter 3502 reaches a count of 513. Thus counter 3520 has been counting errored bits from the time counter 3502 began with the count of one until the count of 512 at which time counter 3505 starts counting. Counter 3502 continues to accumulate a count until it reaches the count of 1024, at this time it generates a binary one indication at its output terminal 3502e. This is impressed upon the reset input terminal of count-of-A counter 3520 and the reset input terminal of flip-flop 3518. Thus after the counter 3520 has been counting errored data bits per 1024 received, the counter 3520 and its enabling flip-flop 3518 are both reset in readiness for a new count to begin. It should be noted that when counter 3502 reaches a count of 1024, counter 3505 having initiated operation at count 513 has now been operating and counting errored data bits for the alst received 512 data bits processed by the receiver facility. Counter 3505 and its enabling flip-flop 3503 are reset when counter 3502 reaches a count of 512 so that counter 3505 counts errored data bits over the period in which 1024 data bits are received and processed, but operates so as to overlap with the operation of counter 3520 such that when the first received data bit is processed counter 3520 begins its count. Counter 3520 does not begin its operation until the 513th data bit processed has been received. When the 1024th bit has been processed by the receiver facility the count of errored data bits accumulated by counter 3520 is wiped out while the count of errored data bits accumulated by counter 3505 is continued. When the 1536th data bit is processed the error count accumulated in counter 3505 is wiped out at which time the count in counter 3520 has been operating for 512 processed data bits. Thus the counters operate in an overlapping fashion. The outputs 3505b–3505e of counter 3505 operate in identical manner to the outputs 3520b–3520e of counter 3520 and likewise are employed to set respective flip-flops 3506–3509 to selectively disable AND gates 3510–3513, respectively, in the manner identical to the operation of flip-flops 3521–3524 and AND gates 3525–3528, respectively. It should be noted that either of the AND gate groups 3510–3513 or 3525–3528 may go to binary one making the outputs at OR gates 3514–3517 in the binary one state. However, after every 512 processed data bits a new count is begun by one or the other of the two counters 3505 and 3520 so that this wipes out any exceeded protection limit which may have been indicated by the counter just erased and a new count is then begun.

The present communications system described which consists of a receiver location and a remote transmitter (slave) transmitter facility has been described for a two-wire operation wherein only one of the facilities may be on line at any given time even though both facilities are capable of transmitting and receiving. With the two-wire system it is important to note that so long as the transmitter facility is transmitting data the receiver facility is powerless to interrupt even though a request for a reduced bit rate is generated therein due to the high frequency of errors indicated by the data being processed. In order to enable the receiver facility in the two-wire system to indicate an errored condition and hence a reduced bit rate request to the transmitter facility it is important that the supervisory cycle be provided in addition to the receiving cycle so that the receiver facility may utilize the supervisory cycle to indicate to the transmitter facility the necessity for a speed change in vertical parity operation for a repeat transmission request. This is provided for by the circuitry of FIGURE 36 which is comprised of a count-of-11 counter 3601 having an input terminal 3601a for receiving a count $C_1$ from the circuitry of chart 300 indicative of the next coded character to be processed. As was previously described, the transmitter facility in the two-wire system transmits data in blocks so that when transmitting in the 1250 bit per second single parity mode eight coded characters are transmitted as one block. At the end of transmission of the eighth character a supervisory cycle is provided for lasting two cycles in character length during which time the receiver facility must be enabled to transmit either a speed change or other desired command. At the end of this two character length cycle the transmitter facility is then enabled to return to the data transmitting cycle to begin transmission of the next data block to the receiver facility.

Let it be assumed that the two-wire system is operating in the Hamming coding mode. This will cause one input terminal of each of the AND gates 3602 and 3603 to be in the binary one state. Let it be assumed that the count-of-11 counter 3601 has reached a count of six indicative of the fact that six coded characters have been received since this is the length of a data block in the Hamming coding operating modes to indicate the termination of transmission of that data block and it should further indicate that the supervisory cycle should then begin. Upon accumulation of the count-of-six, output terminal 3601b of counter 3601 goes to binary one. This condition is impressed upon the other input terminal of AND gate 3603 causing this binary one condition to be passed therethrough to the set input terminal of flip-flop 3604. This causes its output terminal 3604b to go to binary one which is passed through OR gate 3609 so that output terminal 3609c when in the binary one state is indicative of the fact that the system is beginning the supervisory portion of the transmitting cycle. This indication or binary one state is impressed upon the input terminal 2921b of AND gate 2921, shown in FIGURE 29. This enables the passing of a binary one condition through AND gate 2921b to permit speed changes to be made only during the supervisory portion of the transmitting cycle.

At the end of two more coded character intervals counter 3601 carries a count-of-eight causing its output terminal 3601c to go to the binary one state which during the Hamming coding operating mode causes AND gate 3602 to open impressing a binary one condition upon the reset input terminal of flip-flop 3604. This causes the output terminal 3604a to go to binary one which is impressed upon one input terminal of AND gate 3605. Simultaneously therewith AND gate 3602 impresses a binary one condition upon the reset input terminal of flip-flop 3607 causing its output terminal 3607a to go to binary one. The simultaneous presence of these binary one conditions opens AND gate 3605 providing an indication that the system is in the receiving cycle. This is utilized by the receiving means to enable receipt of data being sent from the transmitting facility so as to be appropriately processed.

When operating in the single parity mode a data block being transmitted to the receiver facility consists of eight coded characters. Thus when counter 3601 accumulates a count of eight its output terminal 3601d generates a binary one condition which is impressed upon AND gate 3606, this is ANDED with an indication that the system is operating in the single parity operating mode in order to set flip-flop 3607 causing its output terminal 3607b to go to binary one. Simultaneously therewith the output of AND gate 3606 is impressed upon flip-flop 3604 causing its output 3604b to go to binary one. Both of these conditions are passed through OR gate 3609 and again provide an indication that the system is beginning the supervisory cycle. Two coded character lengths later counter 3601 generates a count of ten which provides a binary one status at output terminal 3601e. This condition is impressed upon AND 3608 which opens when the system is in the single parity mode causing flip-flops 3604 and 3607 to be reset so that their output terminals 3604a and 3607a, respectively, go to binary one causing AND gate 3605 to generate a binary one condition indicative of the return to the receiving cycle. In this manner the receiver facility is prevented from transmitting speed change commands or vertical parity or repeat data transmission commands to the transmitter facility except during the supervisory portion of the transmission cycle.

The embodiment of the instant invention is completely utilizable in four-wire systems also known as duplex systems wherein both receiver and transmitter may transmit simultaneously. Thus if the transmitter is sending data and the receiver notes an error condition which requires a speed change simultaneously with the transmission of data from transmitter to receiver the receiver may send to transmitter the speed change request immediately upon generation of the request at the receiver and without waiting for the transmission of a data block of a predetermined length. This is done simply by omitting the circuitry 3600 of FIGURE 36 and enabling the system to go into a supervisory cycle immediately upon the generation of a speed change, vertical parity or repeat transmit request.

It can thus be seen that the instant invention provides a self-optimizing operation at a receiver facility which completely controls the operating speed of both receiver and transmitter facility, depending upon the link conditions from both a long term and short term history viewpoint in order to establish the optimum operation condition for the system.

Although there has been described a preferred embodiment of this novel invention, many variations and modifications will now be apparent to those skilled in the art. Therefore, this invention is to be limited, not by the disclosure herein, but only by the appending claims.

The embodiments of the invention in which an exclusive privilege of property is claimed are defined as follows:

1. For use in a facility receiving binary information, means for tagging received data bits either binary one, binary zero or ambiguous, comprising first means for receiving binary signals; second means for dividing each data bit, as it is received, into a predetermined number of information intervals; third means for determining the binary state of each of said intervals; fourth means for tagging a data bit as being a valid binary bit if at least a predetermined number of said information intervals are in the same binary state.

2. For use in a facility receiving binary information, means for tagging received data bits either binary one, binary zero or ambiguous, comprising first means for receiving binary signals; second means for dividing each data bit, as it is received, into a predetermined number of information intervals; third means for examining the binary state of each information interval; fourth means for counting the number of information intervals in one of said binary state; fifth means for tagging a data bit being processed as being a valid binary bit when the count of said counting means reaches a predetermined magnitude.

3. For use in a facility receiving binary information, means for tagging received data bits either binary one, binary zero or ambiguous, comprising first means for receiving binary signals; second means for dividing each data bit, as it is received, into a predetermined number of information intervals; third means for examining the binary state of each information interval; fourth means for counting the number of information intervals in one of said binary state; fifth means for tagging a data bit being processed as being an ambiguous binary bit when the count of said counting means falls below a predetermined magnitude.

4. Means for examining incoming binary data bits coded in a predetermined manner to form messages comprising first means for dividing the data bit interval into a plurality of information intervals equal in time duration; second means for generating a pulse to identify the presence of each information interval; third means for determining the binary state of the data bit being examined during each information interval; fourth means for counting the number of information intervals in said data bit which are in one binary state; fifth means for tagging the binary data bit being processed as being in one binary state when said fourth means generates a count lying in a first predetermined range; sixth means for tagging the binary data bit being processed as being in the opposite binary state when said fourth means generates a count lying in a second predetermined range and seventh means for tagging the data bit being processed as being ambiguous when said fourth means generates a count lying in a third predetermined range.

5. Means for examining incoming binary data bits coded in a predetermined manner to form messages comprising first means for dividing the data bit interval into a plurality of information intervals equal in time duration; second means for generating a pulse to identify the presence of each information interval; third means for determining the binary state of the data bit being examined during each information interval; fourth means for counting the number of information intervals in said data bit which are in one binary state; fifth means for tagging the binary data bit being processed as being in one binary state when said fourth means generates a a count lying in a first predetermined range; sixth means for tagging the binary data bit being processed as being in the opposite binary state when said fourth means generates a count lying in a second predetermined range and seventh means for tagging the data bit being processed as being ambiguous when said fourth means generates a count lying in a third predetermined range, first M-stage register means for storing received data bits; second register means for storing ambiguous data bits information; each stage of said first register means being associated with a stage of said second register means; said first and second register means cooperating to identify a stored data bit as being ambiguous by providing an ambiguous bit indication in the stage of said second register means associated with the stage of said first register means storing the ambiguous data bit.

6. Means for examining incoming binary data bits coded to form a message comprising first means for dividing the data bit interval into a plurality of information intervals equal in time duration; second means for counting the number of information intervals which are in one binary state; third means for identifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probability of the next received data bit being correct.

7. Means for examining incoming binary data bits coded to form a message comprising first means for dividing the data bit interval into a plurality of information intervals equal in time duration; second means for counting the number of information intervals which are in one binary state; third means for indentifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probability of the next received data bit being correct; sixth means for comparing the count generated by said second means with output generated by said fourth means for determining the correctness of the data bit being processed.

8. Means for examining incoming binary data bits coded to form a message comprising first means for dividing the data bit interval into a plurality of information intervals equal in time duration; second means for counting the number of information intervals which are in one binary state; third means for indentifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probability of the next received data bit being correct; sixth means for comparing the count generated by said second means with output generated by said fourth means for determining the correctness of the data bit being processed; said fifth means being adapted to update the output thereof with the receipt of each data bit.

9. Means for examining incoming binary data bits coded to form a message comprising first means for dividing the data bit interval into a plurality of information intervals equal in time duration; second means for counting the number of information intervals which are in one binary state; third means for identifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probability of the next received data bit being correct; said fifth means comprising first storage means for storing the output of said fifth means; accumulator means for adding the contents of said first storage means to the output of said second means to form a sum; dividing means for dividing the sum generated by said accumulator means and shifting the result back into said first storage means in readiness for the next averaging operation.

10. Means for examining incoming binary data bits coded to form a message comprising first means for dividing the data bit interval into a plurality of information intervals equal in time duration; second means for counting the number of information intervals which are in one binary state; third means for identifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probability of the next received data bit being correct; said fifth means comprising first storage means for storing the output of said fifth means; accumulator means for adding the contents of said first storage means to the output of said second means to form a sum; dividing means for dividing the sum generated by said accumulator means and shifting the result back into said first storage means in readiness for the next averaging operation; round-off means for rounding-off the result of the division operation when said sum to be divided represents an odd number.

11. In a system for receiving binary coded information representing numeric and/or alphabetic characters wherein each character is comprised of $n$ binary data bits and $m$ check bits, first means for ascertaining the correctness of the $n$ data bits and $m$ check bits in a received character, said first means comprised of means for examining incoming binary data bits coded to form a message comprising first means for dividing the data bit interval into a plurality of information intervals equal in time duration; second means for counting the number of information intervals which are in one binary state; third means for identifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate on output representing the probability of the next received data bit being correct; sixth means for comparing the count generated by said second means with output generated by said fourth means for determining the correctness of the data bit being processed; said system further comprising first register means comprised of $(m+n)$ stages for storing the $n$ data bits and $m$ check bits of a received character; second register means for $h$ comprised $(m+n)$ stages, each stage of which is associated with a stage of said first register means; said second register means being adapted to tag which binary bits in said first register means are ambiguous; fourth means responsive to said $n$ data bits, said $m$ check bits and said ambiguous bit indications to alter the binary state of the binary bit in said first register means which has been tagged as ambiguous.

12. In a system for receiving binary coded information representing numeric and/or alphabetic characters wherein each character is comprised of $n$ binary data bits and $m$ check bits, first means for ascertaining the correctness of the $n$ data bits and $m$ check bits in a received character, said first means being comprised of means for examining incoming binary data bits coded to form a message comprising first means for dividing the data bit interval into a plurality of information intervals equal in time duration; second means for counting the number of information intervals which are in one binary state; third means for identifying the data bit being processed as being in one of the two binary states in accordance with the count generated by said second means; fourth means for generating a count of the incorrect information intervals of the data bit being processed and fifth means for utilizing each of the counts generated by said fourth means for each data bit processed to generate an output representing the probabiliy of the next received data bit being correct; sixth means for comparing the count generated by said second means with output generated by said fourth means for determining the correctness of the data bit being processed; said system furher comprising first register means comprised of $(m+n)$ stages for storing the $n$ data bits and $m$ check bits of a received character; second register means for $h$ comprised $(m+n)$ stages, each stage of which is associated with a stage of said first register means; said second register means being adapted to tag which binary bits in said first register means are ambiguous; fourth means responsive to said $n$ data bits, said $m$ check bits and said ambiguous bit indications to alter the binary state of the binary bit in said first register means which has been tagged as ambiguous; fifth means for counting the number of bits which have been tagged as being ambiguous; sixth means for generating an alarm when said fifth means exceeds a predetermined count to provide an indication that the number of ambiguous bits present exceeds the correction capacity of the the system code.

13. A device for determining the value of a received pulse which pulse may be at one of a plurality of values comprising:

means for determining the instantaneous value of said pulse at each of a predetermined number of sampling intervals;

means responsive to said determining means for indicating the relative number of sampling intervals during which said pulse is at each of its possible values;

and means for storing the value which said received pulse is at during a predetermnied largest relative number of said sampling intervals, as the value of said received pulse.

14. A device for determining the binary value of a received pulse comprising:

means for determining the instantaneous binary value of said pulse at each of a predetermined number of sampling intervals;

means responsive to said determining means for indicating the relative number of sampling intervals during which said pulse is at each binary value;

and means for storing the binary value which said received pulse is at for a predetermined largest relative number of said sampling intervals as the binary value of said received pulse.

No references cited.

MARTIN P. HARTMAN, *Primary Examiner.*

U.S. Cl. X.R.

328—151